United States Patent
Smith et al.

(10) Patent No.: US 10,757,371 B2
(45) Date of Patent: Aug. 25, 2020

(54) NETWORKED AND CAMERA ENABLED LOCKING DEVICES

(71) Applicants: Master Lock Company LLC, Oak Creek, WI (US); Vardr Pty. Ltd., Mosman, New South Wales (AU)

(72) Inventors: Geoff Smith, Mt. Gravatt East (AU); Matthew Fitzpatrick, Mosman (AU); Tom Celinski, Mosman (AU); Mark Richards, Mosman (AU); John Bartucci, Crystal Lake, IL (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 16/270,418

(22) Filed: Feb. 7, 2019

(65) Prior Publication Data
US 2019/0174098 A1    Jun. 6, 2019

Related U.S. Application Data

(63) Continuation of application No. 14/853,914, filed on Sep. 14, 2015, now Pat. No. 10,205,913, which is a
(Continued)

(51) Int. Cl.
| | | |
|---|---|---|
| *H04N 7/18* | (2006.01) | |
| *H04N 5/232* | (2006.01) | |
| *G08B 29/18* | (2006.01) | |
| *G08B 13/196* | (2006.01) | |

(52) U.S. Cl.
CPC ......... *H04N 7/181* (2013.01); *G08B 13/1966* (2013.01); *G08B 13/19667* (2013.01);
(Continued)

(58) Field of Classification Search
CPC ........ G06F 21/31; H04N 7/181; H04N 7/188; H04N 5/23206; H04N 5/23216;
(Continued)

(56) References Cited

U.S. PATENT DOCUMENTS

| 8,957,757 B1 | 2/2015 | Le Burge et al. |
|---|---|---|
| 2004/0051626 A1 | 3/2004 | Pautler |

(Continued)

OTHER PUBLICATIONS

International Search Report and Written Opinion for International Application No. PCT/US2014/029120, dated Oct. 23, 2014, 13 pages.

*Primary Examiner* — Obafemi O Sosanya
(74) *Attorney, Agent, or Firm* — Foley & Lardner LLP

(57) ABSTRACT

A lock box including a main body, a lid, an electronic locking mechanism, a lid sensor, and a processing circuit. The main body defines a compartment. The main body is structured to be secured within or secured to a substantially permanent structure. The lid is positioned to selectively enclose the compartment. The electronic locking mechanism is positioned to selectively lock the lid to the main body. The lid sensor is configured to detect at least one of an attempt to open the lid or opening of the lid. The processing circuit is configured to generate an alert in response to the lid sensor detecting the at least one of the attempt to open the lid or the opening of the lid.

20 Claims, 53 Drawing Sheets

Related U.S. Application Data continuation of application No. PCT/US2014/029120, filed on Mar. 14, 2014.

(60) Provisional application No. 61/800,906, filed on Mar. 15, 2013.

(52) U.S. Cl.
CPC ..... *G08B 13/19669* (2013.01); *G08B 29/185* (2013.01); *H04N 5/23206* (2013.01); *H04N 5/23216* (2013.01); *H04N 5/23241* (2013.01); *H04N 7/188* (2013.01)

(58) Field of Classification Search
CPC ............ H04N 5/23241; G08B 13/1966; G08B 13/19667; G08B 13/19669; G08B 29/185
See application file for complete search history.

(56) References Cited

U.S. PATENT DOCUMENTS

| | | |
|---|---|---|
| 2004/0085202 A1 | 5/2004 | Naidoo et al. |
| 2005/0104730 A1 | 5/2005 | Yang |
| 2008/0162133 A1 | 7/2008 | Couper et al. |
| 2008/0240458 A1 | 10/2008 | Goldstein et al. |
| 2009/0141117 A1 | 6/2009 | Elberbaum |
| 2009/0307349 A1 | 12/2009 | Harris et al. |
| 2010/0176919 A1* | 7/2010 | Myers ................ G07C 9/00571 340/5.73 |
| 2011/0096168 A1 | 4/2011 | Siann et al. |
| 2013/0084800 A1* | 4/2013 | Troberg .................. H02J 5/005 455/41.1 |
| 2013/0144428 A1* | 6/2013 | Irwin ................. G06Q 10/0836 700/218 |

\* cited by examiner

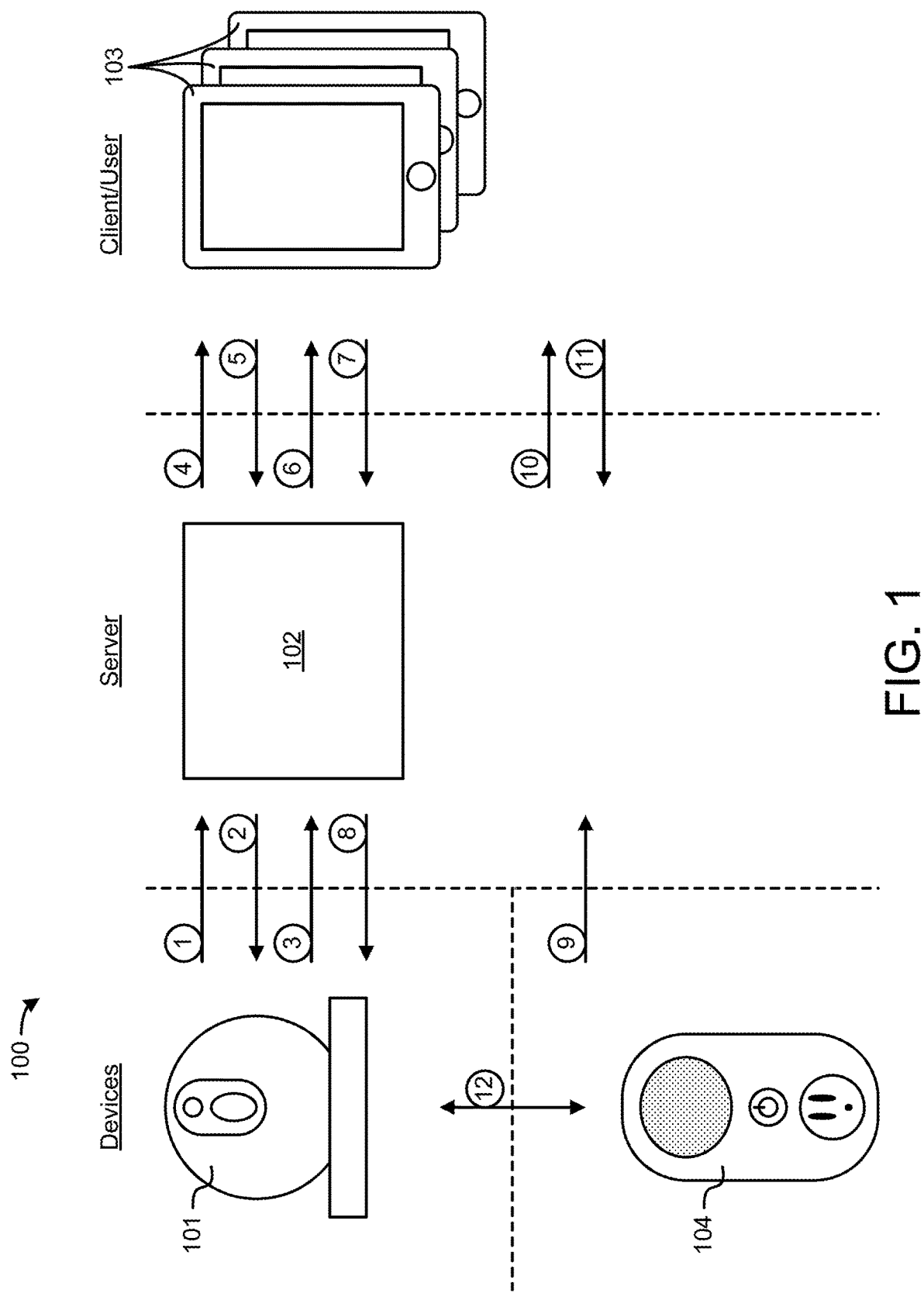

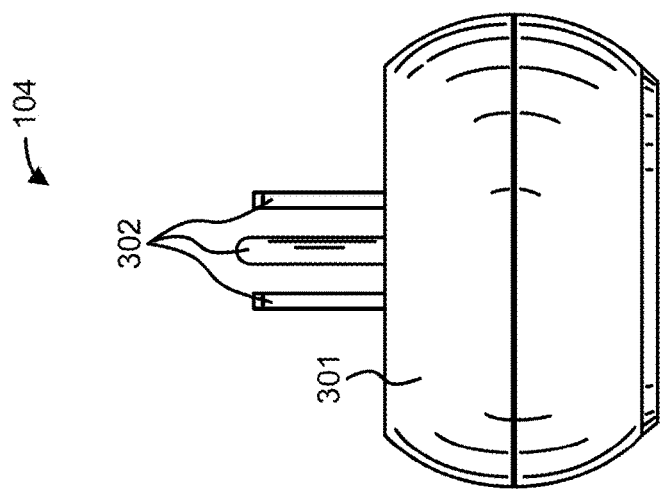
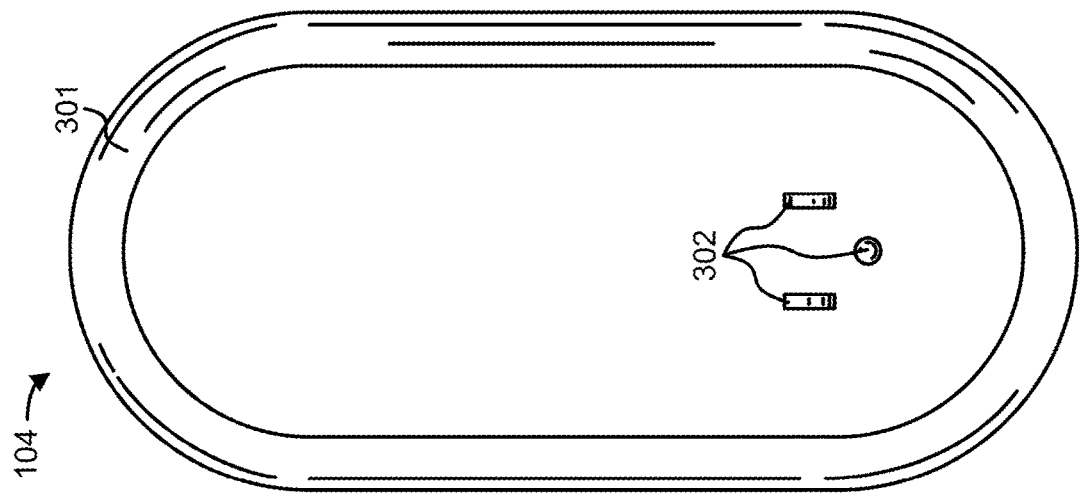
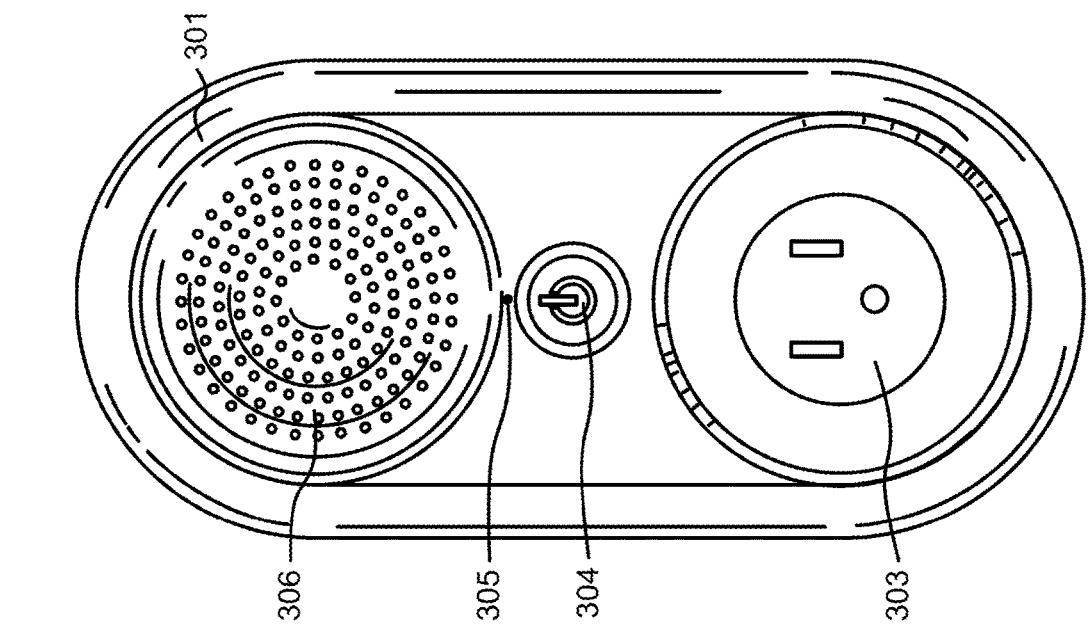
FIG. 3E
FIG. 3D
FIG. 3C

900 →

Notification Schedule: John's Office

| 901 User | 902 Delay Time (min) | 903 Notification Channel | |
|---|---|---|---|
| 905 John Smith (owner) | 906 0 ▼ | 907 SMS, email | edit 908 |
| Karl (Tier 1) | 5 ▼ | SMS | edit 908 |
| Michelle (Tier 1) | 7 ▼ | telephone | edit |
| Jimmy (Tier 2) | 10 ▼ | email | edit |
| Anita (Tier 2) | 10 ▼ | email | edit |
| Joe (Tier 3) | 20 ▼ | SMS, telephone | edit |
| Robert (Tier 3) | 20 ▼ | email, fax, SMS | edit |
| Kristen (Tier 3) | 25 ▼ | SMS | edit |

904

909 — Add/Remove User

FIG. 9

NETWORKED AND CAMERA ENABLED LOCKING DEVICES

CROSS-REFERENCE TO RELATED PATENT APPLICATIONS

This application is a continuation of U.S. patent application Ser. No. 14/853,914, filed Sep. 14, 2015, which is a continuation of PCT Application No. PCT/US2014/029120, filed Mar. 14, 2014, which claims the benefit of and priority to U.S. Provisional Patent Application No. 61/800,906, filed Mar. 15, 2013, all of which are incorporated herein by reference in their entireties.

BACKGROUND

Connected security sensors such as camera units and automatic switch units can be coupled to networks and transmit status information and event data to remote monitoring sites. Social networking platforms are becoming an increasingly popular way for individuals, organizations, and entities to communicate with each other. Combining connected security sensors with aspects of social networking platforms will result in efficient remote event detection, monitoring, and reporting.

SUMMARY

One embodiment of the present disclosure relates to a system including a remote server and a device having a wireless transceiver, a microphone, and a processing circuit configured to monitor the microphone for a siren signature. The processing circuit is configured to use the wireless transceiver to send information to the remote server in response to a detection of the siren signature. The remote server causes wireless cameras located near the device to capture a current image and to send the captured image to the remote server for further distribution.

In the above described embodiment, the monitoring for the siren signature may be conducted without storing recorded audio. Audio received at the microphone may be processed locally and not forwarded to a remote server. The device may be at least one of a wireless camera and a wireless switch device. The wireless cameras may be configured to provide short videos to the remote server prior to the remote server providing notice of the alarm to a remote user device. The wireless cameras may be configured to sound an alarm upon receiving the request to capture the current image. The wireless cameras may be, by default, in a powered down state until the cameras wake to check-in with the remote server for a request, and the remote server may provide the capture command to the wireless cameras in response to the check-in by the wireless cameras. The remote server may be configured to provide a fire alert to a group of subscribed users comprising a fire department electronic address.

Another embodiment of the present disclosure relates to a wireless camera including a wireless transceiver and a timer circuit which provides an interrupt to the wireless transceiver. The wireless transceiver transitions from a low power state to an enabled state in response to the interrupt. The wireless transceiver is caused to transmit a check-in signal to a remote server via the wireless transceiver after transitioning into the enabled state. The wireless transceiver receives a response and conducts at least one camera activity using the response. The wireless transceiver returns to the low power state.

The above described embodiment may further include an infrared motion detector. The wireless transceiver may be configured to transition from the low power state to an enabled state in response to receiving an interrupt from the infrared motion detector. The wireless transceiver may be configured to transmit a notification to the remote server upon waking due to the motion detection interrupt. The wireless transceiver may also be configured to cause video to be recorded during a period of time. The wireless transceiver may also check for a cancellation signal at the end of the period of time and the camera may delete the recorded video when a cancellation signal is received. The camera may also transmit the video to the remote server when the cancellation signal is not received. The period of time may be predetermined, user adjustable or provided by the server. In some embodiments, the period of time is less than two minutes. In other embodiments, the period of time is less than one minute.

Another embodiment of the present disclosure relates to a system including a remote server and a wireless camera. The wireless camera includes a wireless transceiver and a timer circuit which provides an interrupt to the wireless transceiver. The wireless transceiver transitions from a low power state to an enabled state in response to the interrupt. The wireless transceiver is caused to transmit a check-in signal to the remote server via the wireless transceiver after transitioning into the enabled state. The wireless transceiver receives a response and conducts at least one camera activity using the response. The wireless transceiver returns to the low power state. The remote server is configured to receive a user command for the wireless camera to capture video from a user device. The remote server waits for the check-in signal from the wireless camera and responds with the capture request.

In the above described embodiment, the remote server may provide the user device with a notification once the video capture has been received from the wireless camera. The video may also be deleted from camera memory after the camera receives an indication that the transfer to the remote server is complete. The remote server may also be configured to receive a request from the user device to be provided the video, and the remote server may be configured to cause the video to be provided to the user device in response to the request. The remote server may also be configured to receive an indication that the video relates to an alarm event, and the remote server may provide a notification to additional user devices in response to the indication that the video relates to the alarm event. The remote server may also be configured to provide any new device settings to the wireless camera in response to the check-in.

Another embodiment of the present disclosure relates to a server for operation with a wireless camera at a remote location. The server receives an event detection alert from the wireless camera. The server waits a period of time and determines whether the wireless camera has been deactivated. The server transmits a cancellation signal to the wireless camera if the camera has been deactivated during the period of time.

The above described embodiment may further include the server deleting the video if a deactivation signal is received within a second period of time after receiving a video file from the wireless camera. The server may also publish the video on a user device if the deactivation signal is not received within the second period of time. The above described embodiment may further include providing a notification to the user that the video has been received and is available for viewing.

Another embodiment of the present disclosure relates to a social media alarming system. The social media alarm system includes a server computer which receives video information from a wireless camera associated with a user. The server computer provides a graphical user interface for creating multiple tiers of associated users. The server computer causes an alert to be forwarded to different tiers of associated users depending on the length of time from receiving the video and receiving no action from a user regarding the video.

In the above described embodiment, the server may be configured to provide a graphical user interface which allows a user to adjust the length of time for each tier and/or for each user. The tiers may be automatically built by the server computer based on geographic distance from the wireless camera.

Another embodiment of the present disclosure relates to a social media alarming system. The social media alarming system includes a server computer configured to allow a user to share his or her wireless camera events with a community of users. The server computer is configured to provide a graphical user interface comprising a dashboard of camera events for the community of users.

In the above described embodiment, the server may automatically build the community of users based upon geographic distance from the wireless camera generating the event. The graphical user interface may include options for causing the server to forward alerts to a security service. The server computer may track activity by users in reviewing other users' video alerts, and the server computer may associate an incentive amount to a user account based on the tracked activity.

Another embodiment of the present disclosure relates to a wireless camera. The wireless camera includes a wireless transceiver, a motion sensor, and a circuit coupled to the wireless transceiver and the motion sensor, the circuit configured to detect motion using the motion sensor. The circuit is configured to notify a remote server of the detected motion and to provide video to the remote server. The circuit is configured to listen at the wireless transceiver after providing the notification. The wireless camera is configured to play a default audio alert if no further information is received from the server and wherein the wireless camera is configured to play a custom audio alert if further information is received within a period of time.

In the above described embodiment, a server computer for use with the wireless camera may be configured to provide a graphical user interface for allowing a user to enter the custom audio alert.

Another embodiment of the present disclosure relates to a wireless camera system. The wireless camera system includes a computing device separate from the wireless camera and a wireless camera having a motion detector. The computing device displays a walk-through menu for conducting user calibration of the motion detector.

In the above described embodiment, the walk-through menu may instruct the user to make an intended alarm motion during a first period of time and to make no intended motion during the second period of time. The computing device may compute a motion threshold by comparing motion data associated with the intended alarm motion versus motion data associated with the second period of time. The computing device may be a remote server or a portable electronic device.

Another embodiment of the present disclosure relates to a distributed city security system. The distributed city security system includes a plurality of wireless cameras in different locations associated with different households and a server computer configured to distribute alert information to a first geographic tier away from a wireless camera generating the alert. The server computer is configured to distribute alert information to a second geographic tier away from the wireless camera if: (a) at least one user in the first tier indicates the alert is of interest, or (b) no user in the first tier acknowledges viewing the alert within a certain period of time.

In the above described embodiment, wireless cameras within the first geographic tier may be caused to capture video and to provide the video to the server for distribution within a user or geographic tier associated with the source wireless camera. Distribution to further tiers may be discontinued unless a threshold amount of users indicates interest in the alert during a period of time Another embodiment of the present disclosure relates to a wireless camera. The wireless camera includes a wireless transceiver for connecting to an access point near the wireless transceiver, an audio output element, and a circuit configured to cause an audio output element to indicate whether the signal connection to the access point is reliable.

Another embodiment of the present disclosure relates to a wireless camera. The wireless camera includes a wireless transceiver for connecting to an access point near the wireless transceiver, an audio output element, and a circuit configured to cause the audio output element to indicate whether the signal connection to the access point meets a threshold quality. The camera may not include a display screen.

Another embodiment of the present disclosure relates to a system including a wireless camera configured for normal operation with a remote server via a wireless access point. The wireless camera directly connects to a portable electronic device near the wireless camera for setup.

In the above described embodiment, the setup may include streaming video to the portable electronic device. Camera settings may be adjusted via the portable electronic device using the streaming video. The wireless camera may not stream video during normal operation.

BRIEF DESCRIPTION OF THE DRAWINGS

The disclosure will become more fully understood from the following detailed description, taken in conjunction with the accompanying figures, wherein like reference numerals refer to like elements, in which:

FIG. 1 is an overview of a networked security system;

FIGS. 3A-E are detailed views of an exemplary embodiment of a switch unit;

FIG. 9 is a detailed view of an exemplary notification schedule as displayed on a graphical user interface;

DETAILED DESCRIPTION

Figure 2A:
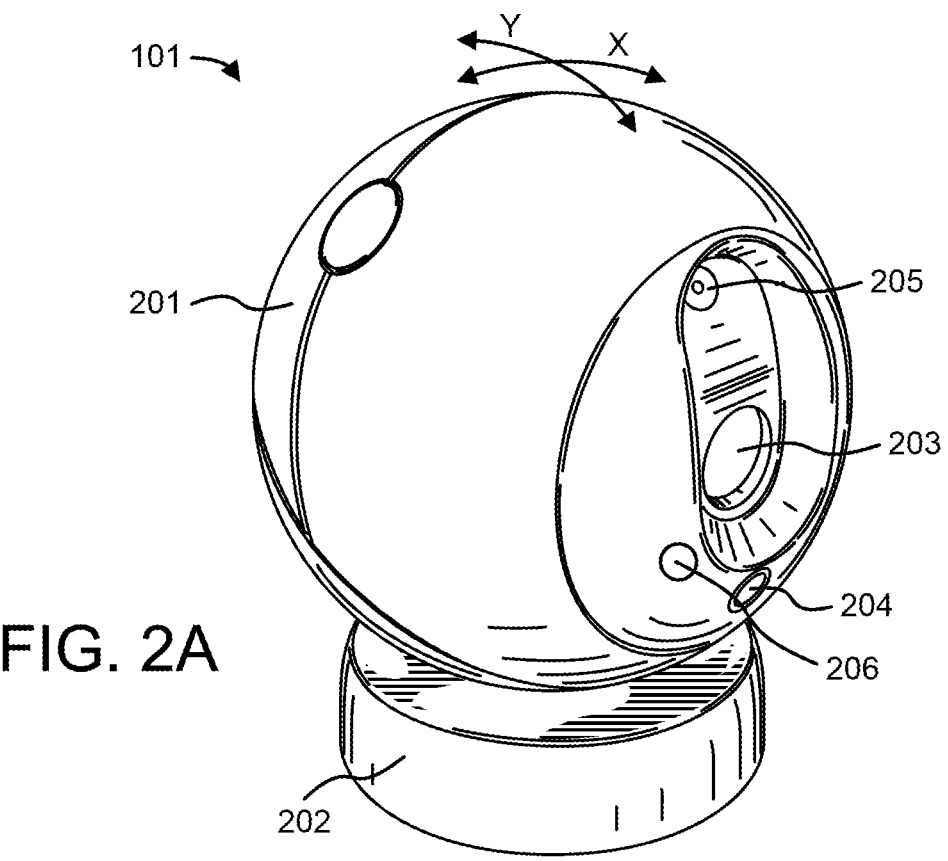
FIGS. 2A-H are detailed views of an exemplary embodiment of a camera unit.
Figure 2B:
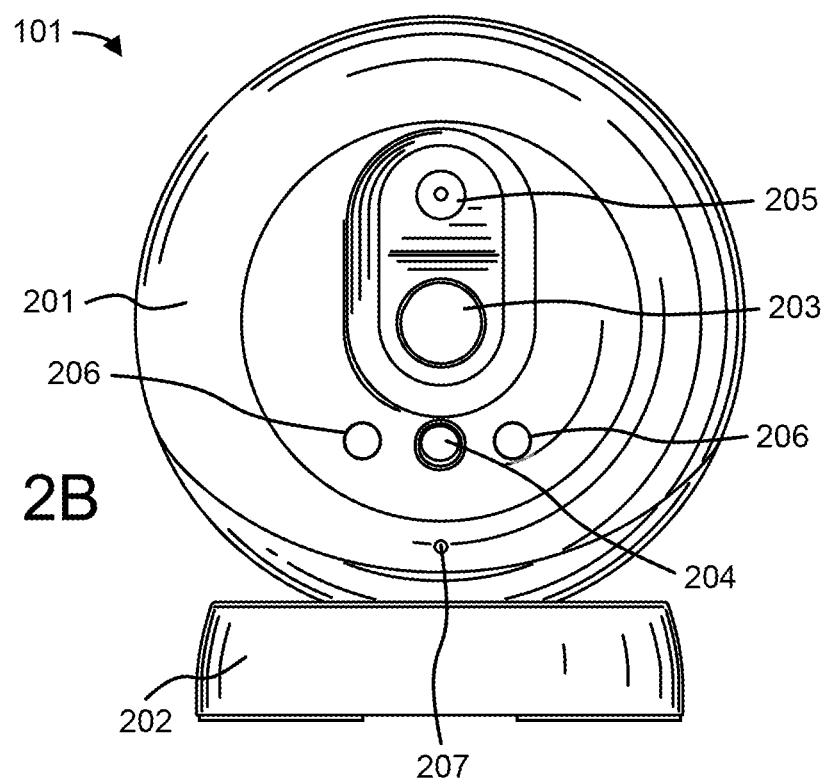
Figure 2C:
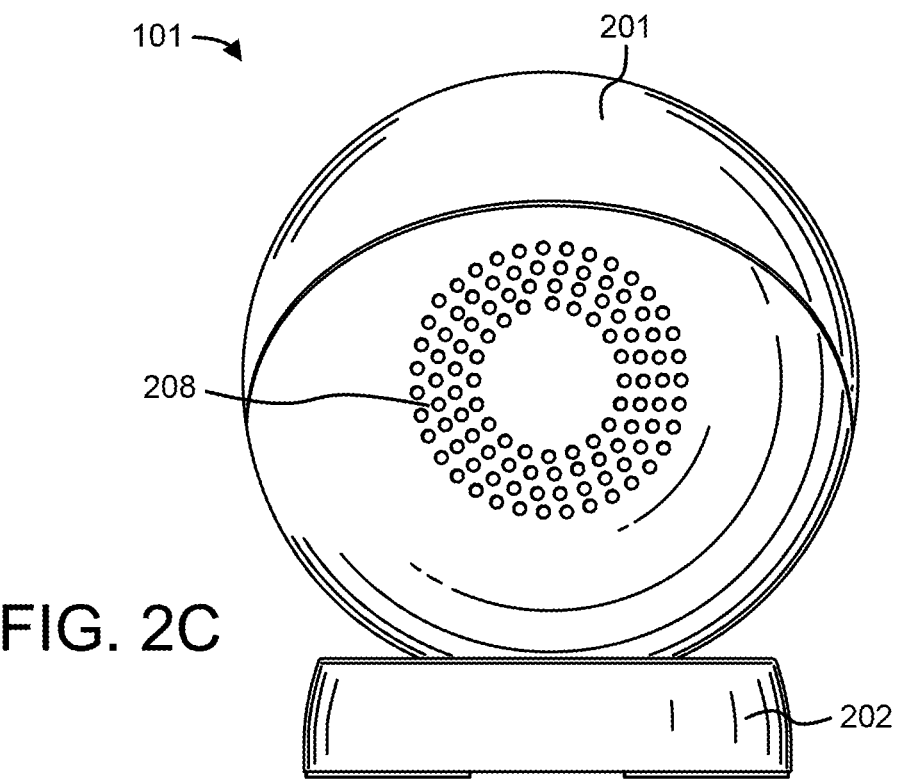
Figure 2D:
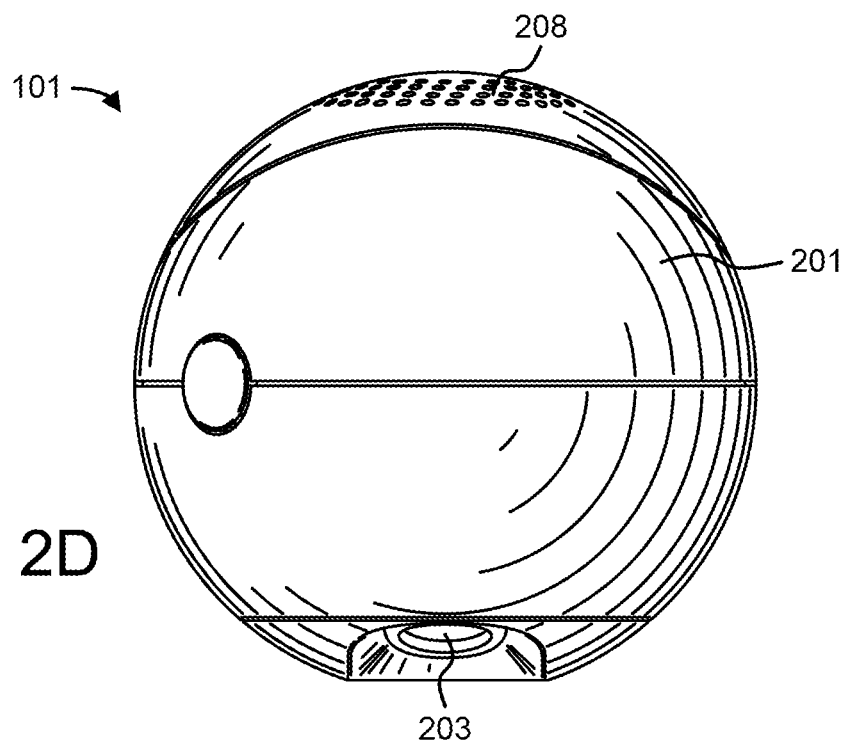
Figure 2E:
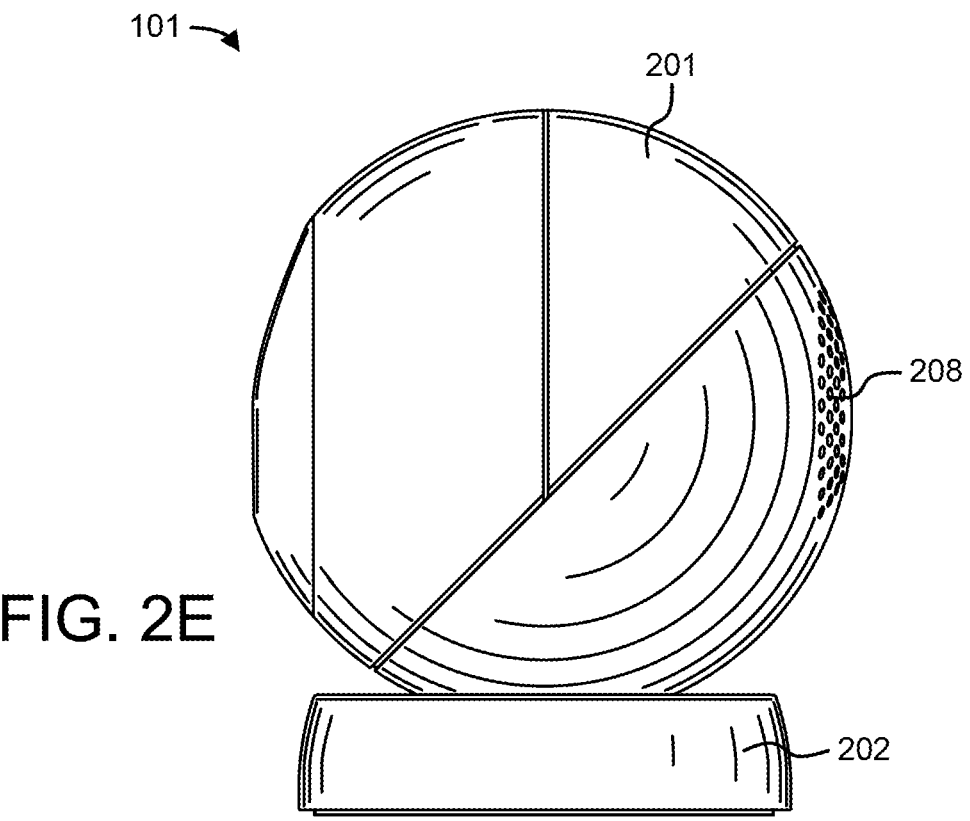
Figure 2F:
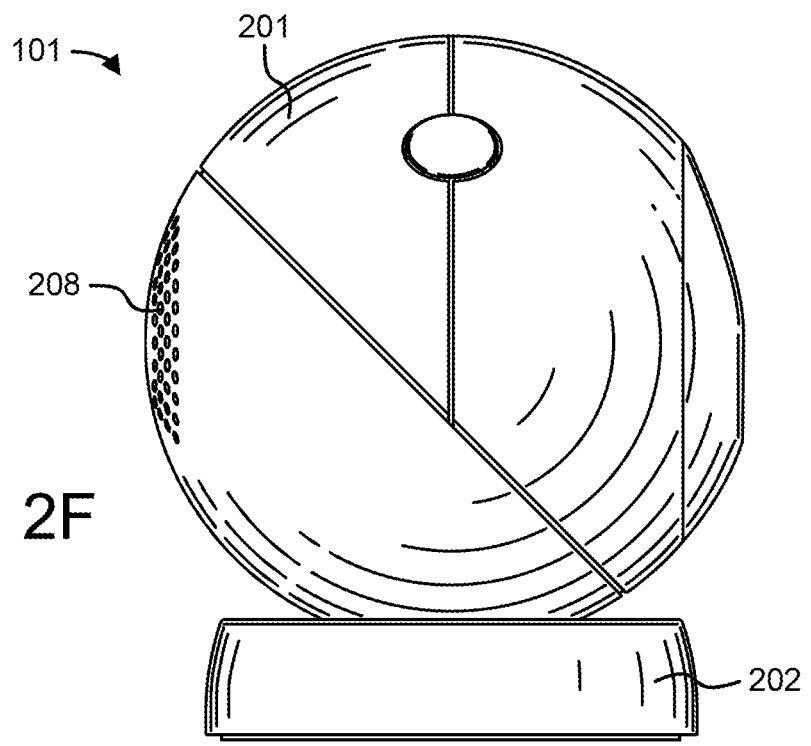
Figure 2G:
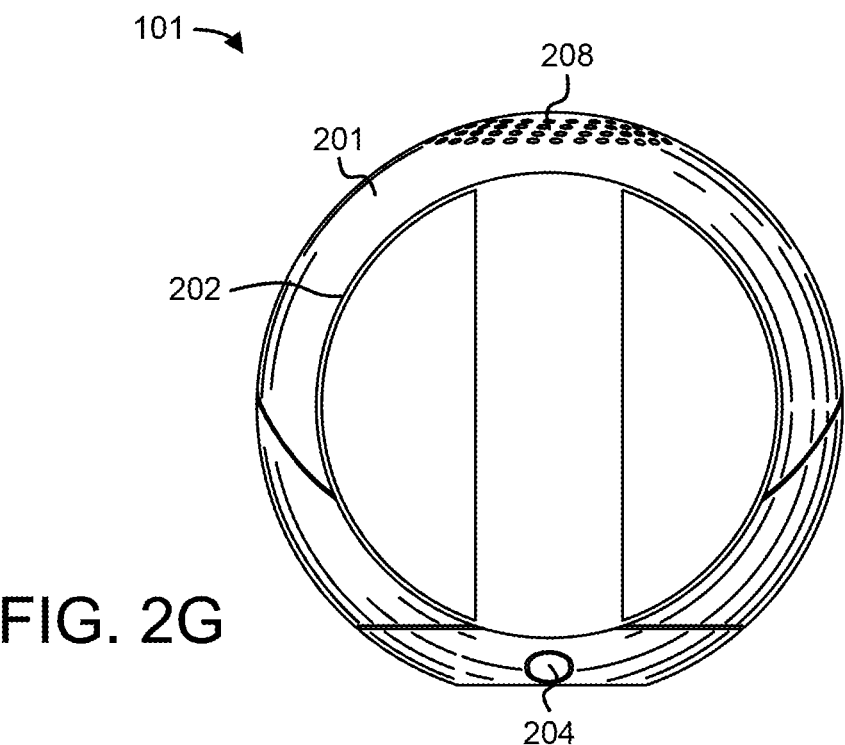
Figure 2H:
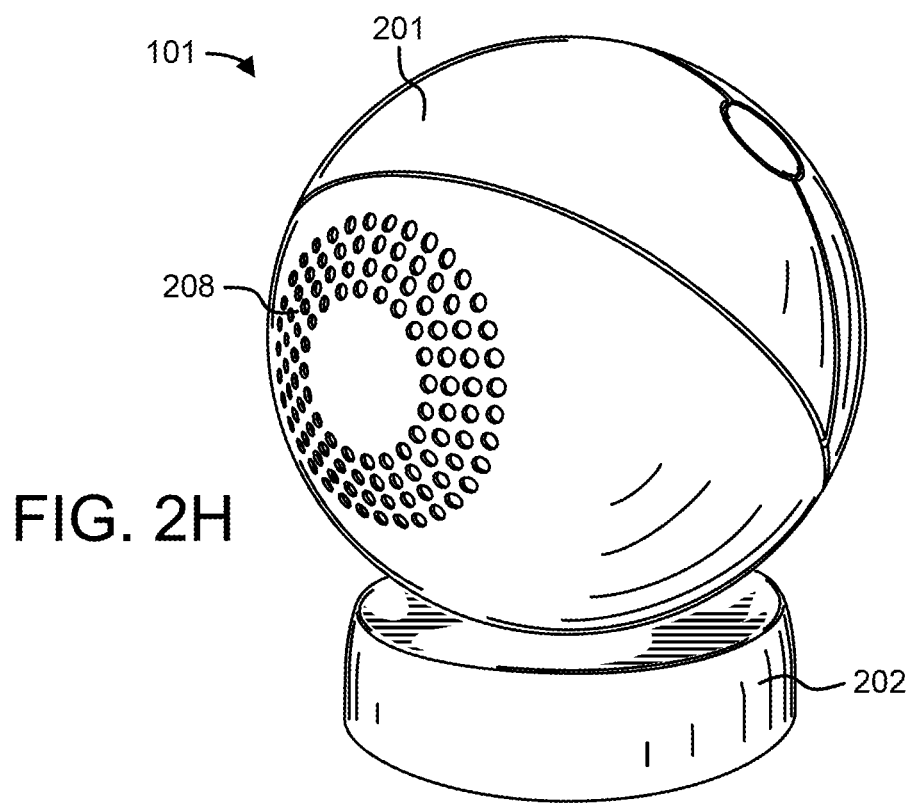

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Remote Device and Server Overview

Referring to FIG. 1, an overview of a networked security system 100 is shown. System 100 includes at least one camera unit 101, at least one server 102, and at least one client device 103. Optionally, system 100 includes at least one switch unit 104. Generally, system 100 operates to alert a user having a client device 103 of events detected by camera unit 101, switch unit 104, and other networked security devices. System 100 further provides event data of the detected event to at least one client device 103. Event data and alerts are organized through an online user interface.

Camera unit 101 is generally a battery operated camera including a camera component and a motion detector. Camera unit 101 includes a network interface for communicating with server 102 such that camera unit 101 sends data to and receives data from server 102. Camera unit 101 is operable to detect motion, capture video data, compress the video data, upload the video data to server 102, receive commands from server 102, and execute the commands. Further, camera unit 101 is configurable to communicate with other devices on camera unit 101's local area network (e.g., another camera unit 101 or a switch unit 104 connected to the same access point or router). Camera unit 101 and its operation are discussed below with respect to FIGS. 2A-M in greater detail.

Client device 103 includes network interfaces for communicating with server 102. Client device 103 enables a user of system 100 to receive data from and send data to server 102. Client device 103 generally includes a display operable to present a user an interactive graphical user interface for accessing system 100. Client device 103 also includes a user input mechanism (e.g., touch screen, keyboard, etc.) operable to receive input from a user. Client device 103 may be a cell phone, a PDA, a smartphone, a tablet computing device, a smart television, a laptop computer, a desktop computer, or any other network connected device configurable to alert a user and to display event information. It should be appreciated that a user may access system 100 through multiple client devices (e.g., a mobile phone and a laptop). Client device 103 is discussed below with respect to FIGS. 5A-B in greater detail.

Server 102 includes at least one storage unit and a network interface for communicating with camera unit 101, switch unit 104, and client device 103. Server 102 stores video data received from camera unit 101 and alarm data from switch unit 104. Server 102 further stores client device 103 information and user account information. Server 102 includes software of system 100, including software to generate interactive graphical user interfaces presented to users of system 100 through client device 103. Further details of server 102 are discussed below with respect to FIGS. 4A-F.

System 100 optionally includes switch unit 104. Switch unit 104 includes a power input and a power output. Switch unit 104 further includes a speaker and a microphone. Switch unit 104 includes a network interface that enables data transmission to and from server 102. Switch unit 104 is configured to detect an audible alarm. Switch unit 104 is configured to activate an electrical load plugged into the power output based on a detected alarm. Switch unit 104 can activate an electrical load plugged into the power output based on a user command. Further, switch unit 104 can activate an electrical load plugged into the power output based on a command from another device (e.g., from camera unit 101). Switch unit 104 is further configured to upload audio data to server 102. Switch unit 104 is capable of emitting audio based on received data from server 102. Additional details of switch unit 104 and its operation are discussed below with respect to FIGS. 3A-H.

Referring again to FIG. 1, a flow diagram providing an overview of the operation and interaction between components of system 100 is shown. Camera unit 101 is placed at a location (e.g., a user's home or office). Camera unit 101 is registered with server 102 and is linked with a user account stored on server 102. The location of camera unit 101 and the association with the user account are stored in server 102. The user accesses his or her account information and device information through at least one client device 103, which presents the user with interactive graphical user interfaces for system 100. The user account further includes event notification preferences, which are stored on server 102.

Camera unit 101 is configured to detect an event occurring at the location using a motion detector. Upon detection of the event, camera unit 101 notifies server 102 of the detection (step 1) and begins capturing a video using a camera component. In some instances, server 102 may instruct camera unit 101 to stop recording (step 2). For example, a user may have indicated that camera unit 101 is not to record during a designated time period. If no stop command is received during step 2, camera unit 101 finishes recording the video data, compresses the video data, and uploads the video data to server 102 (step 3). Server 102 associates the video and event notification with the appropriate user accounts. Server 102 initiates an alert to the appropriate users through client device 103 (step 4).

The alert generally includes an identification of camera unit 101, as well as an option to view event video recorded by camera unit 101 or be directed to a viewing page. The user indicates to server 102 through client device 103 whether the user wishes to view the video, dismiss the alert, delete the event, leave a comment pertaining to the event, or perform another action associated with the event (step 5). If the user wishes to view the video, server 102 provides client device 103 the video data (step 6). The video data is streamed from server 102 to client device and presented to the user through the graphical user interface. Alternatively, the event video data is completely downloaded to client device 103.

The user may send additional instructions intended for remote devices (e.g., camera unit 101 or switch unit 104) to server 102 via client device 103 (step 7). For example, the user may send a command to server 102 to instruct camera unit 101 to stop detecting and recording events. Alternatively, the user may instruct server 102 to instruct camera unit 101 to capture additional video data. Server 102 provides the user instructions to camera unit 101 (step 8). Camera unit 101 responds to user commands from client device 103 that are relayed by server 102.

Switch unit 104 is configured to detect an audible alarm through a microphone. Upon detection of an audible alarm, switch unit 104 notifies server 102 of the detection (step 9) and activates a connected electrical load (e.g., a light unit). Server 102 associates the event notification with the appropriate user account. Server 102 initiates an alert to the user through client device 103 (step 10). Server 102 may receive a command from client device 103 to initiate a two-way audio communication between client device 103 and switch unit 104 (step 11). Further, if system 100 includes switch unit 104, switch unit 104 and camera unit 101 can be configured to communicate with each other directly (e.g., by sending commands directly to another device through the access point of the local area network) or indirectly (e.g., by relaying commands through server 102) (step 12). Communication between camera unit 101 and switch unit 104 enables activation or deactivation of an electrical load attached to switch unit 104 upon the detection of an event by camera unit 101 or the capturing of video data by camera unit 101 upon the detection of an audible alarm by switch unit 104.

Camera Unit

Referring to FIGS. 2A-H, detailed views of camera unit 101 are shown. Camera unit 101 includes housing 201 and base 202. Camera unit 101 further includes camera sensor 203 and motion detector 204. Camera sensor 203 is a charge-coupled device, a complementary metal-oxide semiconductor active pixel sensor, or another type of camera sensor. Light exposure settings of camera sensor 203 are adjustable to enable high and low light video recording. Motion detector 204 is any of a passive infrared sensor, a radio-frequency field sensor, a microwave radar sensor, an ultrasonic sensor, a vibration sensor, or any other sensor configured to detect motion. Housing 201 is rotatable about base 202 along axis X and axis Y. The rotational movement of housing 201 facilitates base 202 mounting on a wall or a ceiling and camera sensor 203 to be rotated in order to capture a designated viewing area. In some embodiments, camera unit 101 includes camera sensor 203 and motion detector 204, and does not include additional components such as an ambient light sensor, a microphone, or LED lights. Optionally, camera unit 101 includes ambient light sensor 205 and LEDs 206. During a recording operation, ambient light sensor 205 detects the ambient light level such that LEDs 206 are turned on during low ambient light situations to illuminate the area being recorded or kept off when the ambient light level is high enough. Alternatively or additionally, settings of camera sensor 203 are adjusted in response to the output of ambient light sensor 205. Camera unit 101 also optionally includes microphone 207 for recording audio. In another embodiment, camera unit 101 includes a movement sensor configured to detect camera unit 101 movement as a trigger for capturing a video and sending an alert to server 102. The movement sensor may be a tilt sensor, a vibration sensor, a shock sensor, a shake sensor, an acceleration sensor, or a combination of any of the above. In yet another embodiment, camera unit 101 includes speaker 208 that enables audio to be played and/or two-way communications with a remote device if camera unit 101 also includes a microphone.

Figure 2I:
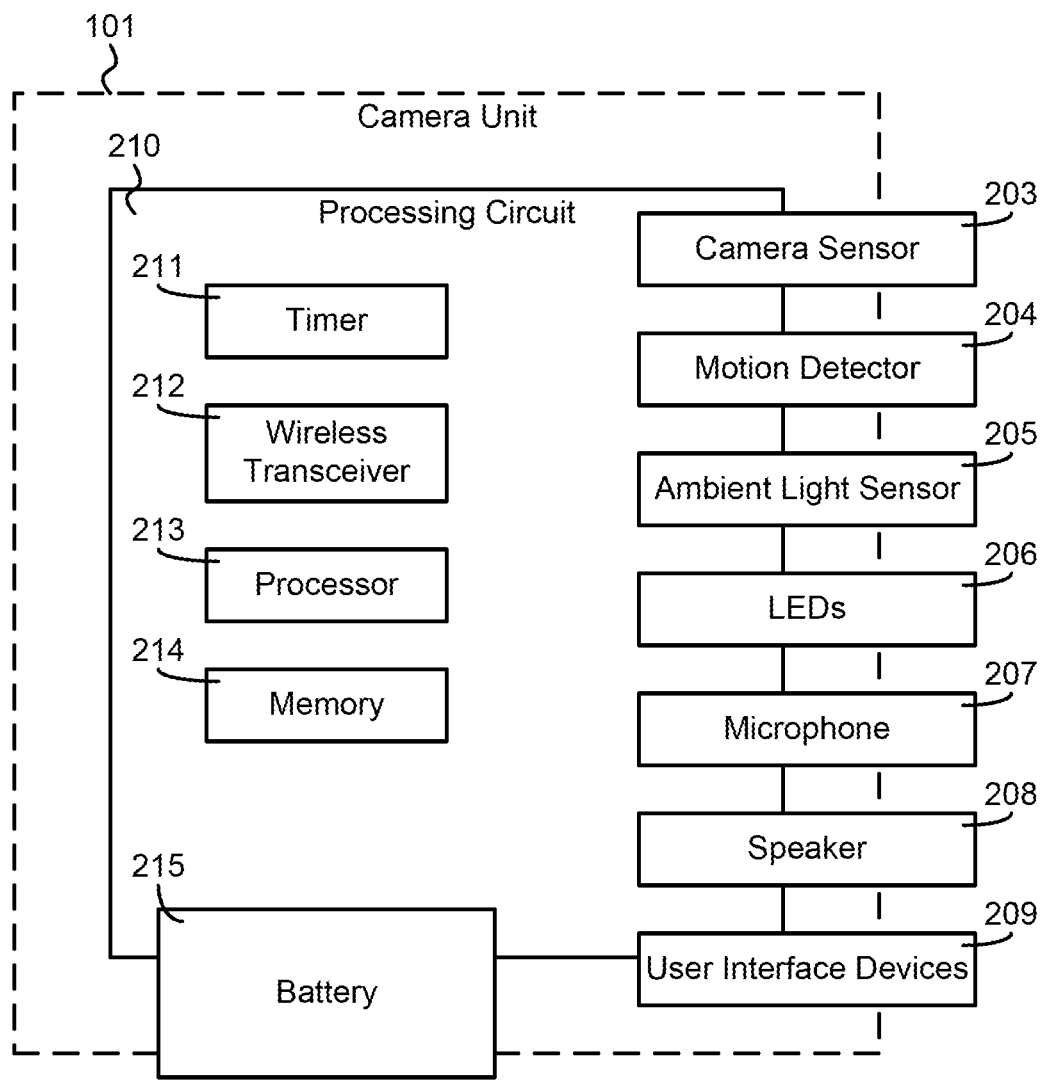
FIG. 2I is a block diagram of the camera unit.

Referring to FIG. 2I, a block diagram of camera unit 101 is shown. Camera unit 101 includes processing circuit 210. Processing circuit 210 controls the operation of camera unit 101. Accordingly processing circuit 210 includes at least timer 211, wireless transceiver 212, processor 213, and memory 214. Wireless transceiver 212 is configured to send and receive data to and from server 102 and to and from other devices (e.g., switch unit 104) located on the local area network. Wireless transceiver 212 may utilize at least one version of the 802.11 standard networking protocol (e.g., 802.11a/b/g/n). Alternatively, wireless transceiver 212 utilizes other networking standards, including, but not limited to CDMA, GSM, LTE, Bluetooth®, ZigBee®, and 802.15. In an alternate configuration, camera unit 101 includes multiple wireless transceivers to provide broader network compatibility. In this arrangement, a user can select which radios are active, and which radios are to remain dormant. Processing circuit 210 includes and/or communicates with camera sensor 203, motion detector 204, and user interface devices 209. Processing circuit 210 may also include and/or communicate with optional devices such as ambient light sensor 205, LEDs 206, microphone 207, speaker 208, and/or user interface device 209. Memory 214 stores video data, operating instructions, and any necessary software modules. Camera unit 101 may accept and utilize removable memory media (e.g., SD or MicroSD memory cards) for additional storage of video data. Camera unit 101 is powered by battery 215. Battery 215 may be rechargeable. Alternatively, camera unit 101 is powered via a wired connection.

Camera unit 101 is power efficient such that, under certain configurations, battery 215 can power camera unit 101 for significant lengths of time (e.g., months or years) without replacement or recharging. Many components of camera unit 101 remain in a low-power sleep-state throughout normal operation. Camera sensor 203, ambient light sensor 205, LEDs 206, microphone 207, speaker 208, wireless transceiver 212, and processor 213 normally operate in a low-power sleep mode. Motion detector 204 remains powered to detect events while camera unit 101 is active. If camera unit 101 is inactive, motion detector 204 enters a low-power sleep state as well. Upon detection of an event by motion detector 204, an interrupt is sent to wireless transceiver 212, which activates components, including camera sensor 203 and processor 213. Further, timer 211 remains powered and periodically provides a wakeup interrupt to wireless transceiver 212. Timer 211 is programmable to transmit interrupt signals to wake wireless transceiver 212 at designated time intervals. The designated time interval is adjustable. Timer 211 may be a low-power timer circuit including a crystal oscillator. Upon wakeup, wireless transceiver 212 transmits a check-in signal to server 102. Server 102 optionally replies to the check-in signal by sending operating instructions to wireless transceiver 212 which are then stored in memory 214. If instructions to conduct an active operation are not received, wireless transceiver 212 returns to sleep for the designated time interval. The process can then repeat.

Figure 2J:
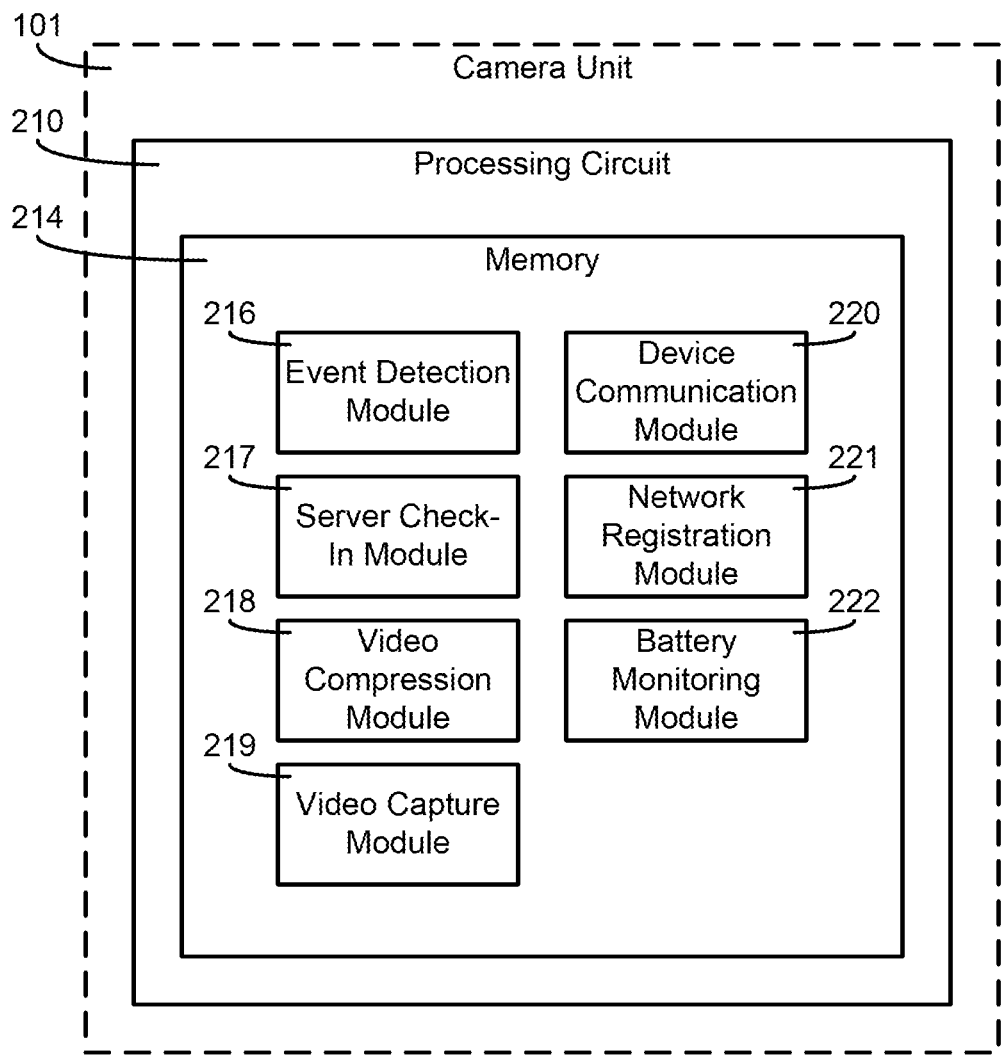
FIG. 2J is a block diagram of memory modules of the camera unit.

Referring to FIG. 2J, a block diagram of programming modules stored on camera unit 101 is shown. Modules are stored in memory 214 contained on processing circuit 210. The modules include all instructions necessary to operate camera unit 101. Such modules are shown to include: event detection module 216, server check-in module 217, video compression module 218, video capture module 219, device communication module 220, network registration module 221, and battery monitoring module 222. Event detection module 216 may be configured to detect an event based on information from camera sensor 203, motion detector 204, or ambient light sensor 205. Server check-in module 217 may be configured to manage instances in which server 102 transmits instructions to camera unit 101. Video compression module 218 may be configured to compress video to be provided to server 102. Video capture module 219 may be configured to capture video. Device communication module 220 may be configured to manage communications (wired or wireless) with server 102, switch unit 104, or other devices. Network registration module 221 may be configured to manage a registration of camera unit 101 with server 102. Battery monitoring module 222 may be configured to monitor the status of battery 215. Multiple modules may be used together. Modules 216-222 may generally support the activities of camera unit 101 as described in processes 230, 240, and 260 below.

Figure 2K:
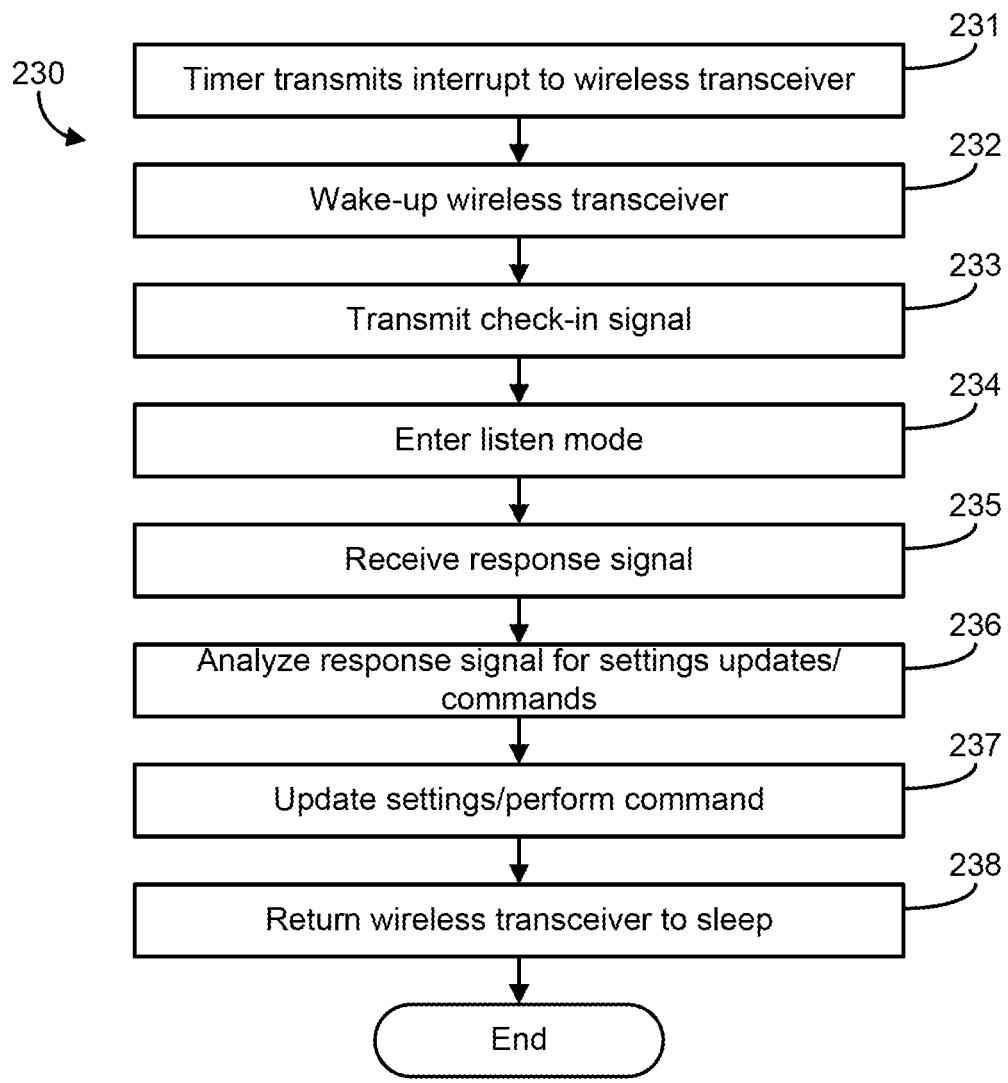
FIG. 2K is a flow diagram detailing the process of the camera unit checking in with a server.

Referring to FIG. 2K, a flow diagram of a process 230 of the device check-in process between camera unit 101 and server 102 is shown. Wireless transceiver 212 periodically wakes-up from the low-power sleep mode to check-in with server 102. The periodic check-in is a part of a process for causing camera unit 101 to maintain its association with the network access point (e.g., WiFi router) between camera unit 101 and server 102. Further, the periodic check-in can be used to transmit information such as battery information and network health information from camera unit 101 to server 102. Further, the periodic check-in provides the opportunity for server 102 to send commands and settings to camera unit 101. The commands can be or include capture requests and deactivation or activation of event detection module 216. The settings sent during the check-in period may be or include sleep timer interval, video length, video quality, camera sensor 203 light exposure setting, audio preference, and/or information pertaining to other devices on the network.

The check-in process begins when timer 211 sends wireless transceiver 212 an interrupt signal (step 231). Wireless transceiver 212 wakes from a low power or sleep mode upon receipt of the interrupt signal (step 232). After waking, wireless transceiver 212 transmits a check-in signal to server 102 (step 233). The check-in signal may include device identification data (e.g., device MAC address). Optionally, the check-in signal includes data pertaining to camera unit 101's global IP address, local IP address, battery voltage, ambient temperature, awake time, number of server check-ins performed, amount of video data captured, amount of video data compressed, amount of video data uploaded, and/or network health information. Certain pieces of the data may be included in all check-in signals, or only a portion of check-in signals (e.g., every 12 hours, every 24 hours, every 10th signal, every 100th signal, etc.). Wireless transceiver 212 enters a listen mode to wait for a response signal from server 102 (step 234). Server 102 may send a response signal to wireless transceiver 212 (step 235). The response signal is analyzed (step 236) if it is received. The response signal may contain new settings and commands. If new settings and/or commands are included in the response signal, the internal settings (e.g., sleep wake interrupt interval of timer 211) of processing circuit 210 are updated and/or commands (e.g., a capture and upload video command or deactivate event detection module 216) are performed (step 237). After any commands are performed and any new settings are updated, wireless transceiver 212 returns to sleep (step 238) and the check-in process repeats after the designated sleep wake interrupt interval.

In some embodiments, the response signal from server 102 is optional. In such embodiments, wireless transceiver 212 remains in listen mode for a short period of time (e.g., 50 ms-1 second) before automatically returning to sleep if no response signal is received from server 102. If a response signal is received from server 102, wireless transceiver 212 functions as in the same manner as described above. If no response signal is received, the settings of the previous sleep-wake cycle are kept (e.g., sleep interrupt timing interval of timer 211), and wireless transceiver 212 returns to sleep. In yet another alternative, the wireless access point to which camera unit 101 is connected to (e.g., a wireless router) holds signals from server 102 intended for camera unit 101 and provides the signals to camera unit 101 upon check-in.

Figure 2L:
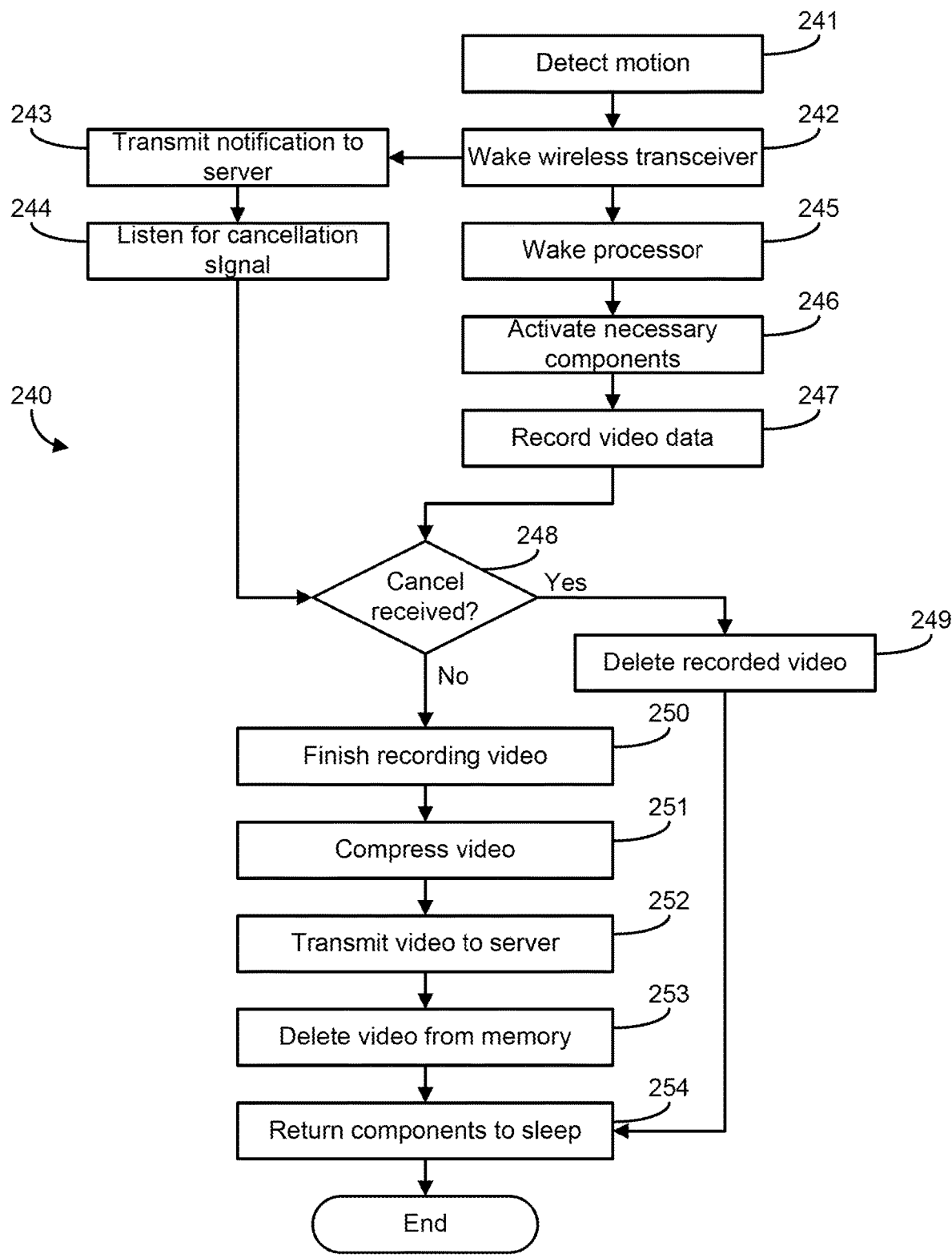
FIG. 2L is a flow diagram detailing the event detection process of the camera unit.

Referring to FIG. 2L, a flow diagram of a process 240 of camera unit 101 event detection and video upload is shown. Generally, upon detection of an event (e.g., detection of motion by motion detector 204), camera unit 101 is configured to notify server 102, to capture video through camera sensor 203, to compress the video data, and to upload the video data to server 102. More particularly, upon detection of the event (step 241), an interrupt is sent to wake wireless transceiver 212 from the sleep state (step 242). Wireless transceiver 212 transmits a notification to server 102 that indicates that an event was detected and that video data will be recorded (step 243). Wireless transceiver 212 enters a listen mode to listen for a cancellation signal or other instructions from server 102 (step 244). During or near in time to steps 242 and 243, processing circuit 210 prepares to record event video data. Accordingly, once wireless transceiver 212 wakes (step 242), wireless transceiver 212 sends an interrupt to processor 213, and processor 213 wakes (step 245). Processor 213 activates necessary components (step 246). The necessary components include at least camera sensor 203 and optionally includes ambient light sensor 205. If ambient light sensor 205 indicates a low light level, LEDs 206 are activated during recording and or camera sensor 203 settings are adjusted. Further, if audio is to be recorded (which may be selected by a user of system 100), microphone 207 is activated such that audio data is paired with the video data. Still further, speaker 208 is activated in circumstances where audio playback during a capture or during two-way audio is selected.

Camera sensor 203 begins to record video data (step 247). Video data is stored in memory 214. Video data is recorded at a VGA resolution. Alternatively, video data is recorded at a higher resolution (e.g., WVGA, SVGA, WSVGA, XVGA, WXVGA, 720p, 1080i, or 1080p). In an alternate embodiment, a first portion of the video is recorded at a first, high resolution setting (e.g., 720p, 1080i, or 1080p) and a second portion of the video is recorded at a second, low resolution setting (e.g., VGA). The first, higher resolution portion may provide the user viewing the video a clearer portion of the circumstances immediately following the trigger event. The second, lower resolution portion of the video provides continued video monitoring of the trigger event, while keeping the video file size relatively small. The duration of each segment is adjustable by the user of system 100 or is a standard setting. While the video is recording, wireless transceiver 212 continues to listen for a cancellation signal from server 102 (step 244).

If a cancellation signal is received (step 248), processing circuit 210 stops recording video and deletes any recorded video data originating from the event (step 249). Due to latency between camera unit 101 and server 102, there may be certain situations in which a user indicated that camera unit 101 should be inactive, but camera unit 101 did not receive the instruction until after the event was detected. After the video is deleted, processor 213, wireless transceiver 212, and any components turned on for the recording of and transmission of the video are returned to sleep (step 254). Further, camera unit 101 settings are updated if the cancellation signal includes updated settings. After all components are asleep, the process ends.

If a cancellation signal is not received, camera unit 101 finishes recording the video (step 250). The length of the video is determined by standard settings supplied by server 102 or by user preferences. As a standard setting, video files may be short in length (e.g., 5-10 seconds). Setting camera unit 101 to record a short video length reduces camera sensor 203 awake time, reduces video data compression time, reduces transmission time, reduces system latency, and increases battery life in comparison to a longer video length setting (e.g., 30 seconds). As noted above, captured video data may further include a varying resolution to provide a clear picture of the events immediately following the trigger event, while maintaining a small video file for quicker transmission.

Once the video is finished recording, the video data is compressed (step 251). Processing circuit 210 is programmed to compress video data according to H.264, MPEG-2, MPEG-4, or any other video compression format. The video data is compressed by processing circuit 210 according to a fixed setting every time video data is uploaded. In an alternate configuration, the compression settings are adjustable. System 100 may include a standard video compression format and settings. The user can select an alternative compression setting (e.g., a specific file type or to achieve a designated bit rate). In yet another arrangement, the compression is automatically adjusted based on a detected network status (e.g., upload speed, connection strength, network traffic, etc.). For example, camera unit 101 is configured to detect the maximum upload speed from the access point (e.g., the router to which camera unit 101 is connected) to server 102 and adjust the bit rate up or down depending on the connection bandwidth and changes in the connection bandwidth. Automatically adjusting the video compression bit rate may help ensure transmission success in situations of varying network capabilities or status.

After compression, the video file is transmitted to server 102 (step 252). Server 102 sends a confirmation signal indicating that the file transfer was successful. If the file transfer was unsuccessful, camera unit 101 attempts to send the file again. If the file transfer is again unsuccessful, camera unit 101 attempts to transmit the file to server 102 through a different mechanism of communication (e.g., through a cellular transceiver), to a backup server, or retains the file until the network connection is fixed. After a successful transmission, the video data is deleted from memory 214 (step 253), and any components turned on for the recording of and transmission of the video are returned to sleep (step 254). As discussed below with respect to FIGS. 4D-E, ordinarily, server 102 initiates a notification to the user associated with camera unit 101. Alternatively, camera unit 101 initiates an alert containing event information directly to client device 103. Optionally, a copy of the video data is stored on removable memory media (e.g., a SD memory card or a microSD memory card) prior to being deleted from onboard memory 214. After all components are asleep, camera unit 101 returns to event detection mode until another event is detected. Upon the detection of another event, the process repeats.

Optionally, camera unit 101 is configured to emit a sound upon detection of an event out of speaker 208. The sound is a siren (e.g., a fire alarm style buzzer), a loud noise, a standard message, or a customized user message. The sound is played immediately after the event is detected or after a predetermined delay (e.g., 1, 2, or 3 seconds). The predetermined delay is selected by the user. The sound data file may be pre-stored within memory 214 or may be received from server 102 (e.g., with response signal having a play command that is received by camera unit 101 after step 243). Depending on the type of sound, the sound achieves different functions. A siren or a loud noise may scare away an intruder or to cause the intruder to look at camera unit 101 such that camera unit 101 captures a clear view of an intruder's face. A standard system message alerts an intruder that video is being taken and the incident has been reported (e.g., "Alert! These premises are monitored by Master Lock! Video is being captured and the police will be alerted!"). A customized message can relate to any message to be conveyed to the person or animal triggering the event capture. For example, a user can utilize the event detection for a non-security related purpose. The user may wish to remind the person triggering the alert of a task, and the customized recorded message does so (e.g., "Welcome home, Joe. Remember to take the trash out."). Alternatively, the user may have camera unit 101 positioned in a room where a pet is not allowed. Accordingly, the user can program an audio message to the pet instructing the pet to leave the room (e.g., "Bad dog! Get out!").

Immediately following event detection situations, it may be desirable to have a lower than normal latency for camera unit 101. Upon receipt of video resulting from a trigger event (e.g., motion), it may be likely that a user viewing the video will want an additional video captured. If camera unit 101 maintains a longer sleep period, there may be a significant lag between a capture request and camera unit 101 receiving the command. Accordingly, upon event detection, timer 211 sends wireless transceiver 212 interrupt signals at a higher frequency than normal for a set duration of time. For example, if timer 211 ordinarily sends an interrupt signal to wireless transceiver 212 every 55 seconds, upon a trigger event, the timing can be adjusted such that timer 211 initiates the interrupt signal every 10 seconds for the next 10 minutes. This is an optional feature of system 100, and timing (both the frequency of timer interrupts and the duration of a higher frequency) is user or system 100 adjustable.

Figure 2M:
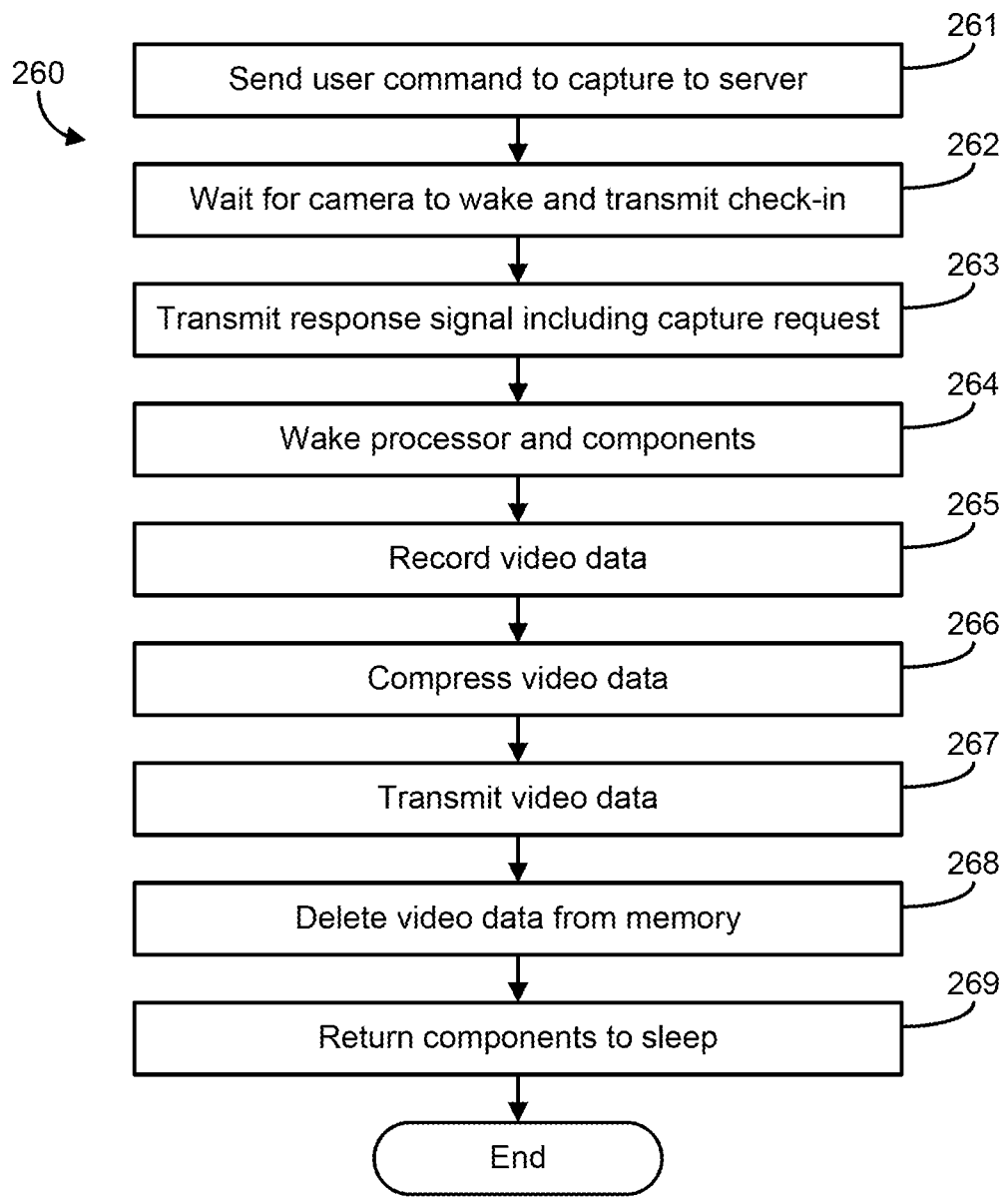
FIG. 2M is a flow diagram detailing the camera unit performing an on-demand video capture.

Referring to FIG. 2M, a flow diagram of a process 260 for camera unit 101 performing an on-demand video capture command is shown. An on-demand video capture command is sent by a user through client device 103 to server 102 (step 261). In an exemplary embodiment, client device 103 does not directly communicate with camera unit 101. Commands initiated by client device 103 are first sent to server 102 from a client device 103. In some embodiments, as described above, wireless transceiver 212 is normally in a sleep state and is only activated upon detection of an event or wake interrupt sent by timer 211. Commands from server 102 to camera unit 101 are embedded in server response signals sent during the camera check-in process (detailed above with respect to FIG. 2K). Accordingly, in these embodiments, server 102 waits for camera unit 101 to transmit a check-in signal (step 262) before transmitting the command to camera unit 101.

The wait time associated with step 261 causes latency or lag between the time of the initial user command (step 261) and the time the video is received by the client device 103. Latency of the camera unit 101 response time is based on the sleep wake interrupt interval of timer 211. A shorter time period reduces the latency of capture requests as it increases the frequency of camera unit 101 check-ins with server 102 at the expense of battery life (as components are active for a greater percentage of the battery's life).

After the server receives the check-in signal from the camera, the server transmits a response signal to camera unit 101 (step 263). The response signal may include the user command or commands to wake components, capture video, and upload the video to server 102. Upon receipt of the response signal containing the command, processor 213 and any necessary components wake from sleep mode (step 264). The necessary components include camera sensor 203 and optionally includes ambient light sensor 205. If ambient light sensor 205 indicates a low light level, LEDs 206 are activated during recording. Further, if audio is to be recorded (system 100 option selected by a user or server 102), microphone 207 is activated. Camera sensor 203 then records a video (step 265). The length of the video may be set by server 102, set by a user preference, or automatically determined (e.g., based on detected motion characteristics, based on the time of day, etc.). Once the video is finished recording, the video data is compressed (step 266). Processing circuit 210 is programmed to compress video according to H.264, MPEG-2, MPEG-4, or any other video compression format. After compression, the video file is transmitted to server 102 (step 267), where the video file is relayed to client device 103. Server 102 sends a confirmation signal indicating that the file transfer was successful. After a successful transmission, the video file is deleted from memory 214 (step 268), and any components turned on for the recording and transmission of the video are returned to sleep (step 269). After all components are asleep, the process ends.

In some embodiments, system 100 is configured to create periodic or scheduled video captures by camera unit 101. A user may program a future video capture request (e.g., on a particular date and time) or may schedule a recurring video capture request (e.g., every Monday at 2 pm) into server 102. Server 102 maintains a video capture schedule for each device and issues capture commands embedded in check-in response signals according to the schedule. Accordingly, steps 263-269 of FIG. 2M may be performed during periodic or scheduled video captures.

Switch Unit

System 100 may utilize remote devices in addition to camera unit 101. In an exemplary embodiment, system 100 is configured to have multiple remote devices and multiple types of remote devices associated with a single account. Referring to FIGS. 3A-E, switch unit 104 is shown. Switch unit 104 includes housing 301, power inlet 302, and power outlet 303. Power inlet 302 and power outlet 303 are shown as a grounded NEMA (National Electrical Manufacturers Association) type plug and socket. However, switch unit 104 can accept any type of plug and socket, including standardized and proprietary plug and socket configurations.

Power inlet 302 can have a first configuration and power outlet 303 can have a second, non-matching configuration such that switch unit 104 serves as a power converter and/or power adapter. Switch unit 104 is a power relay between a power source and a power load. For example, switch unit 104 can be plugged into a power outlet and receive the plug of an electrical device, such as a light. When certain conditions are detected by switch unit 104, switch unit 104 opens or closes the power circuit such that the light is turned on or off. Switch unit 104 further includes user input element 304. User input element 304 is a mechanical button, a mechanical switch, a capacitive touch sensor, or a resistive touch sensor. In operation, user input element 304 may be used during the device network registration process. Further, user input element 304 may be used as a manual override to activate or deactivate an electrical device plugged into power outlet 303. Switch unit 104 also includes microphone 305 and speaker 306. Microphone 305 is used to detect environmental noises. For example, and as discussed below, switch unit 104 is capable of detecting an audible alarm (e.g., fire alarm), and triggering an alert to server 102 and/or activating an electrical device plugged into power outlet 303. As shown in FIGS. 3A-E, switch unit 104 does not include additional sensors such as a motion sensor or an ambient light sensor; however, in other embodiments such sensors are optionally included.

Figure 3B:
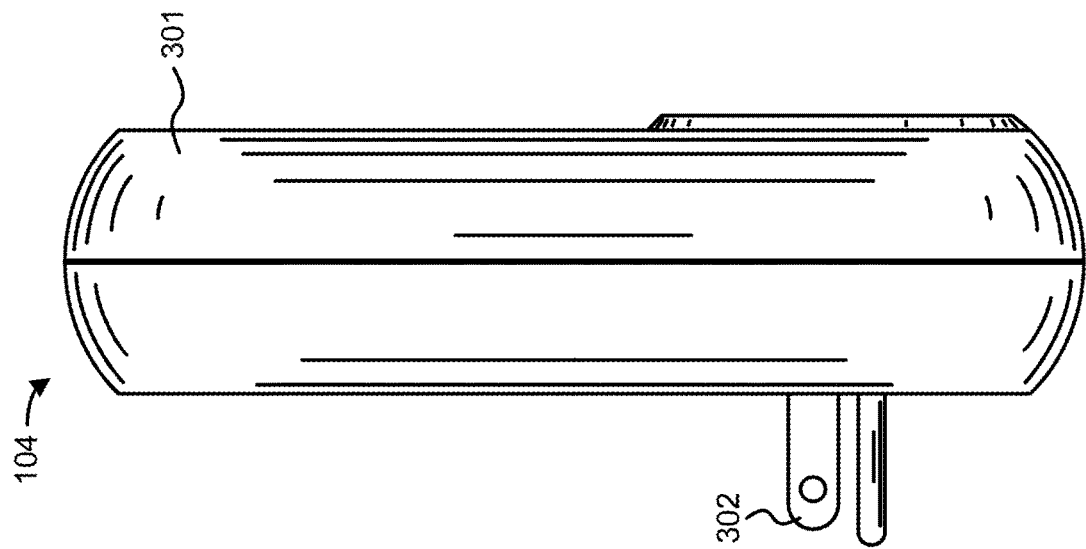
Figure 3A:
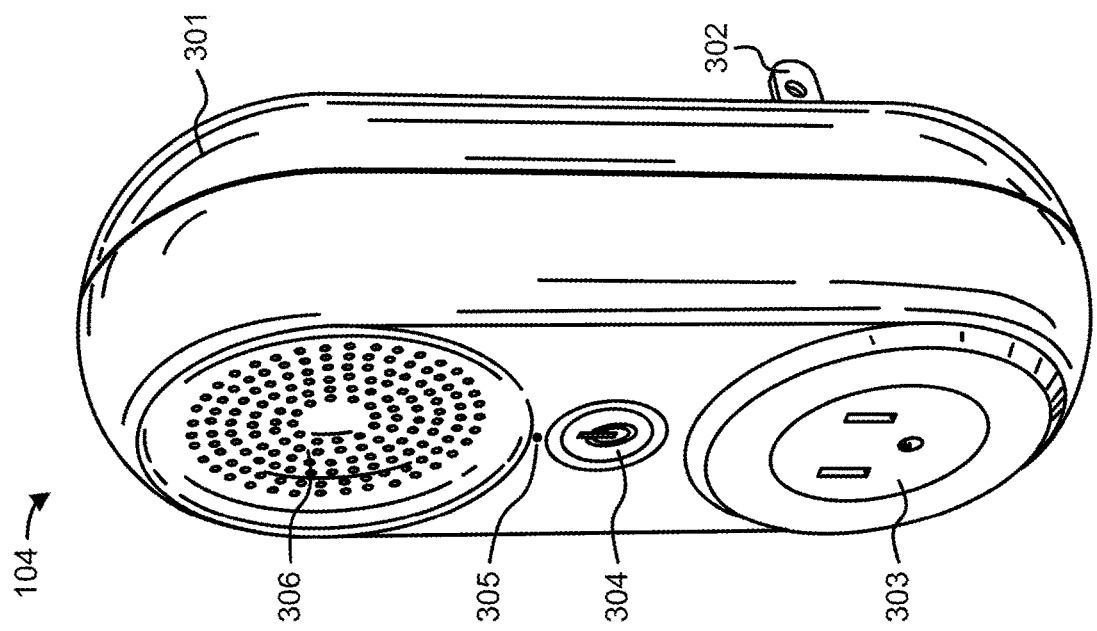
Figure 3F:
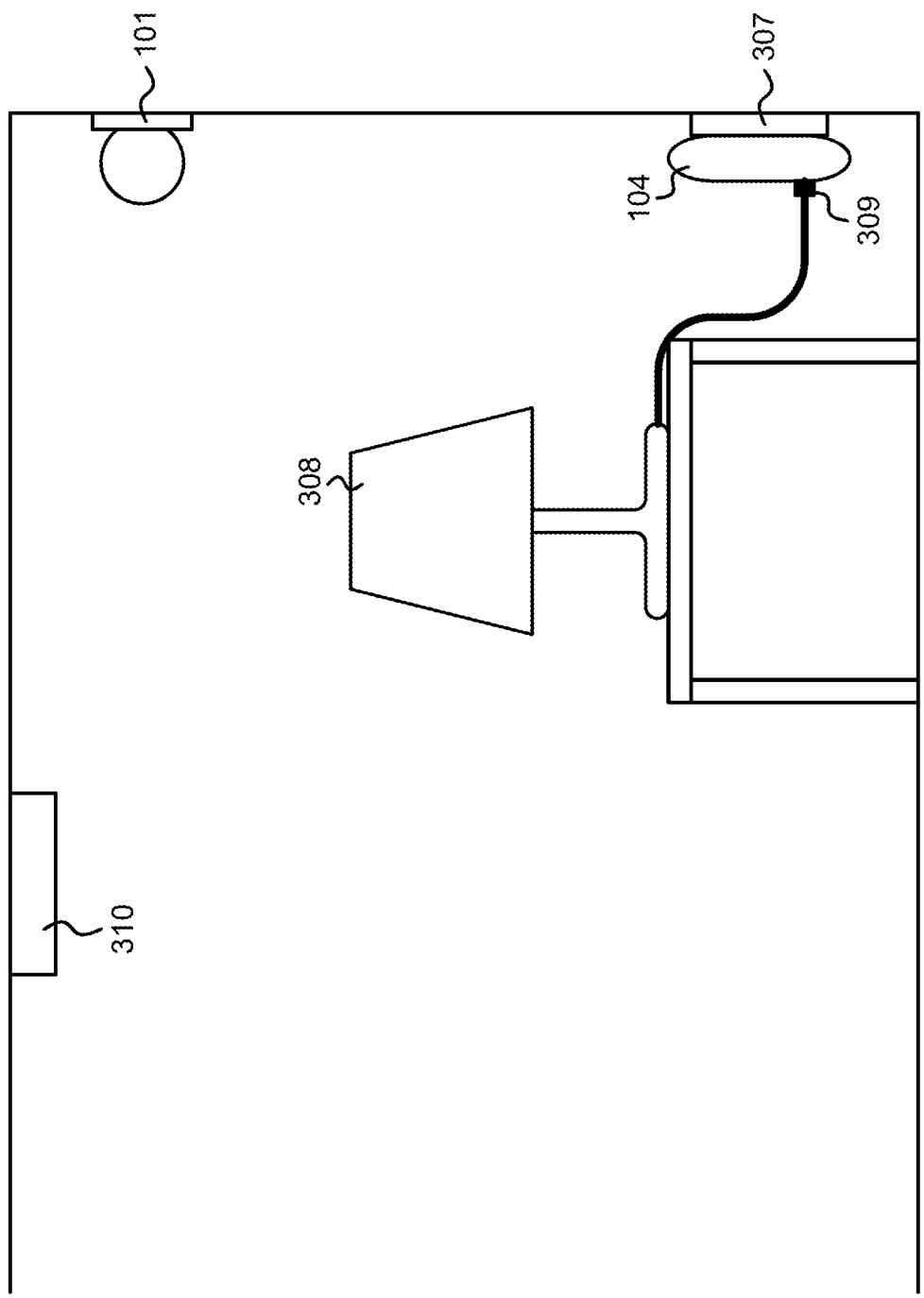
FIG. 3F is a detailed view of a typical switch unit placement.

Referring to FIG. 3F, a switch unit 104 is shown. Switch unit 104 plugs into a power outlet 307 (e.g., a power outlet located on a wall of a room). An electrical device, shown as lamp 308, connects to switch unit 104 when plug 309 is received in power outlet 303. Accordingly, when lamp 308 is electrically activated, power flows from power outlet 307, through switch unit 104, to lamp 308. Lamp 308 is automatically activated when certain events occur. For example, alarm unit 310 is located within an audible zone of detection of switch unit 104 and is configured to output an audible alarm if an event is detected (e.g., a smoke alarm emits a siren if a threshold level of smoke is detected). If alarm unit 310 is emitting the audible alarm, switch unit 104 detects the alarm, alerts server 102 of the alarm, and activates lamp 308. Switch unit 104 can also directly or indirectly send a capture request to an associated camera unit 101 if an alarm is detected. Further, lamp 308 may be automatically activated if associated camera unit 101 detects motion. In this case, camera unit 101 may directly (e.g., send a signal through a local network via a router) or indirectly (e.g., send a signal first to server 102 which then sends a signal to switch unit 104) send an activation signal to switch unit 104. The switch unit 104 and camera unit 101 associations are designated by the associated user of system 100. Additionally, lamp 308 may be manually activated by the user through user interaction with user input 304.

Figure 3G:
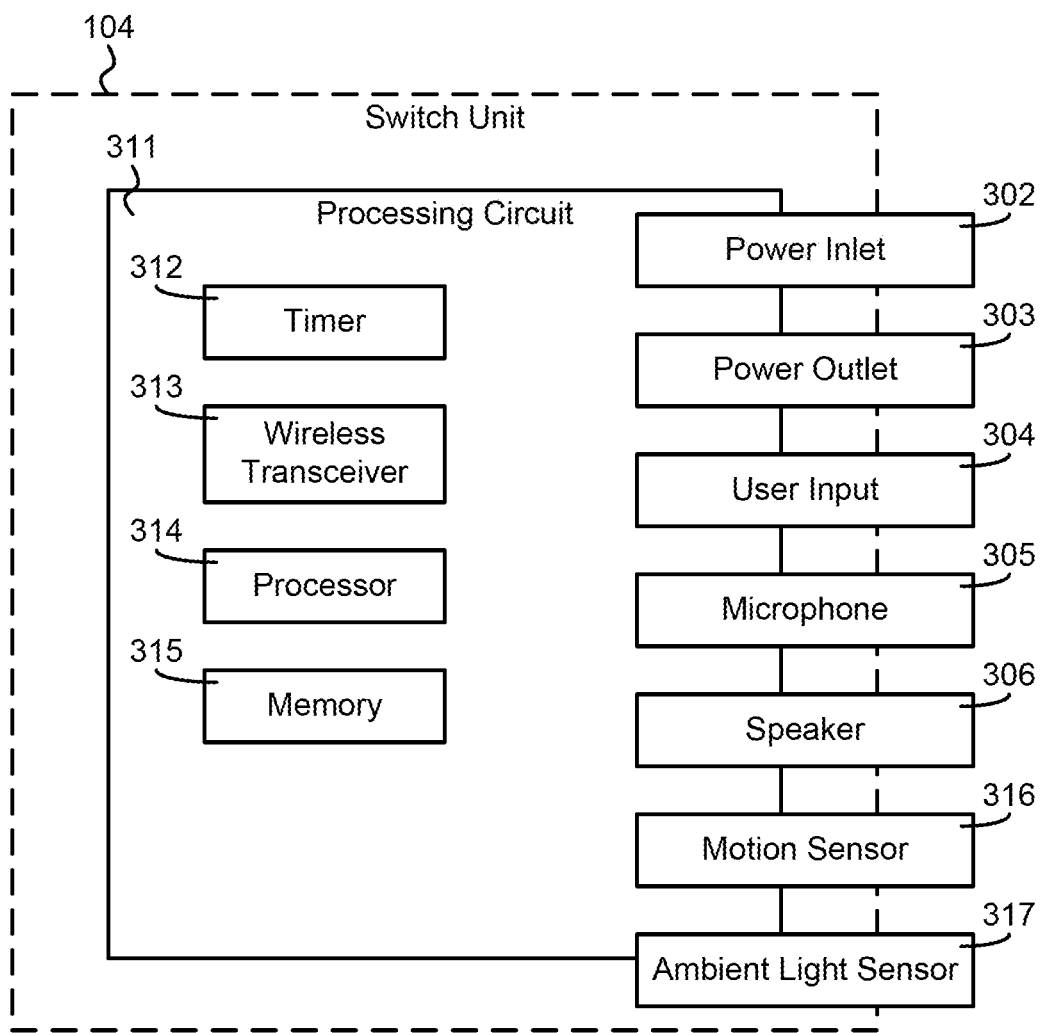
FIG. 3G is a block diagram of the switch unit.

Referring to FIG. 3G, a block diagram of switch unit 104 is shown. Switch unit 104 includes processing circuit 311. Processing circuit 311 controls the operation of switch unit 104. Accordingly, processing circuit 311 includes at least timer 312, wireless transceiver 313, processor 314, and memory 315. Wireless transceiver 313 is configured to send and receive data to and from server 102. Wireless transceiver 313 utilizes a version of the 802.11 standard networking protocol (e.g., 802.11a/b/g/n). Alternatively, wireless transceiver 313 utilizes other standard networking protocols, including, but not limited to CDMA, GSM, LTE, Bluetooth®, ZigBee®, and 802.15. Switch unit 104 receives operating power from power inlet 302, and battery life is not a concern for switch unit 104 as in camera unit 101. Thus, wireless transceiver 313 is configured to be active at all times to reduce the latency between server 102 and switch unit 104. In some situations, switch unit 104 is configured to utilize a reduced amount of power. Accordingly, processing circuit 311 optionally includes timer 312 to activate wireless transceiver 313 from a low-power sleep mode in the same manner as discussed above with respect to camera unit 101, wireless transceiver 212, and timer 211. Memory 315 stores recorded audio, operating instructions, and any necessary software modules. Processing circuit 311 includes and/or communicates with power inlet 302, power outlet 303, user input 304, microphone 305, and speaker 306. Switch unit 104 optionally includes motion sensor 316 and/or ambient light sensor 317, also part of and/or in communication with processing circuit 311. Switch unit 104 utilizes motion sensor 316 and ambient light sensor 317 as additional environmental triggers for activation of the power load.

Figure 3H:
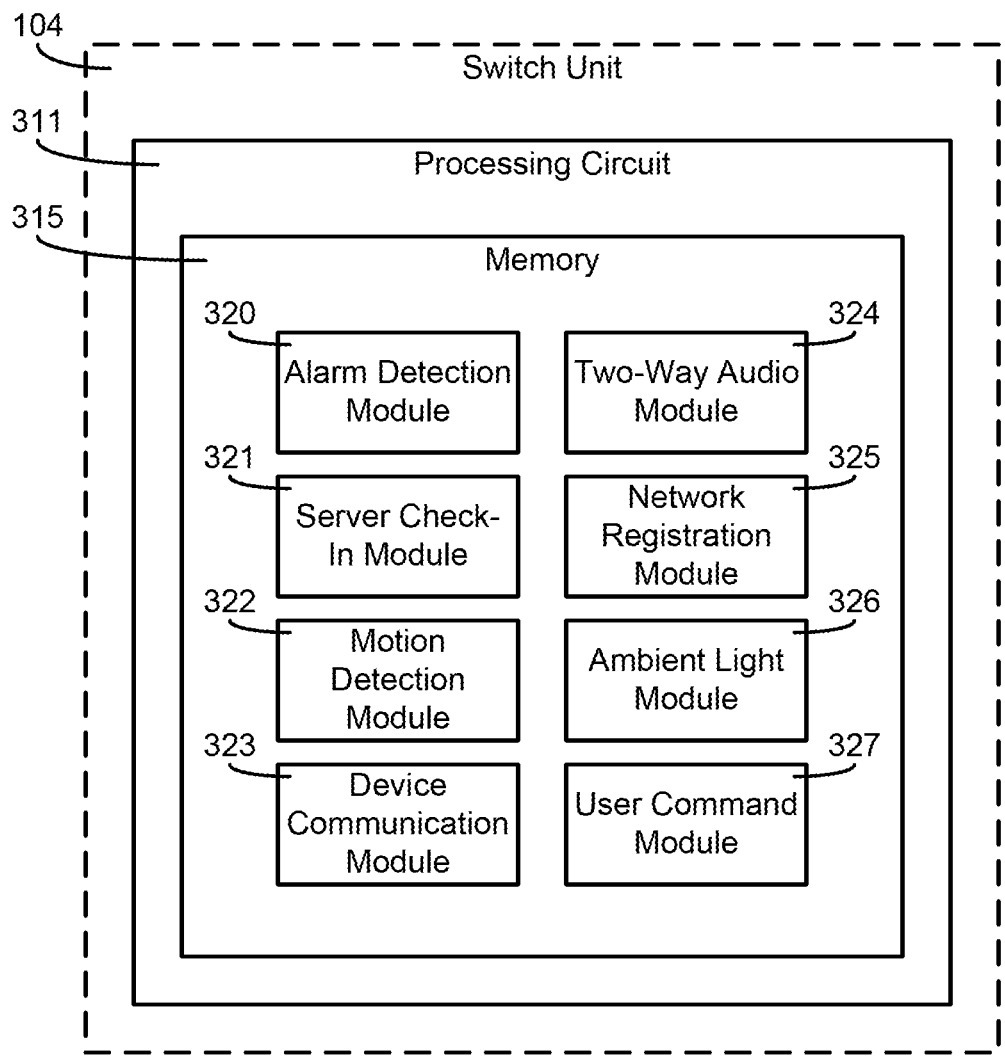
FIG. 3H is a block diagram of memory modules of the switch unit.

Referring to FIG. 3H, a block diagram of modules stored on switch unit 104 is shown. Modules are stored in memory 315 contained on processing circuit 311. The modules include all instructions necessary to run switch unit 104. Modules include alarm detection module 320, server check-in module 321, motion detection module 322, device communication module 323, two-way audio module 324, network registration module 325, ambient light module 326, and user command module 327. Alarm detection module 320 may be configured to manage switch unit 104 operation when an alarm is received. Server check-in module 321 may be configured to manage communications with server 102. Motion detection module 322 may be configured to manage switch unit 104 interaction with camera unit 101 and server 102 when motion is detected by an object coupled to switch unit 104 (e.g., lamp 308). Device communication module 323 may be configured to facilitate communications with camera unit 101 and server 102. Two-way audio module 324 may be configured to detect an audible alarm. Network registration module 325 may be configured to manage a registration of switch unit 104 with server 102. Ambient light module 326 may be configured to control ambient light sensor 317 providing ambient light. User command module 327 may be configured to receive and interpret user input 304. Modules on switch unit 104 may operate in concert.

In some arrangements, server check-in module 321 is inactive. As noted above, in some embodiments switch unit 104 is mains powered. In such embodiments, wireless transceiver 313 is always awake and listening for signals from server 102 or other devices on the local network. In this setup, timer 312 may be inactive or not physically present on processing circuit 311. Alternatively, switch unit 104 may utilize a power-save functionality in which wireless transceiver 313 periodically switches from a low-power sleep mode to a transmit and listen mode upon receipt of an interrupt signal sent from timer 312. In this case, wireless transceiver 313 and timer 312 may function in the same manner as wireless transceiver 212 and timer 211 of camera unit 101 (as described with respect to FIG. 2J above). Accordingly, switch unit 104 can periodically perform the same check-in procedure with server 102. One difference in the check-in procedure between camera unit 101 and switch unit 104 is a difference in the types of instructions switch unit 104 is operable to perform (e.g., activating the attached electrically powered device or transmitting audio instead of capturing a video clip).

System Server

Figure 4A:
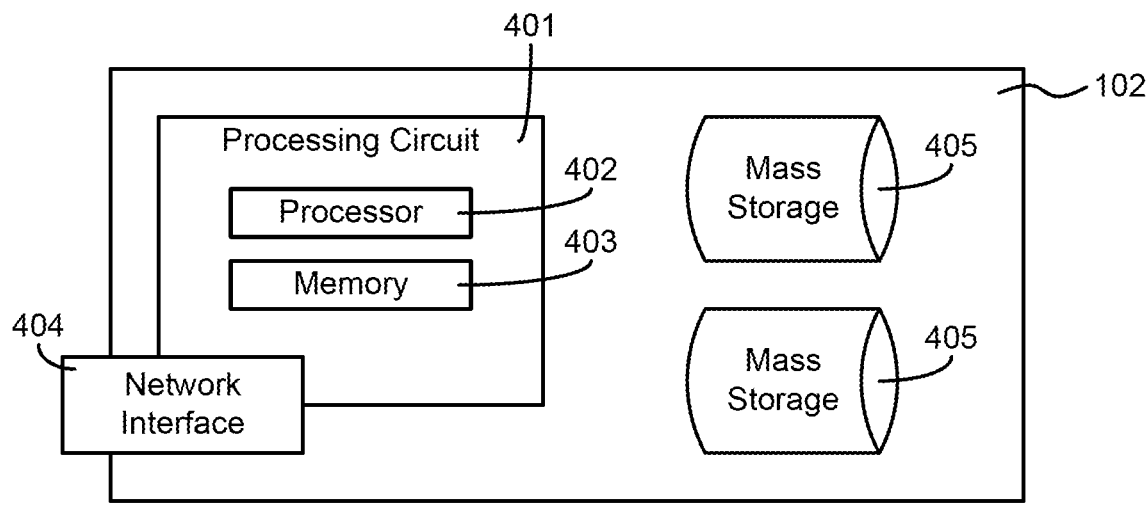
FIG. 4A is a block diagram of an exemplary embodiment of a system server.

Referring to FIG. 4A, a block diagram of server 102 is shown. Server 102 includes processing circuit 401. Processing circuit 401 includes processor 402 and memory 403. Server 102 includes network interface 404. Network interface 404 enables data transfer and communication between server 102, camera unit 101, and client device 103. Network interface 404 further provides communication with outside devices, servers, systems, and services to facilitate notification and alert delivery. Network interface 404 connects to a network either through a wired or wireless network connection. Server 102 includes mass storage units 405. Mass storage units 405 and memory 403 store databases and modules for the operation of system 100.

Figure 4B:
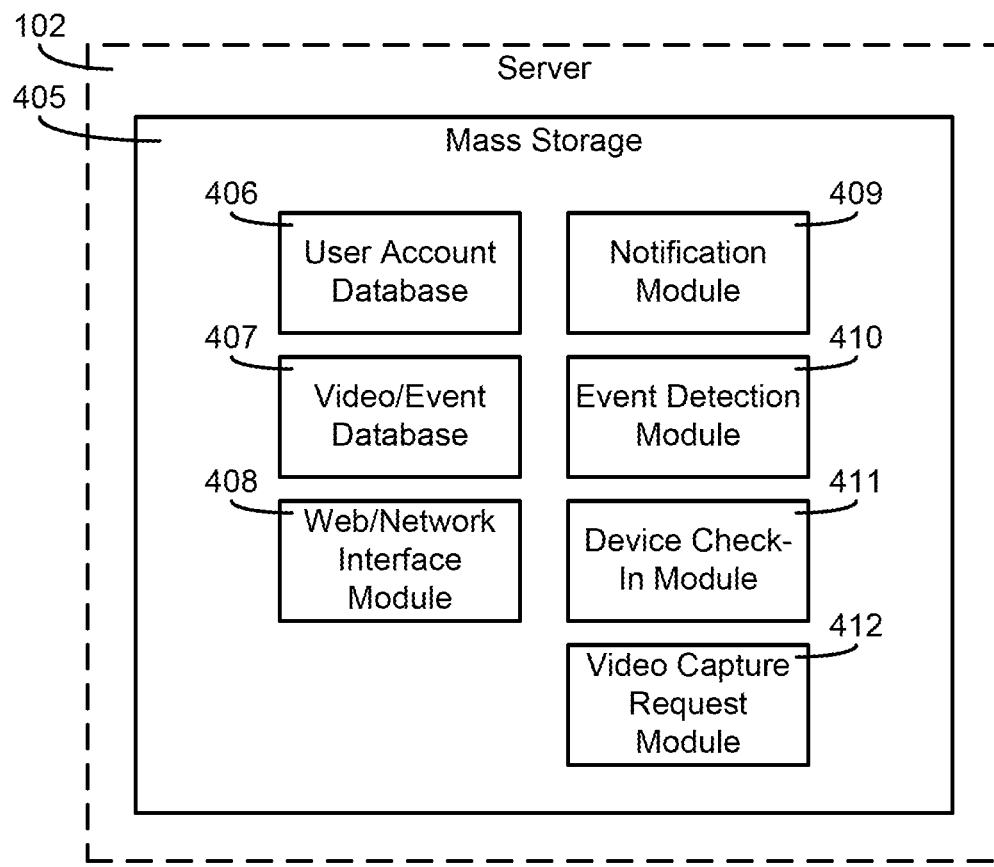
FIG. 4B is a block diagram of memory modules of the system server.

Referring to FIG. 4B, a block diagram of modules and databases stored on server 102 is shown. Mass storage units 405 and/or memory 403 store user account database 406 and video/event database 407. User account database 406 maintains information pertaining to all registered users of system 100. When registering to use system 100, each user must provide contact information, such as name, location addresses, e-mail address, and telephone numbers. Additionally, each user associates devices with a registered location (e.g., a camera unit with a home or office). Further, each user provides notification preferences for detected event notifications, status alerts, and/or alarm notifications. All of the above user information, as well as any additional user information, is stored in user account database 406. Video/event database 407 stores all event content and data. As discussed above, remote sensors and devices (e.g., camera unit 101) detect events and capture event data pertaining to the event. The event data is uploaded to server 102, and stored for user retrieval in video/event database 407. System 100 may periodically delete video data that has not been marked by a user for storage (e.g., video data older than 2 months). In an exemplary embodiment, the user can indicate that certain video data and event data is to be transferred to online cloud storage or to local mass storage devices off of server 102 prior to automatic deletion.

Memory 403 and or mass storage units 405 store program modules. Some server program modules represent server counterparts to program modules 216-222 of camera unit 101 and modules 320-327 of switch unit 104. Server modules include web and network interface module 408, notification module 409, event detection module 410, device check-in module 411, and video capture request module 412. Web and network interface module 408 causes the display of and control of any interactive graphical user interfaces (see, e.g., FIG. 6A through FIG. 6F). Web and network interface module 408 may include user interfaces for mobile devices, tablet computing devices, and website interfaces accessible on any Internet connected computing device. The user interfaces of system 100 are presented to users of system 100 through client device 103. Notification module 409 may be configured to manage notifications provided to camera unit 101, and event detection module 410 may be configured to determine an event based on information from camera unit 101. Event detection module 410 works with notification module 409. Device check-in module 411 may be configured to manage device check-ins. Video capture request module 412 may be configured to manage video capture requests sent to camera unit 101. Modules 408-412 may generally support the activities of server 102 as described in processes 420, 430, 440, 450 below.

Figure 4C:
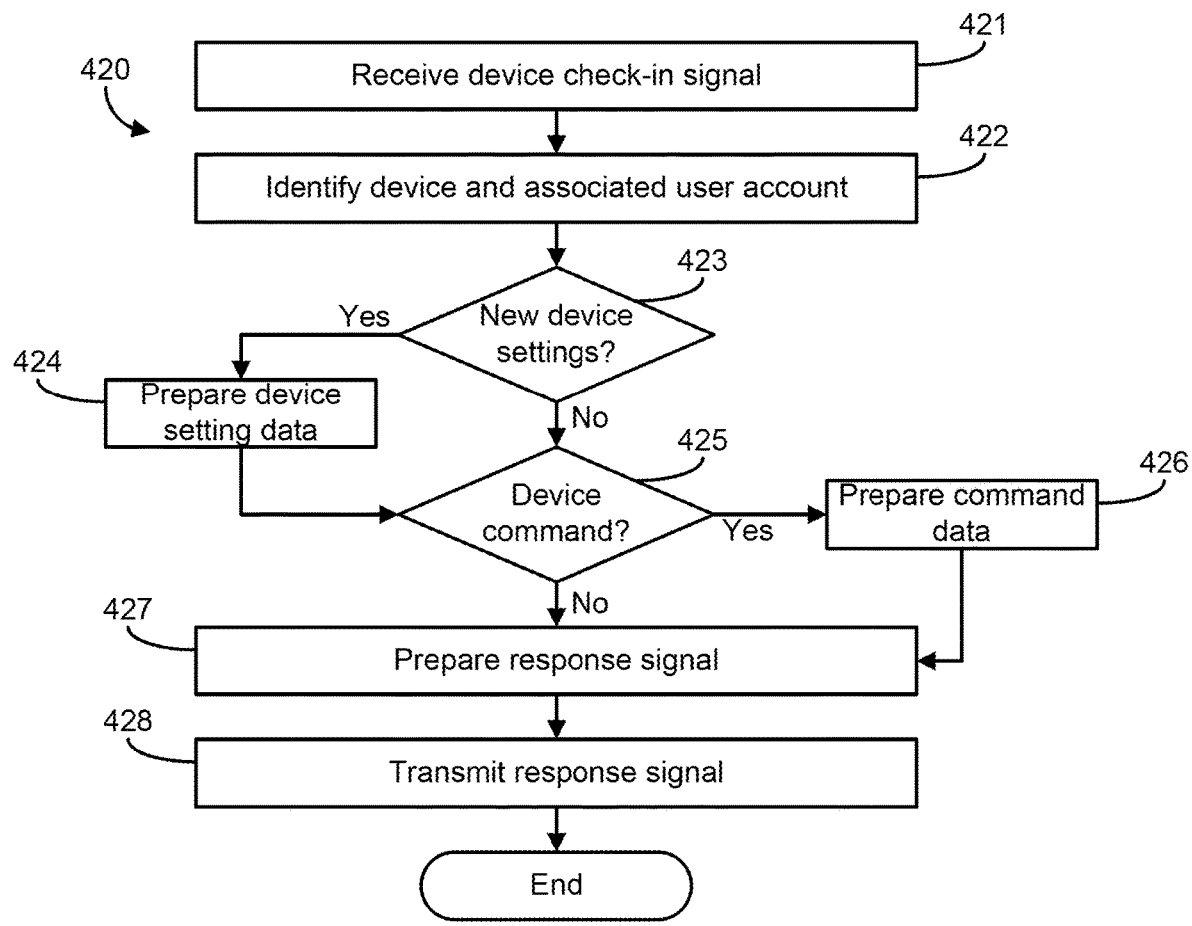
FIG. 4C is a flow diagram detailing the device check-in process from the perspective of the server.

Referring to FIG. 4C, a flow diagram of a device check-in process 420 is shown from the perspective of server 102. As discussed above with respect to camera unit 101 and switch unit 104, devices of system 100 (e.g., camera unit 101, switch unit 104, security sensors, etc.) periodically check-in with server 102 to receive updated settings, to receive commands, and to maintain network associations while maximizing battery life. The check-in process begins when server 102 receives a device check-in signal (step 421). Server 102 processes the check-in signal to identify the device and the user account associated with the device (step 422). The check-in signal generally includes a device identifier (e.g., MAC address). Additionally, the check-in signal optionally includes global IP address, local IP address, battery voltage, ambient temperature, awake time, number of server check-ins performed, amount of video data captured, amount of video data compressed, amount of video data uploaded, and/or network health. Accordingly, server 102 extracts the identification number of the device and searches user account database 406 to identify the device and the user account associated with the device. Server 102 then determines if there are updated settings for the device (step 423). Updated settings include any new settings input by the user. A user may wish to adjust the latency of the device, and accordingly, the updated setting relates to a new wake-up interval (e.g., interrupt signal interval of timer 211). A user may wish to deactivate or activate event detection by the device (e.g., turn off or on motion detector 204 of camera unit 101), and accordingly, the updated setting relates to activating or deactivating event detection of a device. Further, server 102 may detect that the battery of the device is reaching a critically low level, in which case the updated setting relates to increasing battery efficiency. Increased battery efficiency is generally accomplished by increasing the latency of the device and/or disabling non-essential features of the camera device (e.g., ambient light sensor 205, LEDs 206, and microphone 207 of camera unit 101). If server 102 identifies new device settings, server 102 prepares a new settings instruction including device settings for later transmission to the device in a response signal (step 424).

Server 102 determines if there is a pending user command waiting for the device (step 425). As discussed above, a user does not communicate directly with a device of system 100 (e.g., a user cannot send a capture command directly from client device 103 to camera unit 101). Accordingly, the user first sends the command to server 102. A user may input a command through a system 100 application or website as viewed on client device 103. A user command relates to a device function. For example, a user can send a capture request to camera unit 101. Server 102 stores the command in user account database 406 for transmission to the device during the next check-in. Accordingly, after receipt of the device check-in signal, server 102 queries user account database 406 for pending device commands. If a matching device command is identified, server 102 prepares user command instruction including the device command for later transmission to the device in the response signal (step 426).

Server 102 prepares the response signal to be transmitted to the device (step 427). The response signal includes an acknowledgment that the check-in was received. Further, the response signal includes any new settings and user commands identified in steps 423 and 425 and prepared in step 426. If no new settings or commands were identified, commands and settings are not included in the response signal. The response signal may also include the next wake timer interval. The prepared response signal is then transmitted to the device (step 428). The process is repeated for each check-in signal.

In an alternative embodiment, the response signal transmission to a device (e.g., camera unit 101) is conditional. Accordingly, if no new device settings are identified at step 423 and no device commands are identified at step 425, server 102 does not send a response signal to the device. In this situation, the device remains in a listen mode for a short period of time before automatically returning to sleep if no response signal is received from server 102 (as discussed above). If a response signal is transmitted by server 102, the device updates settings and/or performs the command in the response signal in the same manner as described above. If no response signal is transmitted by server 102, the device retains the same settings utilized during the previous sleep-wake cycle and the device returns to sleep.

Figure 4D:
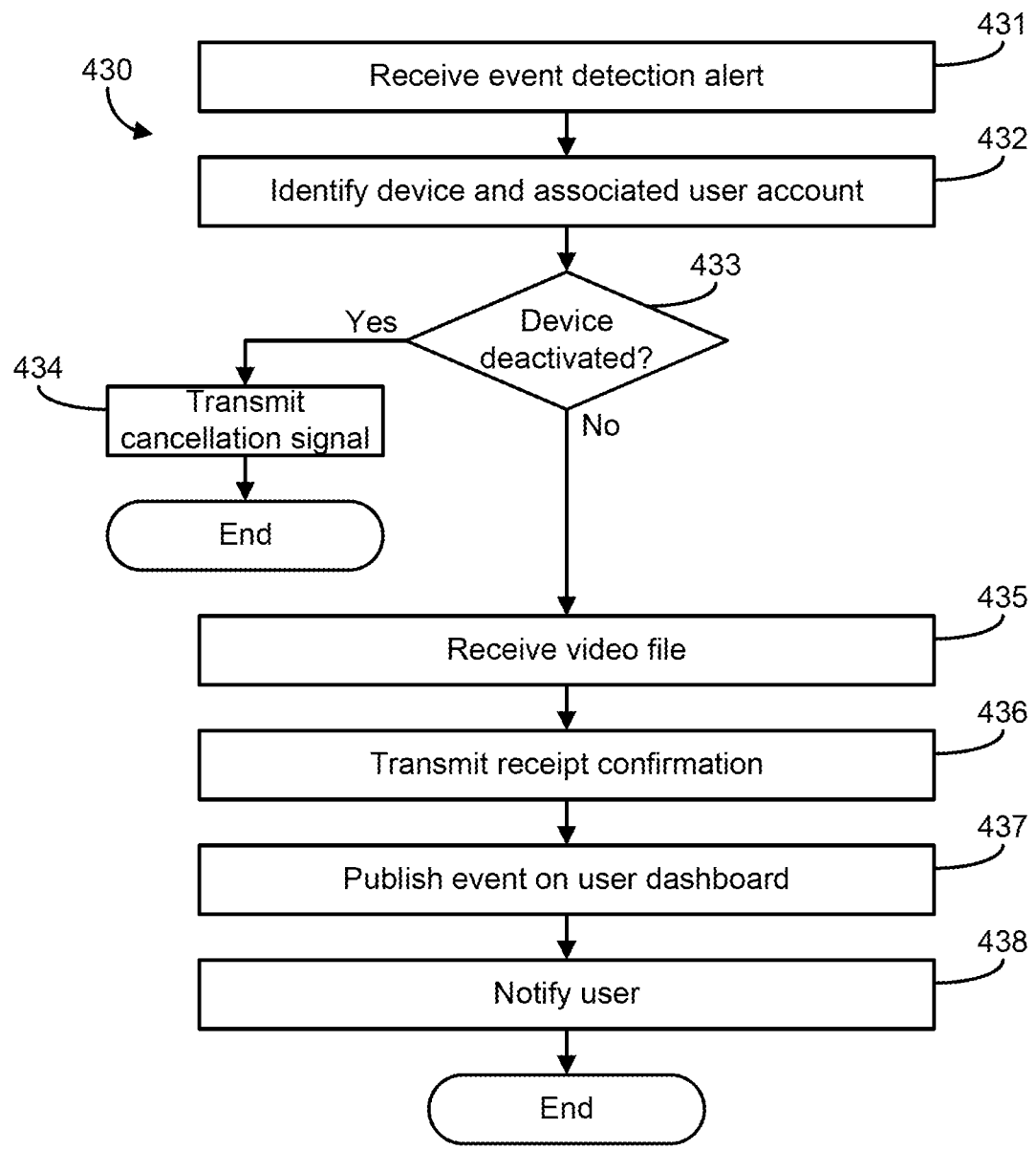
FIG. 4D is a flow diagram detailing the event detection process from the perspective of the server.

Referring to FIG. 4D, a flow diagram of an event detection process 430 from the perspective of server 102 is shown. Server 102 is first alerted that an event was detected when an event detection notification from a device (e.g., camera unit 101) is received (step 431). The event detection notification includes a remote device identifier (e.g., MAC address) and information pertaining to the event (e.g., type of event detected and any action being taken by the device). Server 102 processes the event detection notification and identifies the device and the user account associated with the device (step 432). Server 102 queries user account database 406 to determine if the user deactivated event detection for the device after the previous check-in (latency of system 100 as described above with respect to FIG. 4C) (step 433). Due to device latency, it is possible for a remote device to remain active even though the associated user indicated that the device is to be inactive. If the device is supposed to be inactive, server 102 transmits a cancellation signal to the device (step 434), and the event detection is notification is disregarded.

If the device is properly active, server 102 does not transmit a cancellation signal and waits until it receives a content file (e.g., video file) from the device (step 435). In some arrangements, server 102 transmits a confirmation signal to the remote device (e.g., camera unit 101) including a file name such that the event data is named according to the file name prior to the data being uploaded. Upon successful receipt of the content file, server 102 transmits a confirmation signal to the device (step 436). At this point, the device's duties during event detection cease, and the device returns to a sleep state. Server 102 publishes an event posting including the event content file on the associated user's dashboard (step 437). The dashboard may be any of a general user account dashboard, a device-specific dashboard, or a location-specific dashboard. The event postings provide the user a graphical interface displaying all events in a chronological order (see FIG. 6F). After publishing the event posting, server 102 notifies the associated user if at least one notification channel is enabled (step 438). The notification procedure is detailed below with respect to FIG. 4E. After notification, the event detection process is complete.

Figure 4E:
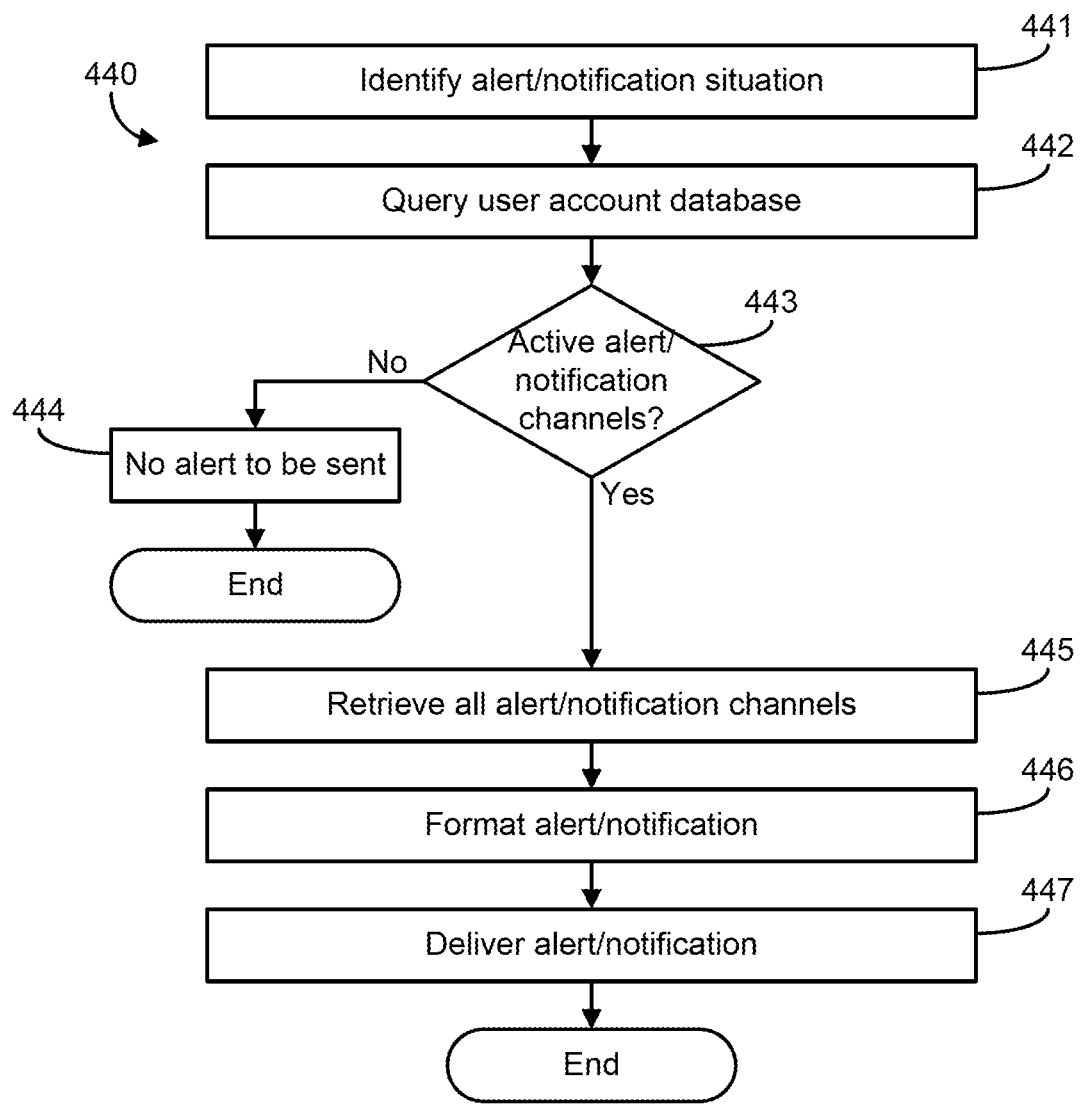
FIG. 4E is a flow diagram detailing the user notification process from the perspective of the server.

Referring to FIG. 4E, a flow diagram of a notification process 440 is shown, according to an exemplary embodiment. Server 102 sends notifications or alerts to registered users by running instructions contained within notification module 409. Notification module 409 instructions are performed when an event is detected or a system status alert is identified (step 441). The detected event (e.g., motion triggered video from camera unit 101) or the identified system status alert (e.g., low battery level or poor network condition) is associated with at least one user account. Server 102 queries user account database 406 to identify the associated user's notification preferences (step 442). Server 102 determines whether the user has no notification channels, a single notification channel, or multiple notification channels configured with system 100 (step 443). Some users may have no notification channels configured or all configured notification channels disabled. If no notification channels are configured or active, an alert is not sent (step 444). If a notification channel is configured and active, server 102 retrieves all channels of notification (step 445).

Server 102 formats a notification message for each configured and active notification channel (step 445). As noted above, a user of system 100 can configure and enable alerts through multiple channels, including, but not limited to: SMS, MMS, telephone call, e-mail, social media message, and/or application push notifications. Each notification channel has different capabilities. For example, SMS messages are limited to text, while MMS messages may include video, picture, and audio data in addition to text. A user of system 100 can use default alert messages, or can program custom alert messages. Default alert messages are the standard notification message format for system 100. A default alert message may include text indicating the detected event or identified status, the location of the event (e.g., home, office, etc.), and an embedded URL or link to the event or status listing on the user's dashboard. For voice notifications over telephone, the standard message without the text of the URL or link is read to the user upon answering the phone or to the user's answering system upon detection of an answering system beep or tone. The standard notification format is not limited to the above discussed format. The standard notification format may include only the URL or link, or may include only the necessary text. In certain situations, the URL or link to the event or status listing is embedded in the message such that the user is automatically directed to the event listing in the user's dashboard (e.g., a smartphone push notification automatically opens a system 100 application on the smartphone upon selection of the notification). Further, a user can customize the standard notification message on a channel-by-channel basis such that additional information or content is delivered with the notification (e.g., content data is attached directly to a MMS or e-mail message such that the data can be viewed without accessing system 100). After the notification messages are formatted, the notification messages are delivered to the user (step 447). In delivering the notification messages, server 102 communicates with any necessary message delivery services (e.g., e-mail service, SMS service, telephone dialing service, etc.) through network interface 404.

Figure 4F:
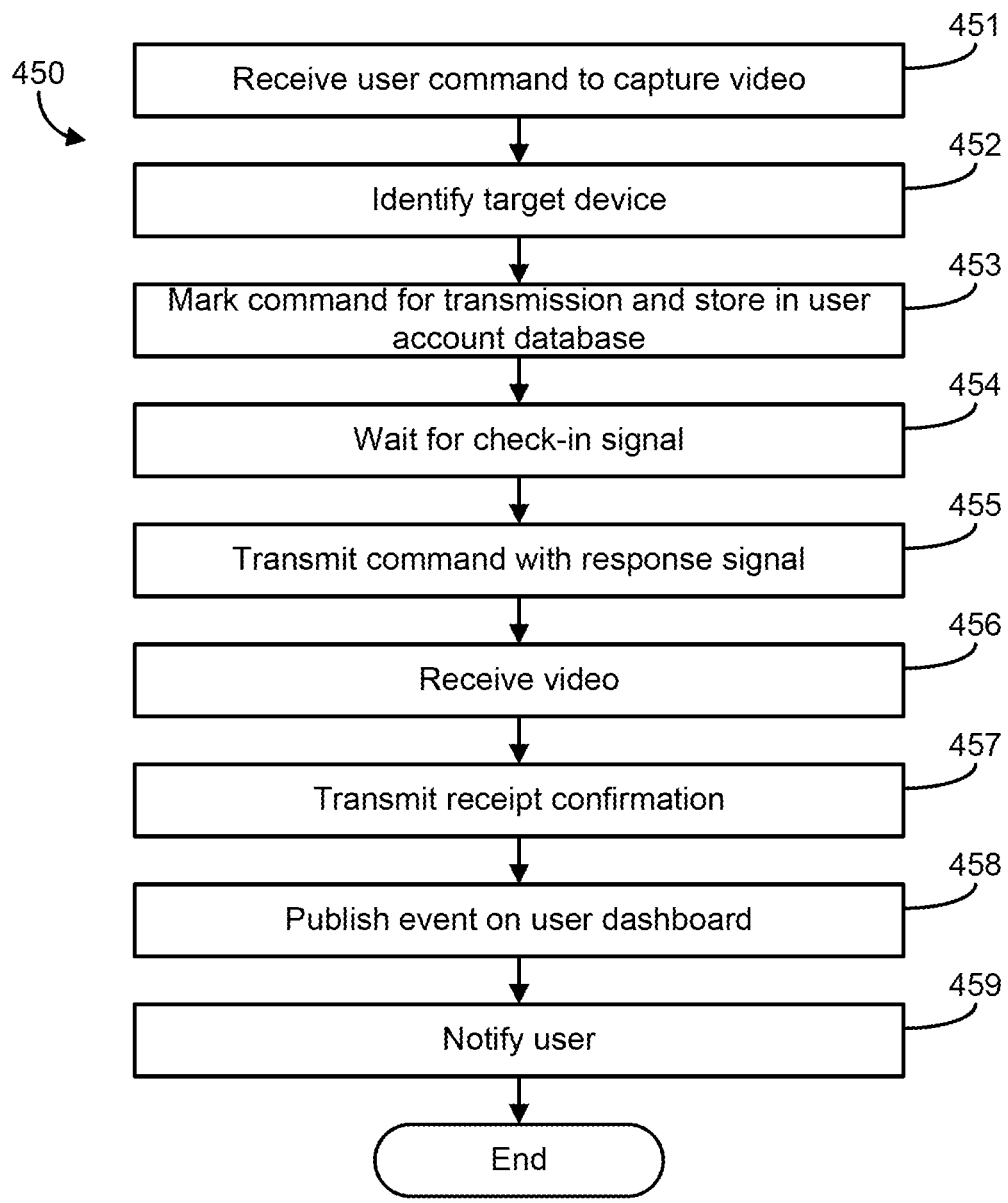
FIG. 4F is a flow diagram detailing the on-demand video capture process from the perspective of the server.

Referring to FIG. 4F, a flow diagram of a process 450 of the on-demand video capture request is shown from the perspective of server 102. The on-demand video capture command is initiated by a user through a client device 103 and is received at server 102 (step 451). The capture command signal includes capture parameters (e.g., video length, target device identification, audio on/off, etc.). Server 102 analyzes the capture command and identifies the target device (step 452). Server 102 marks the command for transmission and places the command data in user account database 406 (step 453). Server 102 cannot initiate communication with the target device. Server 102 must wait to receive a check-in signal from the target device (step 454). Server 102 packages the video capture command with the check-in response signal along with any video capture parameters and transmits the response signal containing the capture command to the target device (step 455).

After transmission of the response signal, the target device processes the command, captures the video, compresses the video, and transmits the video to server 102 (see FIG. 2M). Accordingly, server 102 receives the video file (step 456). Upon successful receipt of the content file, server 102 transmits a confirmation signal to the device (step 457). At this point, the device's duties during video capture cease and the device returns to a sleep state. Server 102 publishes an event listing including the event content file on the associated user's dashboard or the associated user's location's dashboard (step 458). The event listings can provide the user an interactive graphical interface displaying all events in a chronological order (see FIG. 6F). After publishing the event posting, server 102 notifies the associated user (e.g., if at least one notification channel is enabled) (step 459). The notification procedure is detailed above with respect to FIG. 4E. After the notification step, the event detection process is complete.

Client Device

Figure 5A:
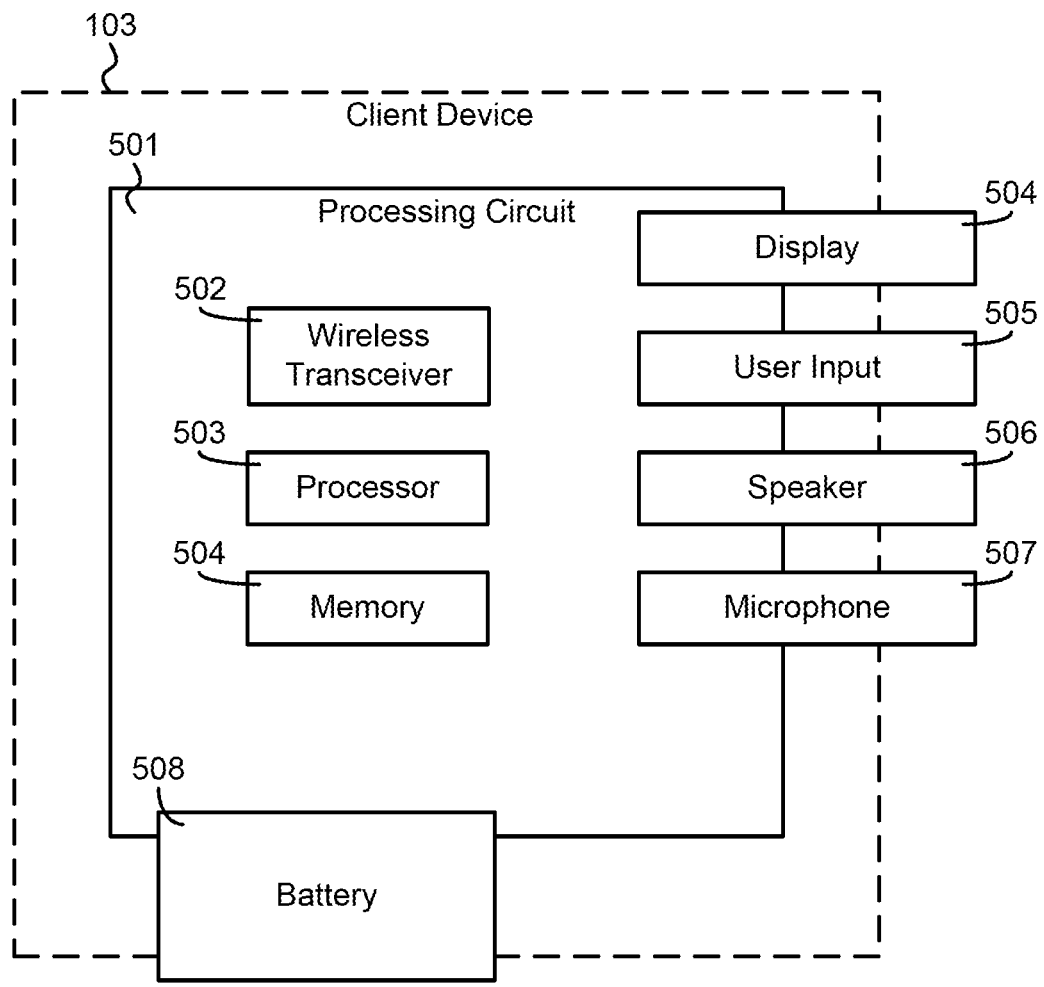
FIG. 5A is a block diagram of an exemplary embodiment of a client device.

Referring to FIG. 5A, a block diagram of client device 103 is shown. Client device 103 includes processing circuit 501. Processing circuit 501 controls the operation of client device 103. Accordingly, processing circuit 501 includes wireless transceiver 502, processor 503, and memory 504. Wireless transceiver 502 is configured to send and receive data to and from server 102. Client device 103 can be any number of computer devices having system software installed on it (e.g., a smartphone, a tablet computer device, a laptop computer, etc.), and wireless transceiver 502 communicates with server 102 through a network (e.g., a cellular data network or a WiFi network). Accordingly, wireless transceiver 502 utilizes any number of wireless networking protocols, including any of 802.11, CDMA, GSM, LTE, WiMax, Bluetooth®, ZigBee®, and 802.15. In an alternative arrangement, client device 103 includes multiple wireless transceivers enabling a broad range of network compatibility. In this arrangement, a user can select which radios are active, and which radios are to remain dormant. Memory 504 stores video data, operating instructions, user interfaces, system software, and any necessary software modules. Client device 103 is a multi-use device (e.g., a smartphone with a system application on it); accordingly, memory 504 also stores information pertaining to other device functions (e.g., making and receiving telephone calls). In some arrangements, client device 103 is configured to accept and utilize removable memory (e.g., SD or MicroSD memory cards) for additional storage of any data. Processing circuit 501 includes and/or communicates with display unit 504, user input 505, speaker 506, and microphone 507. Client device 103 may include a touchscreen user input; accordingly, display unit 504 and user input 505 are merged into the same unit for some embodiments. User functions within system 100 may be accomplished through using display unit 504 and user input 505.

Figure 5B:
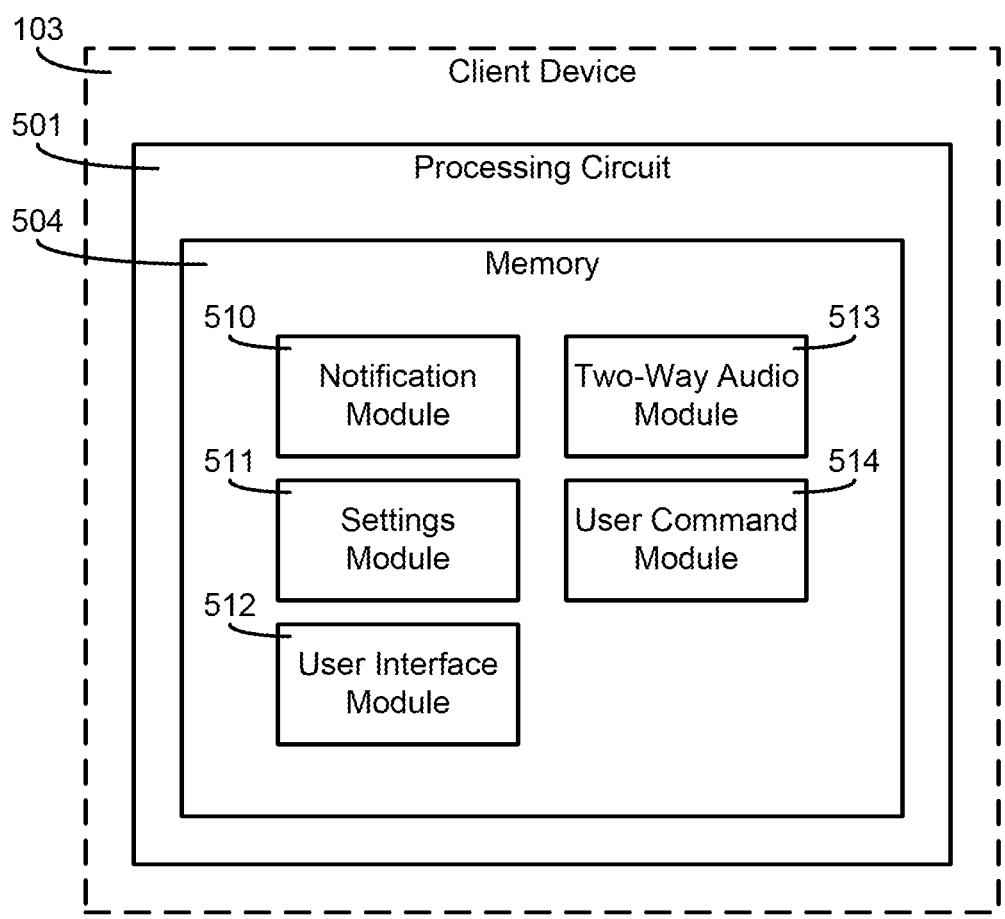
FIG. 5B is a block diagram of memory modules of the client device.

Referring to FIG. 5B, a block diagram of modules stored on client device 103 is shown. Modules are stored on memory 504 contained on processing circuit 501. Modules include all necessary instructions for user interaction with system 100 through client device 103. Modules include notification module 510, settings module 511, user interface module 512, two-way audio module 513, and user command module 514. Notification module 510 may be configured to manage notifications to be displayed on client device 103. Settings module 511 may be configured to manage client device 103 settings. User interface module 512 may be configured to generate a user interface on client device 103 displaying information as described in the present disclosure. Two-way audio module 513 may be configured to facilitate audio communications. User command module 514 may be configured to receive a user command to provide to server 102. Modules on client device 103 are not exclusive, meaning multiple modules are used together in certain situations. For example, for a user to adjust account settings for system 100, client device 103 relies on settings module 511 and user interface module 512.

Client device 103 displays graphical user interface through a display. The user receives alerts, views video, and sends/receives data to/from server 102 and camera unit 101 through the graphical user interfaces presented on client device 103. Examples of displayed graphical user interfaces for mobile devices (e.g., a mobile smartphone) are shown in FIGS. 6A-F. Although example graphical user interfaces are shown for a mobile device, user interfaces can be modified in size, orientation and arrangement for viewing on any form of client device 103, including for viewing on a website.

Figure 6B:
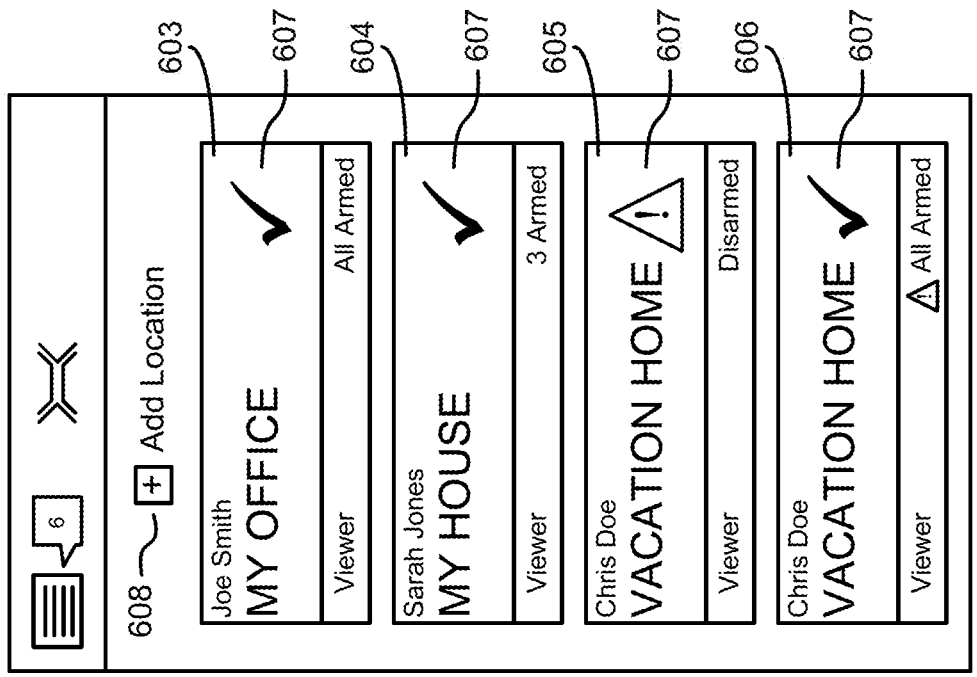
FIGS. 6A-F are detailed views of exemplary graphical user interfaces that may be presented to a user via the client device.
Figure 6A:
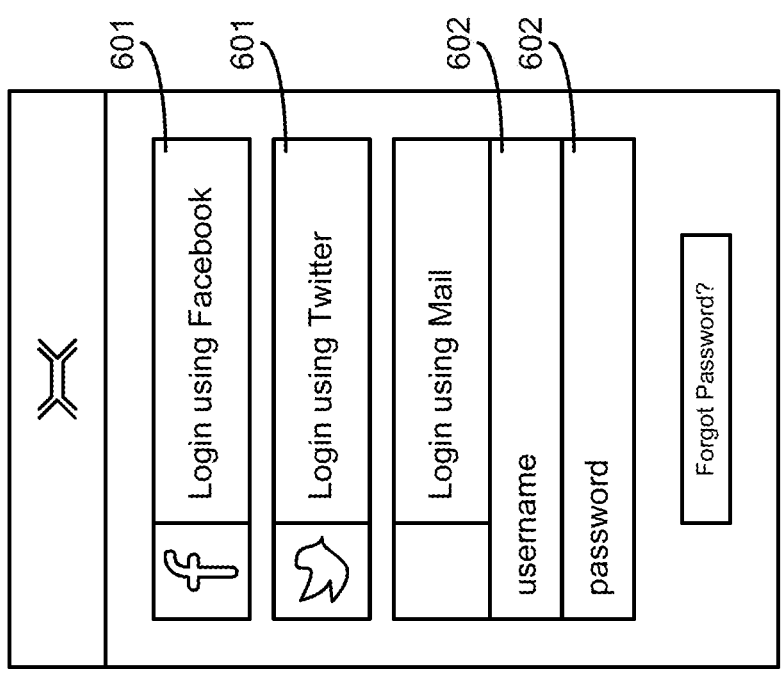

Referring to FIG. 6A, a graphical interface for logging into system 100 through a mobile device is presented. A user can access system 100 by logging in through social media accounts (buttons 601) or by logging in via a registered e-mail address and password (fields 602). After logging in, a user has access to the user's account with system 100. Through client device 103, a user can modify settings, associate additional devices with the user account (e.g., camera unit 101), view device statuses, arm or disable devices, associate additional locations with the user account (e.g., the user's home or the user's office), view a location dashboard, and send and receive messages with other users.

Referring to FIG. 6B, a graphical interface for viewing locations associated with a user account is shown. Each user can have multiple locations associated with his or her account (e.g., locations 603, 604, 605, 606). Each location has a status indicator 607 indicating whether devices (e.g., camera unit 101) are armed (active) or disarmed (inactive) at each associated location. A user can also associate a new location with the user's account through the graphical interface (button 608). Each location 603-606 can have a number of devices associated with the location.

Figure 6D:
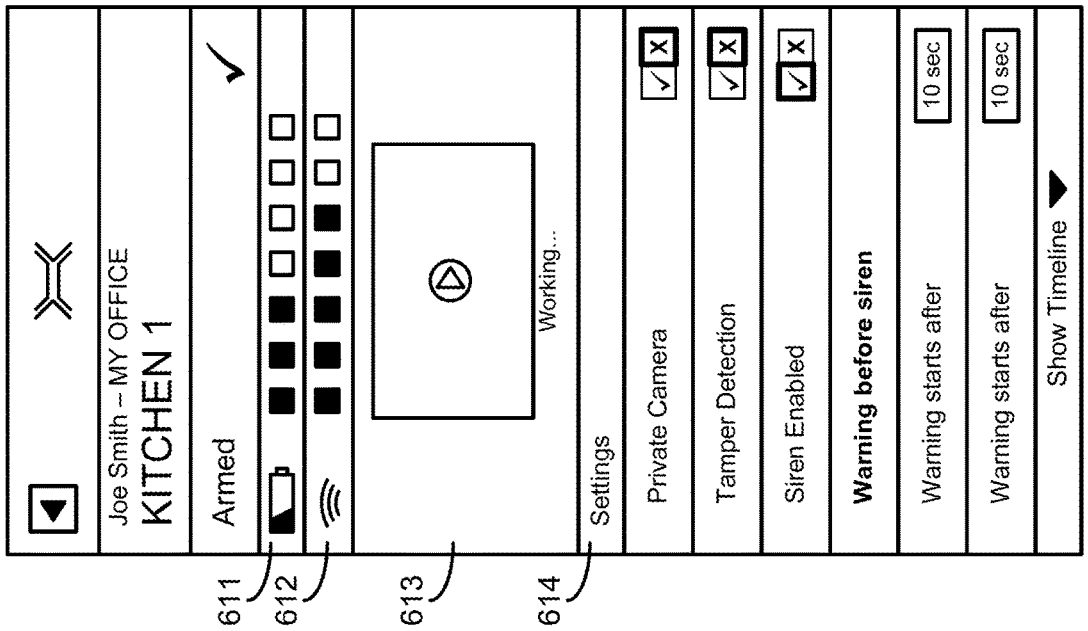
Figure 6C:
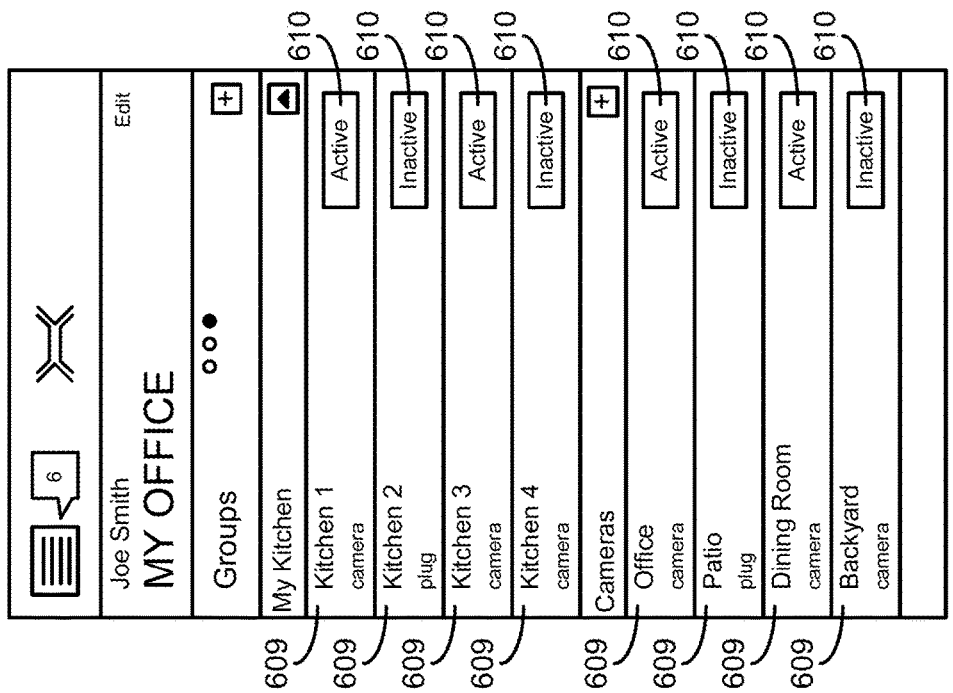

Referring to FIG. 6C, a graphical interface for viewing devices associated with a location is shown. If a user selects "MY OFFICE" (location 603), the user is directed to the graphical interface as shown in FIG. 6C, which displays the various devices 609 associated with location 603. Devices can be camera units (e.g., camera unit 101) or other devices (e.g., switch unit 104) connected to system 100. Each listed device 609 also includes a status 610. Status 610 indicates whether an individual device 609 is active on the system.

Referring to FIG. 6D, a graphical interface for viewing an individual device is shown. Each device 609 can be selected by the user to view details of the device's status 610. The detailed status includes a battery level 611, a network health (e.g., signal strength, signal quality, etc.) indication 612, and a device output 613 (shown as a video). The device output 613 depends on the type of device. The user can also adjust various settings 614 of device 609.

Figure 6F:
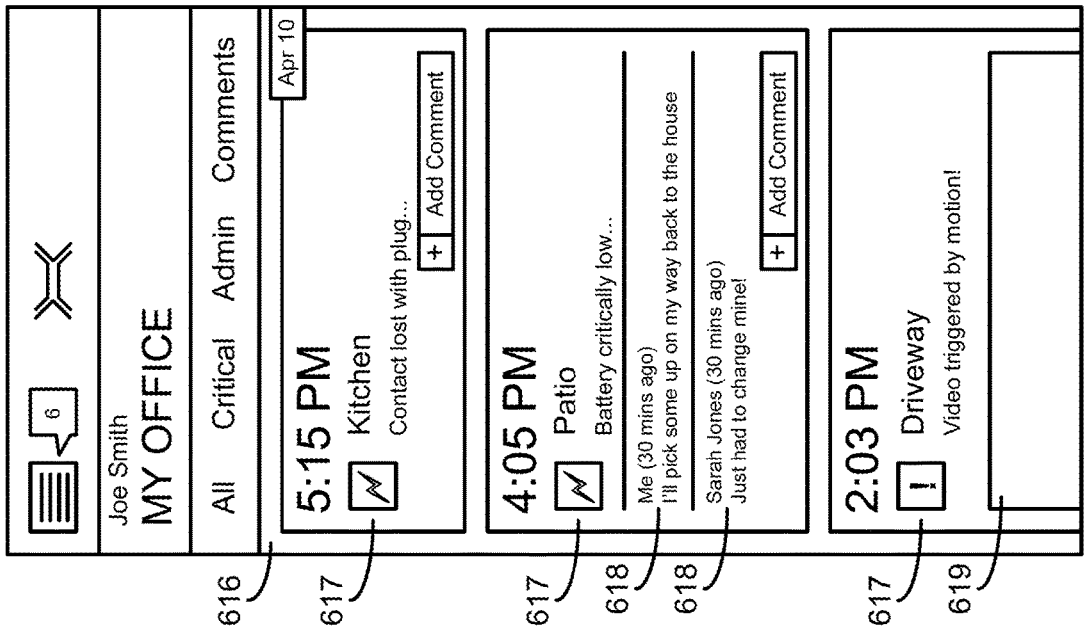
Figure 6E:
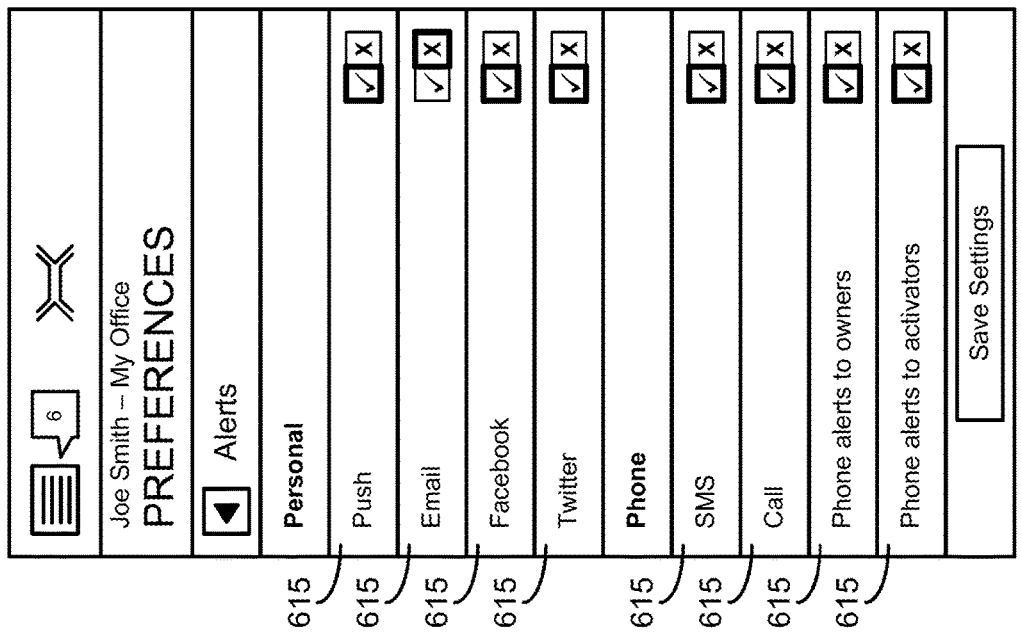

Referring to FIG. 6E, a graphical interface for viewing and adjusting user account notification preferences is shown. System 100 is configured to notify a user in the event an event is detected. A user of system 100 can set notification preferences as to how notifications are sent by system 100. A user can enable or disable alerts sent through specific channels of communication 615 (e.g., e-mail notifications, SMS notifications, etc.). If a particular channel of communication 615 is enabled, system 100 will alert the user through the enabled channel if an event is detected. The content of the alert may vary depending on the channel of communication 615.

Referring to FIG. 6F, a graphical interface for a dashboard 616 is shown. Dashboard 616 displays a chronological listing of individual event listings 617. Event listings 617 pertain to device statuses (e.g., battery life and network health) and detected events (e.g., video captured as a result of a motion detector trigger). Users of system 100 can leave comments 618 on event listings 617. Additionally, if the event notification includes content (shown as video clip 619), users can view the content through dashboard 616. If additional content pertaining to an event listing is captured by a system 100 device (e.g., from the same device capturing the initial event data or a second device), the additional event data is aggregated into the single event listing. Alternatively, the additional event data is displayed in a new event listing. Dashboard 616 may be location specific, user specific, or both.

Figure 7A:
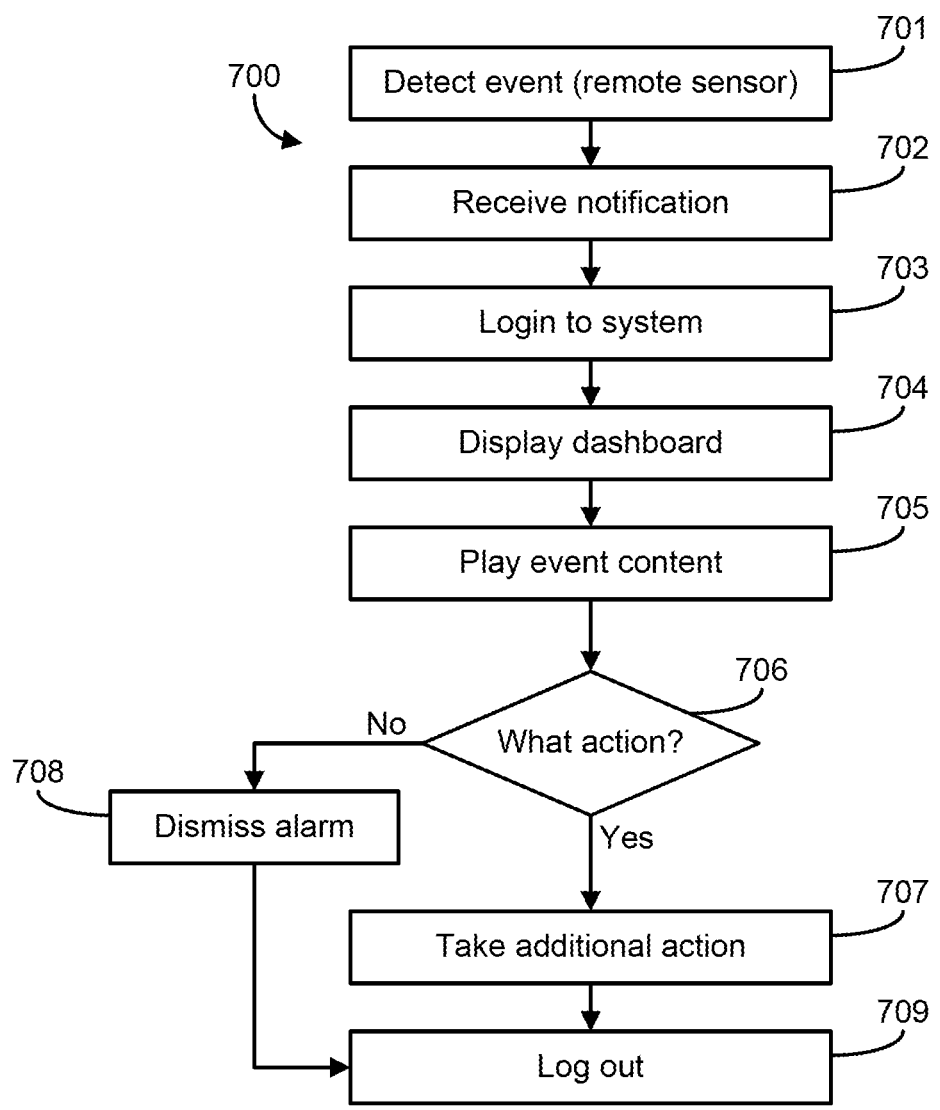
FIG. 7A is a flow diagram detailing the event detection process from the perspective of the client device.

Referring to FIG. 7A, an exemplary event detection and notification process 700 is shown from the perspective of a user utilizing client device 103. A remote event is detected (step 701). The remote event is detected from a remote sensor (e.g., camera unit 101). The remote sensor communicates with a server (e.g., server 102) that hosts user accounts. The remote sensor is associated a user account. Upon detection of the event, the remote sensor notifies the server of the event and begins recording event content (e.g., a video clip). After the recording is finished, the event content data is compressed and uploaded to the server. The server associates the detected event and content with a specific user account and identifies the user's notification preferences.

After identifying the associated user's notification preferences, the server notifies the user based on the user's notification preferences (step 702). As shown above with respect to FIG. 6E, a user can select from a plurality of notification channels. The user can be notified through any combination of the following notification channels: SMS, MMS, telephone call, e-mail, social media message (e.g., Facebook, Twitter, LinkedIn, etc.), application push notifications (e.g., Android or iOS application push notifications), and/or other electronic messaging services. A user can receive redundant notifications across multiple notification channels. The alert is delivered to the user through client device 103. Alternatively, the alert may be received through a different device (e.g., a smartphone, a PDA, a tablet, a personal computer, etc.) and after receiving the alert, the user accesses system 100 through client device 103 or through software on the different device (e.g., a web browser or a smartphone application). The notification may be a message alerting the user that an event has been detected. The notification includes event information including the location and the time of the event. The notification further instructs the user to log into system 100 to view related content and to manage the detected event. In some cases, the notification includes content relating to the detected event. For example, if the notification is sent through a channel enabling media transmission in addition to text or audio (e.g., MMS or e-mail), the notification includes the event content data.

After being notified, the user logs into system 100 (step 703). As shown above in FIG. 6A, a user can log into system 100 through a registered username and password. A user account may also or alternatively be linked to various social media accounts (e.g., Facebook and/or Twitter) such that a user can log into system 100 through a social media account. System 100 also is configured to remember a registered client device such that a user does not need to log in each time a user accesses system 100 from the registered device. In this situation, the system 100 requires a PIN to access the user account. Alternatively, no PIN is required.

After logging into system 100, the user is taken to the dashboard of system 100 (step 704). The system dashboard may include a chronological listing of events. Events include detected events (e.g., a motion-triggered video) and various device status alerts. Device status alerts generally pertain to remote sensor network/connectivity issues devices and low battery alerts. An exemplary dashboard is shown above in FIG. 6F. While viewing the dashboard, the user can view the event content (e.g., "Driveway—Video Triggered by motion!" of FIG. 6F). Depending on the capabilities of client device 103, the event content may be viewed as embedded within the dashboard, or the event content may be downloaded and viewed via a media player external to system 100.

After viewing the event content, the user decides what action, if any, should be taken (step 706). The user may decide that additional action must be taken (step 707). The user can select from a number of actions to take. The user can instruct system 100 to alert a government agency (e.g., the police department or fire department) and/or a private company (e.g., a private security company) of the detected event. The user can instruct the server to have the remote sensor capture more event data. The user can request more event data (e.g., additional video or audio) to assist with making a proper determination. The additional event data is published in the same event listing as the initial event data. The additional event data may also or alternatively be published in a second, new event listing. The user can instruct the server to alert other users of system 100 about the event. In some situations, a user's account can be linked to other user accounts such that one user can initiate an alert to another user.

Alternatively, the user may decide to dismiss the event (step 708). The user can dismiss the event by removing the event from the dashboard. Alternatively, the user can mark the event as having been reviewed or addressed. In this case, a status indicator of the event listing changes. The event listing can change by changing colors (e.g., from red to green), changing indicator symbols (e.g., "!" to "X"), fading, becoming transparent, changing from color to black-and-white, or any combination thereof. The user can add a comment to the event listing indicating that the event has been addressed. The event listing for all users may be updated with the added user comment. The text of the user comment can be selected from a set of preset messages (e.g., "reviewed" or "false alarm") or can be customized to read any text. Links or buttons may be associated with each type of preset message or a custom message. A user selects an action prior to viewing the content. For example, the user may decide to immediately dismiss the event without viewing the event content if the alarm was inadvertent (e.g., triggered by the user).

After reviewing the event, the user logs out of system 100 (step 709). It should be understood that a user does not need to receive a notification prior to logging in to system 100. A user may wish to log in to system 100 without receiving a detected event notification. The user can log into system 100 at any time to update notification preferences, view the dashboard, add and remove devices or locations, add messages to or dismiss old events, manage connections with other users, view remote device statuses, and edit user profile information.

Figure 7B:
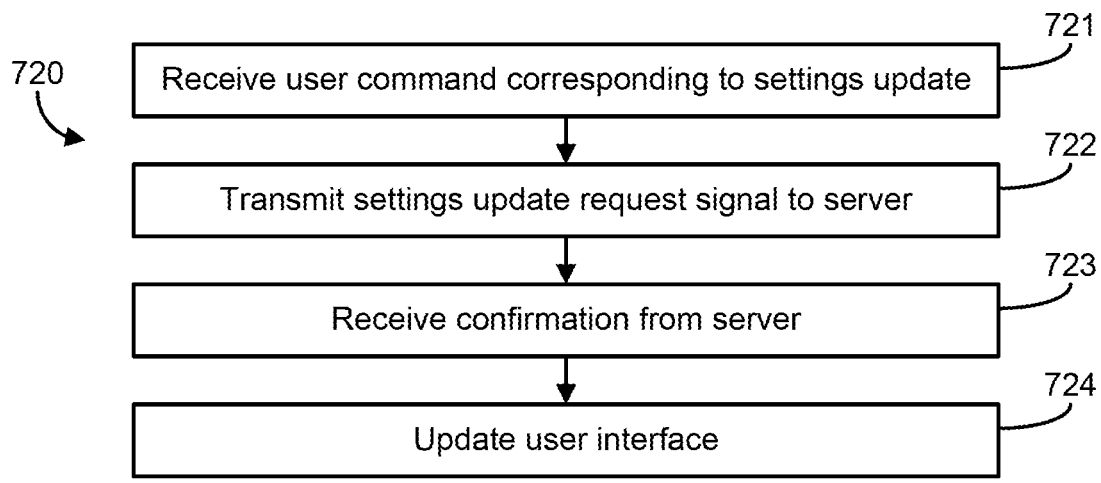
FIG. 7B is a flow diagram detailing the process of updating a user account and user settings from the client device.

Referring to FIG. 7B, a flow diagram of updating user account settings through client device 103 is shown. A user command corresponding to a settings update request is received at client device 103 (step 721). The user command is received through user input 505. The user initiates the command by interacting with system information displayed through display unit 504 (e.g., any of user interfaces shown in FIGS. 6A-F). Through interaction with the user interface displayed on client device 103, the user can change any setting associated with his or her account. The settings include, but are not limited to: notification settings, device settings (e.g., camera unit 101 settings), location settings (e.g., location status, linked users, associated devices, etc.), user profile settings (e.g., passwords, contact information, user associations with other users of system 100, set user access levels, etc.), client device 103 settings (e.g., adjusting graphical displays based on display unit 504, adjusting client device 103 notifications, configuring client device 103 with server 102, etc.), and any other settings necessary during the use of system 100.

Client device 103 transmits the settings update request signal to server 102 (step 722). Client device 103 transmits the signal to server 102 through wireless transceiver 503. Alternatively, client device transmits the signal to server 102 through a wired network connection. The signal instructs server 102 to make the requested changes within the user account. Server 102 makes the changes within its databases (e.g., the settings change is updated for the user's profile stored in mass storage units 405). Client device 103 then receives a confirmation signal from server 102 (step 723). Upon receiving the confirmation signal, client device 103 updates the display (e.g., display unit 504) to show that the settings change has been effectuated (step 724). The setting change may correspond to a change in color, the position of a virtual toggle switch, a change in wording, or any other graphical representation displayed to the user that indicates a successful change in settings.

Figure 7C:
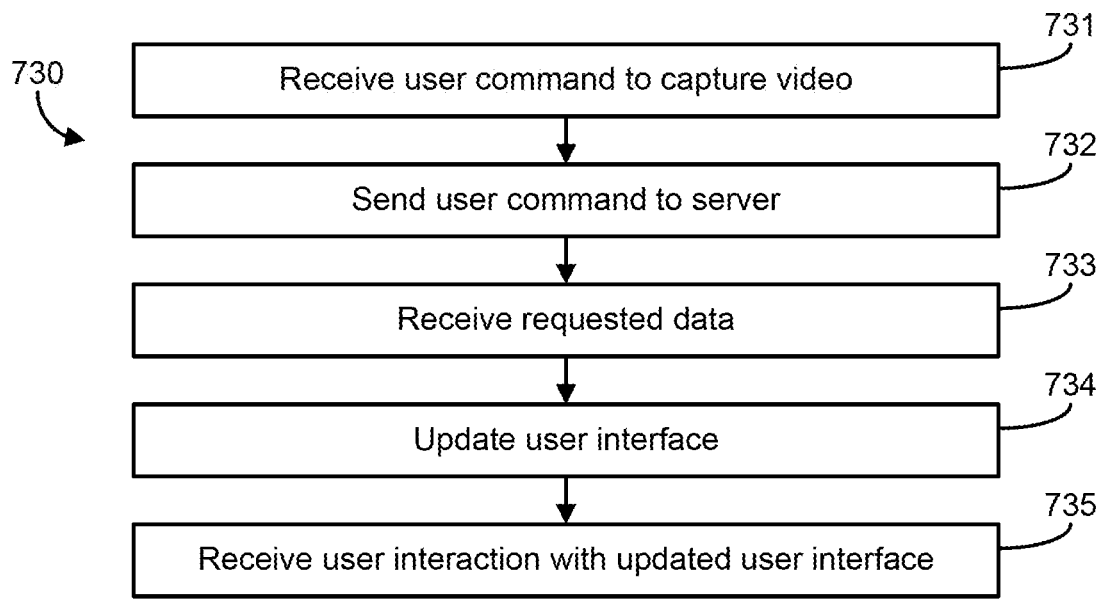
FIG. 7C is a flow diagram detailing the on-demand video capture process from the perspective of the client device.

Referring to FIG. 7C, a flow diagram of performing a user command to capture video is shown from the perspective of client device 103. Client device 103 receives a user command (step 731). The user command pertains to a user initiated video capture request for camera unit 101 to capture a specific duration of video. The duration of the video to be captured may be a standard length. Alternatively, the user command includes a specified duration of video to be captured. Client device 103 forwards the user command to server 102 (step 732). Server 102 and camera unit 101 interact as described above with respect to FIG. 2M and FIG. 4F. Once server publishes the captured event on the user dashboard (step 458 of FIG. 4F), client device 103 receives the user requested video capture (step 733). The client device then updates the user interface displayed on display unit 504 (step 734). Accordingly, the user is presented the video on the graphical display of system 100 (e.g., display of FIG. 6D or FIG. 6F). Depending on the latency, there may be a significant delay between when the user initiates the capture request and when the user can view the captured video. Client device 103 optionally receives a second user command correlating to a user interaction with the requested content (step 735). The optional second command may relate to a play request, a delete request, a share request, or any other command pertaining to the captured video data.

System Scalability

System 100 can function with a single camera unit 101 or a single switch unit 104 associated with an individual user account. System 100 may be scalable such that any number of camera units, switch units, or other sensors may be associated with single or multiple locations that are associated with a user account. For example, a user may decide to associate a camera unit and switch unit in each room of his or her home (first location), his or her office (second location), and his or her vacation home (third location). Each group of devices at each location posts alerts and notifications to the user's dashboard (e.g., via the server/camera activity previously described). The user's dashboard may be subdivided into location-specific dashboards or device-specific dashboards. Further, each group of devices that are located on the same local network (e.g., connected to the same wireless internet router) can be configured to communicate with each other. In some embodiments, multiple users of system 100 can associate with each other such that a user can view another user's devices and locations.

It is further contemplated that other devices beyond switch unit 104 and camera unit 101 can be configured to work with system 100. For example, other security and safety sensors, such as window breakage sensors, stand-alone motion detectors, carbon monoxide detectors, smoke detectors, and fire detectors can be configured to communicate with server 102 and to work with system 100. In some embodiments, home automation devices such as climate controllers (HVAC, thermostat, etc.) can be configured to communicate with server 102 and to work with system 100.

Use of System and Integration with Social Networking

A user can register an account by creating a user name, creating a password, providing user contact information (e.g., address, work telephone number, mobile telephone number, home telephone number, fax number, e-mail address, social media account information, etc.), and providing any other required information. Upon successful registration, the user becomes discoverable by other users of system 100 such that the two users may be linked (discussed in further detail below). However, each user can limit or eliminate his or her discoverability such that only other users having a certain characteristic can locate the user or such that no other users can locate the user. Further, upon successful registration, the user can begin adding user owned locations and user owned devices.

The registered user can add a user location to his or her user account with system 100. The user location is a location that the registered user has complete control over (e.g., add/remove devices, add/remove users, delete the location, name the location, etc.). To create a user location associated with the account, the user interacts with a graphical user interface (e.g., as shown above in 606 in button FIG. 6B) and selects the add a location feature, which may be represented by a symbol on the graphical user interface. Upon selection, the user must input a name and provide optional information pertaining to the location. Once a user-owned location is created, the user can view the location-specific dashboard (e.g., as shown above in FIG. 6C). From the location's dashboard, the user can view any events and/or device statuses pertaining to the location. The user can also make the location public (e.g., so it can be located by other registered users), make the location private (e.g., so it cannot be located by other registered users), delete the location, manage user connections (e.g., add/remove other users' access rights to the user-owned location and set user permissions), and associate/remove remote devices (e.g., camera unit 101) to/from the location.

Before any events can be detected for the user and the user's location, the user must associate at least one remote device with the newly created account and/or newly created location. It is noted that much of the following discussion pertains to adding and operating a device associated with a user's location. However, it should be understood that a user can associate a device with his or her general account dashboard (e.g., not a location specific dashboard) as well in a similar manner as described. The user can add any type of device that functions with system 100 (e.g., camera unit 101, switch unit 104, or other security sensors). The user begins the device association process by installing the remote device at the location and registering the device with a local area network that has access to server 102 (e.g., a wireless router). Most remote security devices (e.g., camera unit 101 and switch unit 104) do not have a display and a keyboard that would typically enable a user to connect with a wireless access point (e.g., as in a laptop computer or a tablet computer). Accordingly, the user may connect in an ad hoc wireless connection with the device, and program the device to search for the appropriate network such that the device connects with the wireless access point upon termination of the ad hoc connection. Each remote device capable of connecting with system 100 includes a unique identifier (e.g., MAC address). The user then registers the unique identifier with the user account through the graphical user interface, and the device becomes available to the user account. After adding the device to the user account, the user names the device and can perform various associations with the device and edit device settings.

The user can then edit device settings. For example, the user can configure the device to detect events (e.g., motion) and what to do when the event is detected (e.g., capture video data). The user can activate or deactivate the device (e.g., turn on event detection or turn off event detection). The user can request the device to perform a command (e.g., capture a video on demand). Further, the user can change settings (e.g., set a video length, turn audio capture on, set device associations with other devices). It should be understood that each device will have a unique set of optional settings and features. For example, while camera unit 101 can be configured to record video data, switch unit 104 can be configured to detect certain alarm signatures or audio noises. The user can further set a schedule for each associated device. The schedule may pertain to a schedule as to when the device will be active (e.g., detecting motion) and inactive (e.g., not detecting motion) or to when the device will perform a designated function (e.g., capture video every Tuesday at 4 pm). The user can view device status, including network connection and battery statistics. Further, the user can make a device private or public. By making a device private, only the user that owns the device can view the device, send commands to the device, and view detected event information captured by the device.

The user can further associate the device with the user's location within the user account. Once a device is associated with the location, the location dashboard will begin being populated with events. If a device is active, event listings (e.g., see event listings 617 from FIG. 6F) will begin populating the location's dashboard upon event detection and internal device statuses (e.g., low battery). When a remote device detects an event (e.g., camera unit 101 detects motion or switch unit 104 detects audio), an event listing is published on the location dashboard. If the remote device captures event data, the event listing includes event data. Generally, the event listing includes the type of detected event (e.g., motion or an audible alarm), the time of the detected event, the remote device name, and any other information regarding the detected event. Further, an event listing may indicate a remote device status alert. For example, if a device loses connection with server 102, an event listing will appear on the location's dashboard indicating there is a problem so the user can investigate the problem. As another example, if the device is running low on battery, an event listing will appear on the location's dashboard so that the user can investigate and/or replace the battery. All events are routed from the device through server 102, such that event listings are published by system 100 on the user interface.

Each event listing (device status alert or detected event) is displayed on an interactive graphical user interface. Users that can view the location's dashboard (e.g., the location's owner and any users granted permission by the location's owner) can perform certain functions through the graphical user interface of system 100. For example, each event listing has a comment feature such that a user can instruct server 102 to publish a comment. Multiple comments pertaining to the same event listing appear in chronological order such that the comments form a threaded conversation (e.g., see comments 618 of FIG. 6F). Already posted comments can be removed by the location's owner, the user that posted the comment, and/or another user granted permission to remove the comments by the location's owner. Further, each listing contains event options. For example, users that have access to the location dashboard and the necessary permission levels can delete event listings or mark event listings as cleared or dismiss the event listing. A cleared or dismissed listing indicates a non-important event (e.g., a false alarm) or that the event was taken care of already. Further, users having access to the location dashboard and the necessary permission levels may initiate alerts to other users regarding the event listing.

System 100 can be utilized by a single user having shared no locations or devices with other users. However, as briefly discussed above, an account holder within system 100 can associate his or her user account and his or her owned locations with additional system 100 users. By linking multiple other users to the first user's location or devices, the first user can create a virtual community watch system. Accordingly, each user of system 100 can optionally link his or her account and/or specific owned locations and/or specific devices with other users of system 100. If users are generally associated (e.g., one user is associated with another's profile), each user has access to all shared locations of the other user. If a first user becomes associated with a second user's location, the first user has access to the second user's location's dashboard. If a first user associates with a second user's device, the first user has access to the device's dashboard. Each user may have full access or some tier of limited access to the other's dashboard based on belonging to a tier of users (discussed in detail below). By establishing relationships with other users, the other users can monitor each other's notifications, alerts, and events.

Users of system 100 can associate with other users in multiple ways. A registered user can send an invite to another user. To do so, the registered user may search for another registered user by name, e-mail address, location, social media account, or any other identifying characteristic. Further, system 100 may suggest other users with which a registered user may wish to associate. For example, system 100 may determine that two users live on the same block and suggest association between the users based on the common interest in neighborhood security. System 100 analyzes user characteristics to find matching characteristics between its members to locate and suggest possible user associations.

A registered user can send an invite to a non-member of system 100. The registered user instructs system 100 to initiate an e-mail to the non-member to encourage the non-member to register for system 100 and to join the registered user's location. Alternatively, the e-mail initiated by system 100 provides the non-member temporary guest access. System 100 may require guest verification before providing the guest access to the system. The verification includes the entering of a code received by system 100 in the invitation e-mail. Alternatively, the code is received by the guest from the registered user initiating the guest access through a system generated SMS message, phone call, or other access code. Guest access is generally for a limited duration (e.g., a couple of hours, a day, a week, etc.). A registered user can invite members or non-members to associate with the registered user's account through social media. For example, the registered user may initiate a Facebook message or a Twitter tweet to another individual, and the message or tweet includes a link to sign up and/or associate with the registered user's account and/or location. Still further, a first registered user may receive an invitation to join a second registered user's location or generally associate with the second user's account. In this case, the first registered user may either accept or reject the invitation to associate with the second user.

Once a first registered user is connected with a second registered user, the second user's level of access must be set. For example, system 100 may allow for three different tiers of associations. Each tier represents a different level of permissions with respect to the second user's access of the first user's account, devices, and locations. User tiers may be set on an individual-by-individual basis. Alternatively, a user can assign a set tier of access for all users belonging to a specific location or device. The details of the tiered-access system are discussed in detail below.

Figure 8A:
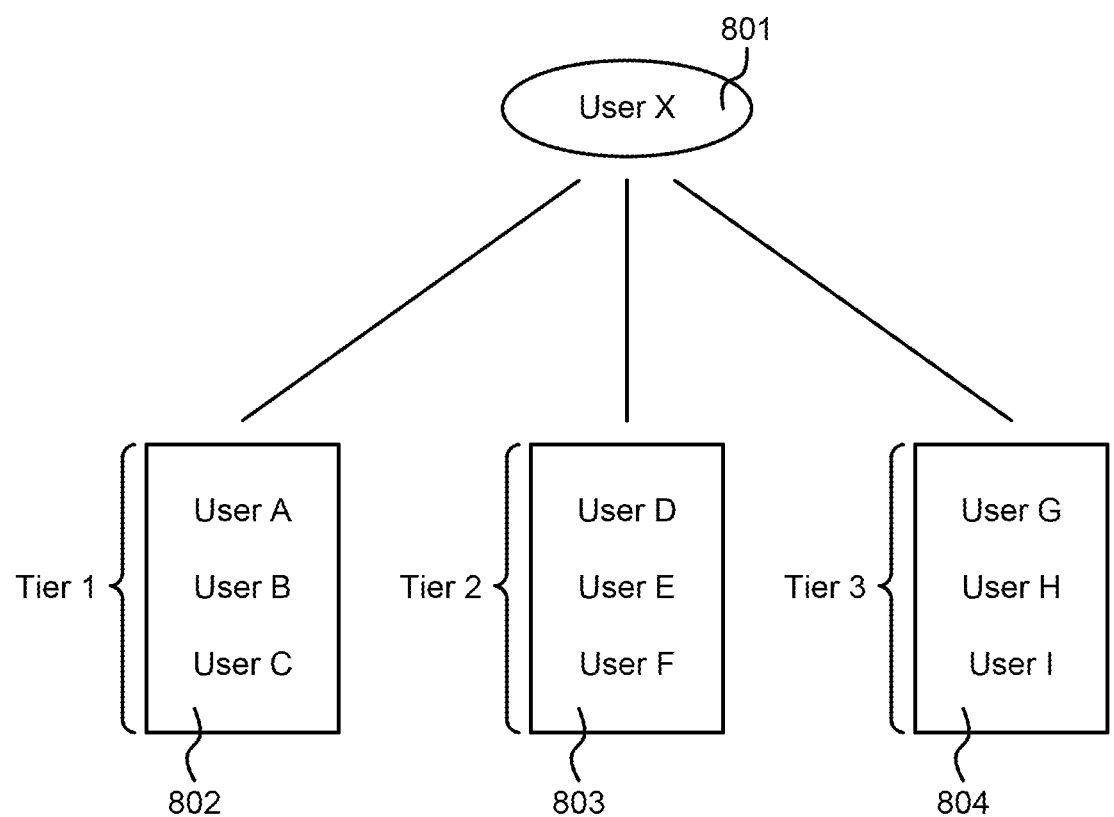
FIG. 8A is an exemplary diagram of a user-tier arrangement.

Referring to FIG. 8A, an exemplary user relationship structure is shown. User 801 is a registered user of system 100. Accordingly, user 801 has at least one device (e.g., at least one of camera unit 101 and switch unit 104) associated with at least one location of user 801's user account and has access to system 100 as described above. User 801 is linked to other users of system 100: tier 1 users 802, tier 2 users 803, and tier 3 users 804. Each tier of users represents a grouping of users having a specific set of permissions. Each tier contains any number of linked users. Further, a tier of users is not required to be populated with users. System 100 functions if user 801 is linked to no other users, a single user in a single tier, or any number of users in any tiers. It should be understood that while the embodiment of FIG. 8A and elsewhere illustrate a three-tier system, the systems and methods described herein may be implemented for any number of desired tiers.

Each tier of users designates a specific permission level. Each tier of users has a representative name that indicates the level of permissions a user has by belonging to an individual tier. The names may be based on well understood social, military, or hierarchical naming schemes (e.g., administrator, member, and limited member; sheriff, deputy, and officer; king, knight, and peasant; captain, lieutenant, and infantry; etc.).

User 801 is connected to tier 3 users 804. Under the three-tier system, tier 3 users 804 have the most restricted level of access to devices and receive the fewest alerts and notifications pertaining to the locations and/or devices associated with user 801. Tier 3 users 804 have access to view events and notifications that populate user 801's dashboard. Accordingly, when tier 3 users 804 log into system 100, tier 3 users 804 are directed to their personalized dashboards (e.g., FIG. 6F above). On the personalized dashboards, tier 3 users 804 are presented with personalized events and alerts resulting from devices associated with their accounts. Tier 3 users 804 may view any shared locations or devices of user 801 on the personalized dashboard. Tier 3 users 804 have the ability to view event data and leave comments pertaining to the events located on any shared location or device dashboards of user 801. However, tier 3 users cannot alter settings of user 801's account (e.g., settings pertaining to alert and notification preferences for user 801's locations and devices), activate/deactivate devices, or remove or hide events or alerts from other users (e.g., another tier 3, tier 2, or tier 1 user) such that the other users would not be able to view the event data or notification. Tier 3 users 804 may receive notifications originating from events and alerts associated with user 801 based on user 801's notification preferences. It is contemplated that user 801 can enable or disable alerts sent to tier 3 users 804.

User 801 is connected to tier 2 users 803. Tier 2 users 803 are granted all of the access of tier 3 users 804 and further have additional privileges. Unlike tier 3 users 804, tier 2 users have additional access to hide or remove events associated with user 801 such that other users can no longer view the event data or notification. For example, a tier 2 user can view event data associated with an alert (e.g., a video triggered by motion) and determine that the event is a false alarm and remove it or dismiss it from the dashboard. In the event a tier 2 user hides or removes events or notifications associated with user 801, an alert can be sent to user 801 and all other users associated with the event (e.g., another tier 3, tier 2, or tier 1 user) indicating that the event has been removed. Further, event data will always remain visible to user 801 until user 801 removes or hides the event data or notification from his or her dashboard. If user 801 removes or hides the event data or notification, the event data is no longer visible to any connected user (e.g., another tier 3, tier 2, or tier 1 user). If marked as dismissed or cleared, the event listing will still be visible and is merely updated to indicate a dismissed or cleared status. Alternatively, event data automatically deletes after a designated period of time (e.g., after a month). Tier 2 users 803 also receive notifications originating from events and alerts associated with user 801 based on their notification preferences. The notifications to tier 2 users 803 can be enabled or disabled by user 801.

User 801 is connected to tier 1 users 802. A tier 1 designation corresponds to user 801 granting the highest level of access to another user. Accordingly, tier 1 users 802 are granted all of the access capabilities of tier 2 users 803 in addition to having other privileges. Tier 1 users 802 may have the ability to activate and deactivate devices associated with user 801. For example, a tier 1 user can activate or deactivate a device (e.g., camera unit 101) associated with user 801. Tier 1 users 802 can initiate notifications or messages to other users (e.g., user 801, tier 2 users, and tier 3 users) linked with user 801. Tier 1 users 802 also receive notifications originating from events and alerts associated with user 801 based on their notification preferences. The notifications to tier 1 users 802 can be enabled or disabled by user 801.

User 801 has control as to what other users gain access and the level of access granted to user 801's account. User 801 can send an invite to another user inviting the user to join user 801's network. Alternatively, a user can send a request to user 801 in an attempt to join user 801's network. In either case, user 801 has control on which outside users gain access to user 801's network. After linking an outside user to user 801's account, user 801 designates a level of access for the outside user (e.g., tier 1, tier 2, or tier 3). Further, user 801 can select notification preferences for the added user. User 801 can also remove access that was previously granted to an outside user or change the level of access associated with a specific user. User 801 can send messages to connected users. User 801 can send messages to all connected users, specific individual users, and all users belonging to a specific tier of access. Messages sent between users are sent and stored within a messaging system built in to system 100. Users in receipt of a message can opt in to receive a notification indicating that a new message has been received. The notifications are sent according to a user's notification preferences.

User 801 can have different groupings of users for different locations. For example, user 801 can have a home location and an office location associated with his or her user account. Each location has a different set of associated devices. User 801 may wish to have two sets of linked users each having different permissions for the different locations. User 801 can establish a first grouping of tiered users for the home location and second grouping of tiered users for the office location. Each grouping of tiered users can include an entirely different group of users, the same group of users, or a partially overlapping group of users. Further, any overlapping users need not have the same tier assignment for each location.

After initially setting an associated user's tier of access, a user may wish to change the access he or she granted. For example, a user may initially provide an associated user with a tier 3 level of access because the user does not trust or does not know the associated user well enough. After a certain amount of time, the user may gain more trust in the associated user and wish to provide the associated user with tier 2 or tier 1 access to the user's location or account. Accordingly, the user can navigate to the associated management page of the graphical user interface (designated as "Friends," "Connections," "Associations," etc.), select the associated user, and select a new tier of access for the user. The selection may occur within a drop-down menu, as a toggle, by selecting and dragging the associated user into an appropriate column, or any other method involving the user interacting with the graphical user interface to change the associated member's tier of access. System 100 may or may not require an additional confirmation step before implementing the tier of access change for the associated user. After the selection is made, the command is sent to server 102, and the update is made within server 102 databases. Upon the tier change, system 100 is configured to notify the associated user of the tier change. Alternatively, system 100 does not notify the associated user of the tier change.

During user management, an account holder may wish to remove an association made with another user. Accordingly, once an association or link is created between two users, either user can remove the association without approval or permission from the other user. In many situations, access granted to one's account and/or locations will be temporary or conditional, and once the time frame expires or the condition is met, the association is no longer needed or wanted. Further, it may be desirable to remove an association with a user that is not actively participating in the monitoring of a location or is abusing a certain location's or user's remote devices. Any registered user can remove and/or ban other users from his or her account or his or her locations. To remove the association, the user wishing to remove the association logs into system 100, navigates to a member management page of the graphical user interface, and selects the appropriate option. The option may be as simple as clicking an interactive "delete" or an "X" button next to the user to be removed in a listing of associations. The process of removing an association may be a two-step process with a confirmation step to avoid accidental removals. After selection and the optional confirmation, server 102 receives the user command and updates its databases to reflect the removed association. Upon removal, system 100 is configured to notify the removed user of the removed association. Alternatively, system 100 does not notify the removed user of the removed association.

Figure 8B:
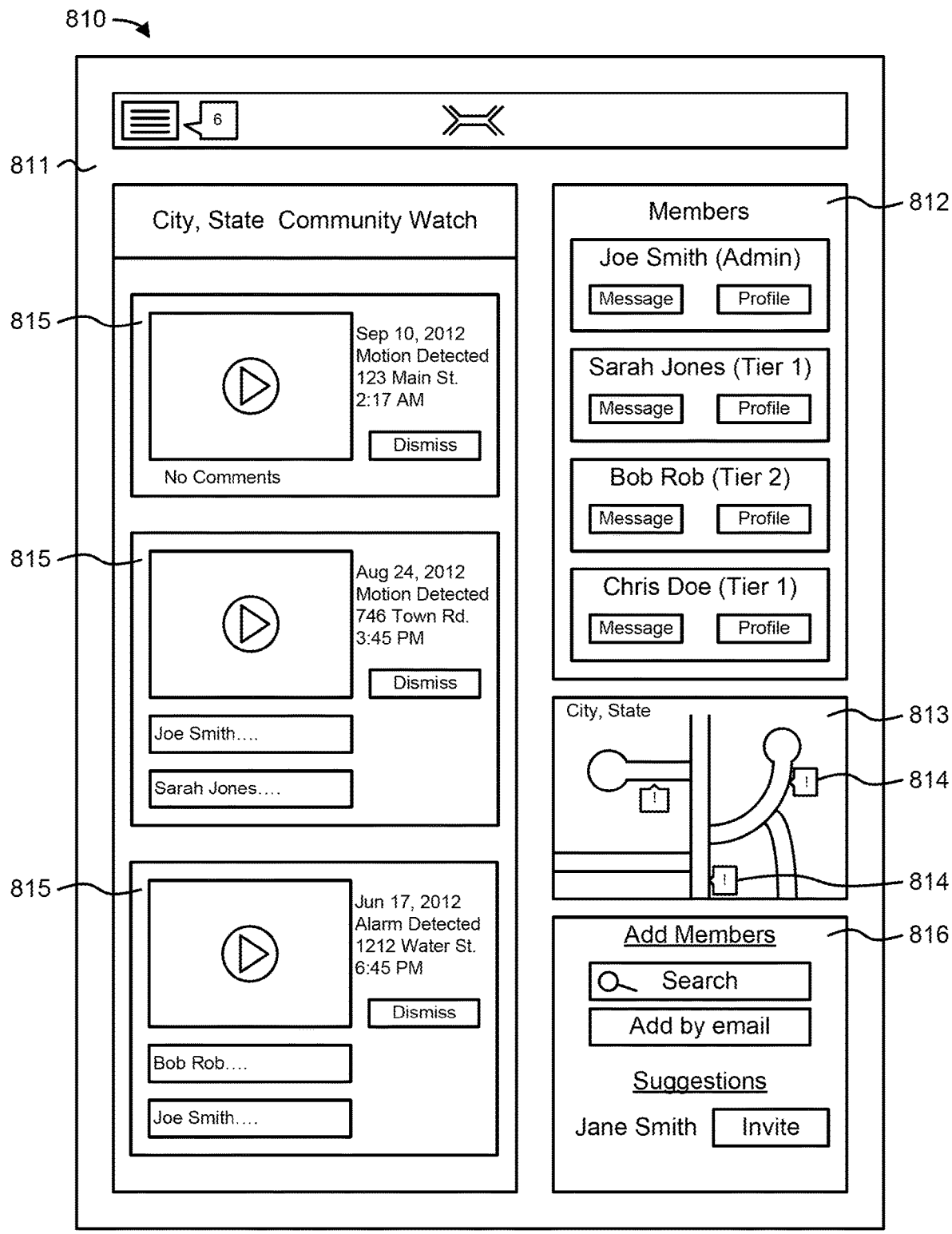
FIG. 8B is a detailed view of an exemplary community watch dashboard as displayed on a graphical user interface.

In addition to linking individual users of system 100 with one another, multiple accounts and select devices can be linked to form an online community belonging to a group of users. Each community has an individualized dashboard. Referring to FIG. 8B, an example graphical user interface showing a dashboard 811 for an online community 810 is shown. Dashboard 811 is similar to dashboard 616 of FIG. 6F. Online community 810 includes members 812. Each member has a designated role or belongs to a designated tier. Each community requires at least one community administrator (shown as "Joe Smith"). The community administrator is in charge of adding and removing associated members, adding and removing associated devices, and updating any community-wide settings. Non-administrative members are classified into tiers having the same properties as the classification tiers discussed above with respect to user-to-user account linking.

Online community 810 links users of a particular geographic proximity (shown as "City, State"). The geographic location is shown on dashboard 811 on a displayed map 813. Map 813 is an interactive widget. A member viewing dashboard 811 can zoom in, zoom out, and reposition map 813. The map data may be powered by a third party service such as Google™ or Mapquest™. Map 813 also includes event indicators 814 that correspond to community event listings 815 published on dashboard 811. Event indicators 814 represent the geographic location of the detected event. A user viewing dashboard 811 can click on the event indicator to learn more information on the event. Clicking on any of the event indicators 814 will scroll or otherwise change the dashboard to the associated event. Event indicators 814 can be cleared, hidden, or removed by the community administrator or any tier 1 community member. In an alternate embodiment, online communities are formed regardless of geographic proximity. As such, system 100 may be used as a family and friends monitoring system. In this case, the online community can correspond to a family, a group of friends, or other grouping of individuals. The linked users are not limited by geographic proximity.

Online community 810 has a group of associated devices. Associated devices are managed by the community administrators. Associated devices are registered to accounts of any community members 812. Associated devices may also be associated with just online community 810, and not an individual user of system 100. Upon detection of an event, an event listing 815 is published on dashboard 811. Further, members 812 of online community 810 are notified of a detected event in accordance with the individual member's notification preferences. Each event listing includes event data (e.g., an embedded video), a location identifier, a time identifier, and a member action portion. The member action portion includes a comment thread and a dismiss button. Community members (e.g., administrators, tier 1, tier 2, and tier 3) can view the video file and leave comments. In an exemplary embodiment, community administrators and tier 1 members can dismiss an event. Upon event dismissal, an alert may be sent to community administrators, and the event listing may be removed from dashboard 811 or otherwise marked as dismissed.

Online community 810 includes an add members feature 816. Depending on who is viewing dashboard 811, add members feature 816 displays different options. Only community administrators are authorized to add members to online community 810. Accordingly, if a community administrator is viewing dashboard 811 (as pictured in FIG. 8B), non-community users of system 100 can be added to the online community. If a non-administrator community member is viewing dashboard 811, the member can suggest users to the system administrators for approval. Add members feature 816 operates in the same manner as an individual user adding an association (as discussed above).

Figure 8C:
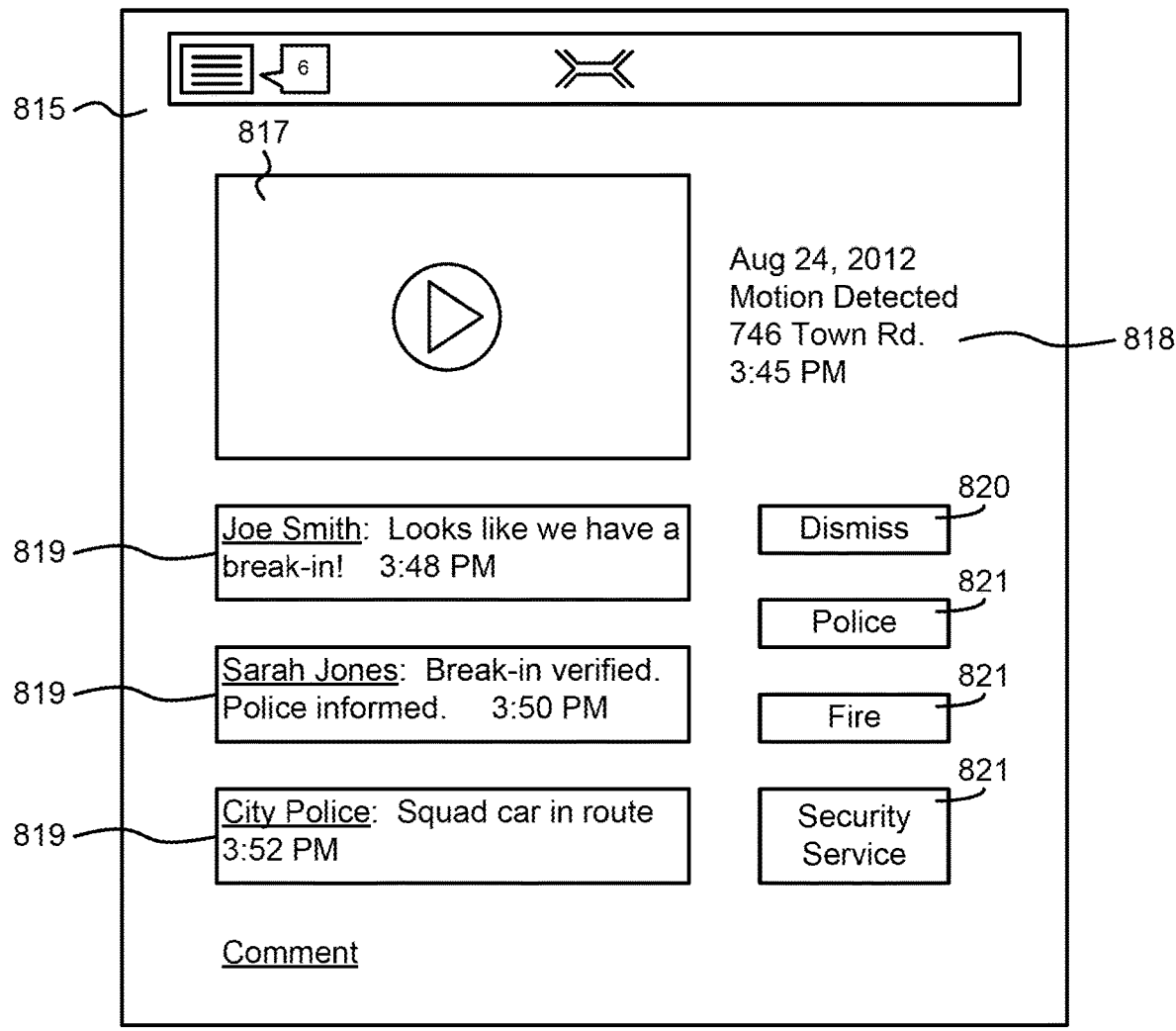
FIG. 8C is a detailed view of an event listing.

In an exemplary embodiment, system 100 is configured to link users and communities with government provided emergency services and private security services. Referring to FIG. 8C, a detailed view of a detected event listing 815 is shown. Event listing 815 is published on dashboard 811. Event listing 815 includes event data 817 (shown as a video), event information 818, event comments 819, dismiss button 820, and outside service alert buttons 821. Outside service alert buttons 821 are programmable to send an alert to a local police department, a local fire department, or a local private security service affiliated with online community 810. Selecting any of the outside service alert buttons 821 sends a notification to the indicated party. The notification includes at least event data 817 and event information 818. Event data 817 is conveyed to the outside service directly (e.g., embedded in an MMS or attached as a file in an e-mail) or indirectly (e.g., the notification includes a hyperlink to event content hosted online). Once an alert is received, the outside service has the ability to post comments 819 to event listing 815. Alerting the government agency or private security service is limited to users having a certain level of access (e.g., tier 1 or administrator) or is open to all linked users.

Another feature of system 100 is the notification feature. Upon detection of an event by a remote device (e.g., detection of motion by camera unit 101), system 100 is configured to initiate notifications to users associated with the remote device. Registered users of system 100 can optionally configure individual notification preferences. The notification preferences include notification channels, notification times, location or device specific notification preferences, the notification message type (standard, custom), and whether the notification includes event data captured by the remote device (e.g., video data captured by camera unit 101 upon the detection of an event). System 100 is configured to notify users through multiple channels, including, but not limited to: SMS, MMS, telephone call, e-mail, social media message, and/or application push notifications. As discussed above with respect to the server notification process (see FIG. 4E), each notification channel has different capabilities and potentially different notification formats. For example, SMS messages are limited to text, while MMS messages may include captured event data such as video, picture, and audio data in addition to text. When configuring notification preferences, a user selects at least one channel, selects a message type, and selects a timing factor. Multiple channels may be selected for redundant notices (e.g., such that a user receives both an SMS message and an e-mail message upon the detection of an event). The message type includes the choice between a standard default message and a voice notification. The standard message includes text indicating the detected event or identified status, the location of the event (e.g., home, office, etc.), the affected remote device, the time of the event, and an embedded URL or link to the event or status listing on the location or user dashboard. If a voice notification is selected (e.g., telephone), the standard message is an audible message in which all of the above text without the URL or link is read to the user. It should be understood that the above sample standard messages are not an exclusive listing, but just samples of default message formats. The timing factor relates to whether the notifications will be sent every day and at every hour or only during specific days and times. After setting up a notification channel, a user can further activate or deactivate notifications on demand by interacting with the user interfaces of system 100 to update his or her account settings. All notification settings are sent to and stored in server 102 through user interaction with the graphical user interface of system 100.

As indicated above, a user can create customized notification messages. The custom notification message may be a text message or a voice message. For example, the user may type a custom message such as, "Motion detected in the backyard!" The custom message may be non-security related. For example, the user may have a camera unit 101 placed at his or her front door and a custom alert set up for the night before a trash pickup with a custom message reading "Remember to take out the trash." The user can assign the custom message to a specific remote device, a specific location, or all locations for all times or a specific time range. The specific time range may be recurring (e.g., every Tuesday, every two weeks, monthly, etc.). Further, the customized notification messages may further be applied to user-owned locations such that the customized notification message is the default message for other users associated with the user-owned location.

A user of system 100 can further set a notification schedule for a user-owned location. For example, if the user has a location (e.g., "Office") having a grouping of associated users, the user can program a notification schedule indicating when and how associated users are notified of detected events at the location. The user programs the notification schedule by sending server 102 commands through the graphical user interface of system 100. An exemplary notification schedule 900 is shown in FIG. 9. Notification schedule 900 is presented to the user through a system 100 graphical user interface. Notification schedule 900 includes a listing 901 of users, a listing of delay times 902, and a listing of enabled notification channels 903. Notification schedule 900 is location specific, and accordingly lists the user-owned location the schedule applies to (shown as John's Office). Each user within user listing 901 includes name 904 and privileges indication 905. Privileges indication 905 generally correlates to the user's privilege status within the location (e.g., what tier the user belongs to or whether the user is an owner). Further, each listing includes delay time indication 906 and enabled notification channel indication 907. Delay time indication 906 is an interactive indication on the graphical user interface, shown as a drop down list. Accordingly, the location owner can select the drop down list to change the notification delay time. The delay time is shown as a number of minutes, but other units (e.g., seconds) may be used. Further, notification channel indication 907 includes an edit button 908 such that the location's owner can add or remove channels of notification for each user in the listing. As shown by various listings, redundant notifications (e.g., multiple notifications through multiple channels) are allowed by system 100. The location's owner can further add or remove associated users from notification schedule 900 by interacting with add/remove user button 909.

In operation, notification schedule 900 sets the order of users to be notified. Thus, referring to notification schedule 900, upon detection of an event at John's Office, John Smith, as the location's owner, will be notified immediately (delay time of 0 minutes). John Smith will be notified via both SMS and e-mail. The next user, Karl, will be notified 5 minutes after the event was detected via SMS. Michelle will be notified after Karl (7 minutes after the event was detected) via telephone. Each user will be notified via the enabled notification channel at the specified delay time. However, at any point in the notification process, a notified user can respond to the event. A user responds to the event by logging into system 100 after receiving the alert, navigating to the event listing (e.g., event listing 815 of FIG. 8B; possibly by selecting an embedded link in the notification), and dismissing, deleting, or taking other action on the event listing. Once a user responds to the event, notification schedule 900 may be cut off, and users that have not been notified because of their associated delay times, will not be notified by system 100. All users on notification schedule 900 will continue to be notified in some situations. For example, the event listing may contain an option to continue the notification schedule despite the user responding to the notification and event listing. System 100 may be configured to send an "all clear" message to already notified users. The all clear message may include an indication of which user responded to the detected event and when the user responded.

A user of system 100 can configure notifications to non-users. For example, a husband (user) may wish to notify his wife (non-user) of events detected in their home. The non-user can sign up to receive notifications. The non-user may be a member of a notification schedule for a location (e.g., notification schedule 900). However, the non-user does not have the same set of privileges and capabilities as a registered user. For example, the non-user may have restricted access such that he or she cannot leave comments, delete postings, change device or location settings, and message other users. System 100 may require the non-user to register for temporary guest access before receiving notifications. Alternatively, the user provides system 100 the non-user information without requiring the non-user to register or log into system 100.

A user of system 100 can further configure associations with and alerts to government agencies (e.g., police department, fire department, etc.) and/or private companies (e.g., private security company, private health company, private property management company, etc.). A user may wish to link his or her account to a government agency for quick and optionally automatic responses to detected events. For example, a user may associate the local police department with his or her location such that when an event is detected, the police are notified (e.g., so that the police may view the event video). Further, a user may wish to link his or her account with a private company, such as a private security monitoring service such that the monitoring service can receive alerts and view contents. The private company may be registered with system 100 such that a representative of the private company can be associated with the user's locations, view event listings, and function as any other associated member.

The government agency and/or private company (or a representative of either) can be members of a notification schedule for a location (e.g., notification schedule 900). The notification message is sent to a dispatch department of or an operator employed by the associated government agency or private company. Alternatively, system 100 limits notification the associated government agency and/or private company to a user-initiated orientation (e.g., through buttons 821 of FIG. 8C) to minimize the initiation of notifications pertaining to false alarm situations. System 100 can make a direct data link established with the associated government agency or private company such that a data message (e.g., e-mail or a form of push notification) can be sent to the agency or company and the message can then include captured event data. The notification message includes the address of the detected event, the time of the detected event, the nature of the detected event (e.g., motion detected), the name of the location owner, the contact information for the location owner, and any event data capable of being transmitted with the notification message.

Once a notification message is sent to a government agency or a private company, an additional notification is sent to at least the owner of the location of the triggering event notifying the owner of the notification to the agency or company. It is further contemplated that other associated members of the location receive a similar notification based on the owner's desired preferences (e.g., the location's owner can opt to have the notification sent to specific associated users or users belonging to a specific tier). Further, system 100 updates the event listing to indicate that the government agency or private company has been notified of the occurrence. In some situations, the government agency or private company may provide a status update to system 100, in which case the status update is also added to the event listing (e.g., "squad car dispatched"). The status update may become part of the threaded comments listing to show the government agency or private company statuses in line with user comments.

Alternatively, once a government agency or private company is associated with a location, a user can notify or message the agency or company directly from the dashboard (see, e.g., FIG. 8C). On each appropriate event listing (e.g., not on an event listing merely indicating a low battery for a device) there may be an option to send a message or notify the government agency or private company. Upon selection of the option through the graphical user interface, the user has the option of sending a default message or a custom message to the agency or company. Further, the user must confirm that the agency or company is to be notified. The option to send a notification to a government agency or a private company is only available to certain members at the location owner's preference. For example, a user may arrange a location such that only the user and tier 1 users have the ability to notify the government agency or private company.

In an exemplary embodiment, notifying the government agency or private company only occurs in a verified emergency situation. It may be presented to the user that wishes to link or associate a government agency to his or her account that government agencies should only be alerted in true emergency situations and that false alerts may result in fines from system 100 and/or from the government agency. Further, to cut back on the amount of agency or company responses to notifications sent that correspond to false alarm situations, system 100 enables an all clear notification to be sent to the agency or company. For example, after an alert is sent to the government agency or private company, a user has the option of sending a cancellation notice to the government agency or private company.

Users of system 100 may pay an access fee in some embodiments. The access fee may vary based on certain user account attributes. For example, a user may pay a first price for registering a set number of locations or devices, and an additional fee for each additional location or device. The price to gain access to system 100 may be related to other user account attributes, including, but not limited to number of member associations, subscriptions to third-party emergency services, subscriptions to third-party monitoring services, level of access, and amount of participation with others' accounts. System 100 fees may be a one-time fee, a monthly subscription, or a pay per service type of account. In an alternative arrangement, system 100 is free to use. In yet an additional arrangement, system 100 is free for a basic membership including a limited set of features and capabilities (e.g., becoming a tier 3 member linked to another's account) and is a charge service for more advanced user accounts.

Smart Installation and Advanced Customization

The various components of system 100 include various hardware and software features which assist users in properly setting up system 100. These features include network strength indicators, robust installation feedback features, customized audio alerts, features for adjusting motion detector sensitivity, and a direct link between remote devices and client devices to assist with placement. These features are described in a series of subsequent sections.

Network Strength Indicators

In an exemplary embodiment, in order to properly communicate with server 102, each remote device must connect to a network in communication with server 102 (e.g., the Internet). In many embodiments, this is completed by connecting each remote device to an access point (e.g., a wireless router). Remote devices (e.g., camera unit 101 or switch unit 104) may not include a screen capable of indicating network signal strength (e.g., RSSI) at the time of placement. Such remote devices may include one or more mechanisms to assist users in achieving proper placement of remote devices of system 100.

Figure 10A:
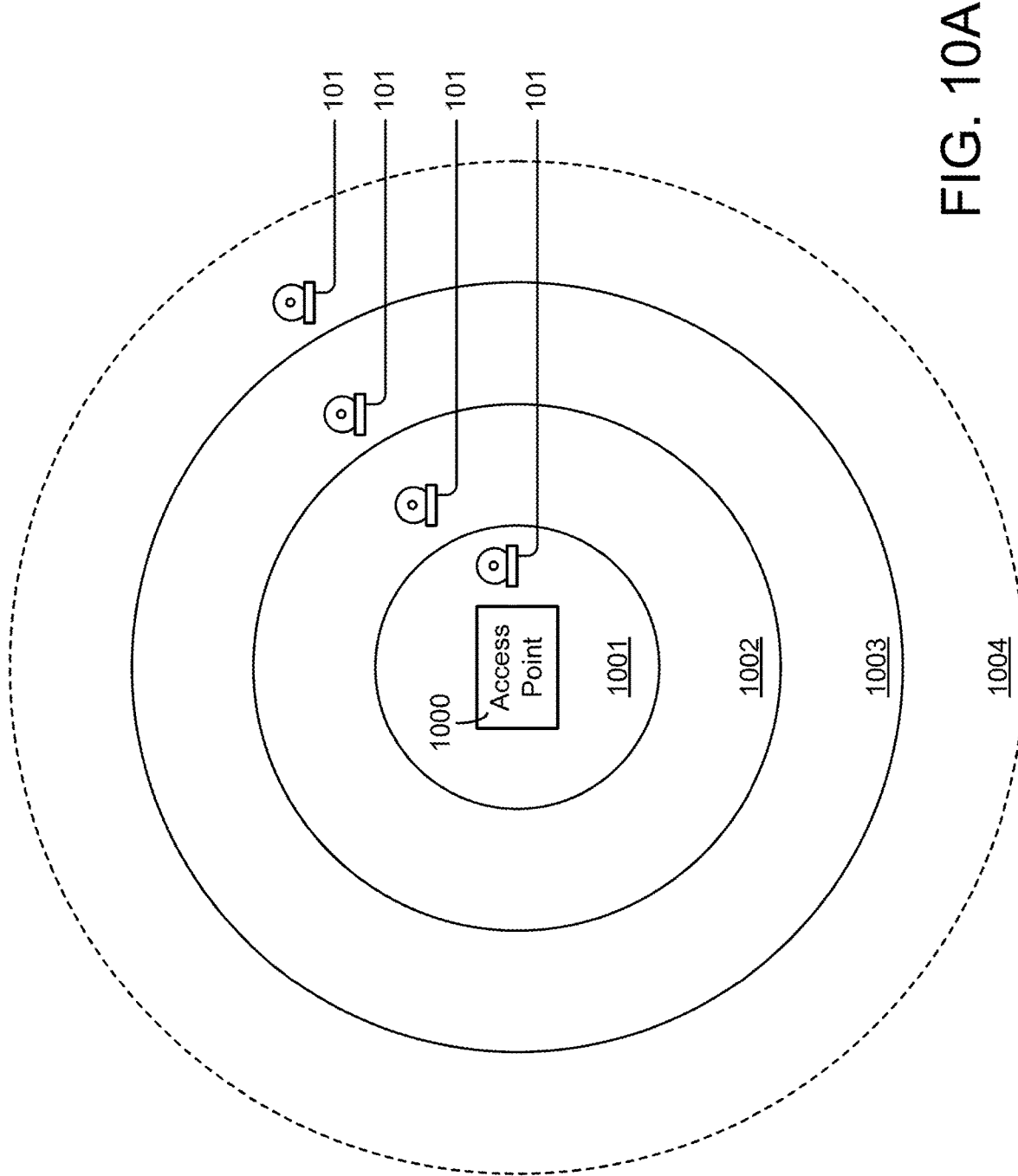
FIG. 10A is a schematic view of a camera unit placement with respect to a wireless access point.

Referring to FIG. 10A, a schematic of camera unit 101 placement with respect to a wireless access point 1000 is shown. Wireless access point 1000 transmits wireless signals to remote devices, including camera unit 101. As the distance from access point 1000 increases, the wireless network signal strength decreases. Further, objects within the line of sight between access point 1000 and connected devices decrease wireless network signal strength. Accordingly, placing camera unit 101 within zone 1001, the closest zone to access point 1000, achieves the strongest wireless network signal strength in comparison to placement within further zones (zone 1002 and zone 1003). If camera unit 101 is placed outside the wireless signal broadcast zones (e.g., in zone 1004), camera unit 101 will not achieve a stable wireless network connection with access point 1000. Accordingly, during the network registration process, a user receives feedback directly from the remote device being configured with system 100 (e.g., camera unit 101) as to the network strength (e.g., wireless signal strength from access point 1000).

In a first arrangement, the remote device includes a multi-color LED. The LED changes colors to indicate different wireless network signal strengths (e.g., green corresponds to good, yellow corresponds to fair, and red corresponds to poor). Alternatively, camera unit 101 includes a series of different colored LEDs that provide status indications. In yet another alternative embodiment, camera unit 101 includes a row of LEDs having the same color such that the LEDs form a signal status bar (e.g., when five of five LEDs are lit up, the wireless signal strength is approximately 100%; when four of five LEDs are lit up, the wireless signal strength is approximately 80%; etc.). The LEDs may be activated by pressing a button on the remote device or are automatically activated during the network registration process. Accordingly, when a user is attempting to setup the remote device to communicate with access point 1000, the user knows if the device is being placed in a dead zone, in an area with poor wireless signal strength, or in an area with strong wireless signal strength.

In some embodiments, the remote device indicates wireless network signal strength through emitted audio notifications. The audio notifications may include a series of beeps that are emitted during the network registration process. For example, the remote device may be configured to emit one beep a second if there is no network signal strength, one long pulse if there is poor network signal strength, two long pulses if there is fair network signal strength, and three long pulses if there is good network signal strength. Alternatively, the audio notifications include voice replies (e.g., "no signal," "poor signal," "fair signal," "good signal," etc.). In yet another alternative arrangement, the user registering the remote device with access point 1000 receives an indication of the wireless network signal strength through client device 103. During the network registration process, the user directly connects client device 103 to the remote device (e.g., camera unit 101) via an ad-hoc network connection (e.g., camera unit 101 includes a miniAP mode in which camera unit 101 broadcasts a discoverable wireless network such that client device 103 can directly connect with camera unit 101 to configure network settings and camera unit 101 settings), views an access page generated by the remote device, and uses the input device of client device 103 to program the wireless network's service set identification (SSID) and any required passwords to access the wireless network. The remote device provides feedback to the user through client device 103 indicating the wireless network signal strength so the user can choose to move the remote device to provide the remote device with a stronger wireless network signal.

In addition to signal strength feedback, remote devices provide additional network trouble shooting feedback to users during the installation process. In some situations, a remote device will have a strong network connection with access point 1000, however, the remote device will not be able to contact server 102 through access point 1000. Accordingly, the remote device will provide network troubleshooting instructions to the user. For example, if a strong network connection exists between camera unit 101 and access point 1000, but camera unit 101 cannot access server 102, camera unit 101 presents the user with a list of potential solutions (e.g., move the access point away from any walls, restart the access point by unplugging the access point and plugging the access point in, verify an Internet connection is available through the access point, restart the broadband modem by unplugging the broadband modem and plugging the broadband modem back in, etc.). Any of the above instructions are audible commands played by camera unit 101 through speaker 208. Alternatively, the commands are displayed to the user through client device 103 while client device 103 is directly connected to camera unit 101.

Audio Alerts

Figure 10B:
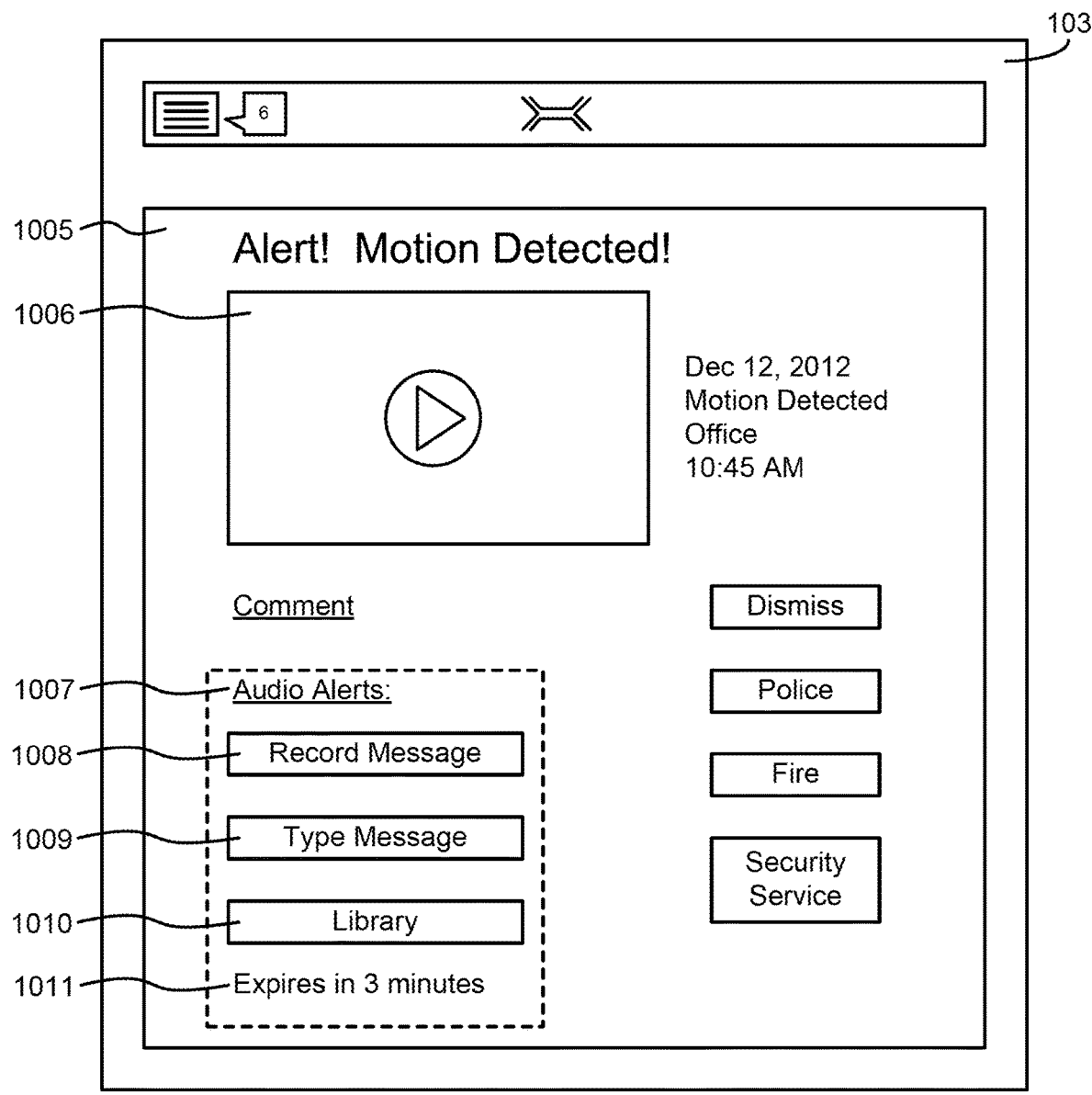
FIG. 10B is a detailed view of an exemplary interactive graphical user interface.

Camera unit 101 is configured to play an audio alert after detection of motion. The audio alert may be a standard message, a custom message, or a message selected from a library. Referring to FIG. 10B, an exemplary interactive graphical user interface 1005 displayed on client device 103 is shown. Interactive graphical user interface 1005 displays an exemplary push notification for a detected event. The push notification includes event data 1006 (e.g., captured video) and other information pertaining to the event. The notification further includes audio alert feature 1007. Audio alert feature 1007 presents the user the option to play an audio alert over the camera unit that detected the motion. The user is presented the option to record a customized voice message by selecting button 1008. The user is presented the option to type a message, which will be converted into audio via a text-to-speech module, by selecting button 1009. The text-to-speech module is located on any of camera unit 101, server 102, and/or client device 103. Further, the user is presented the option to select an alert from a library of alerts by selecting button 1010. The library of alerts includes standard, pre-programmed messages (e.g., "The police have been called," "We caught you," "Stop right there," etc.). Further, the library of alerts includes both free alerts and premium alerts. Free alerts correspond to a basic alert (e.g., a siren, a standard alert, etc.). Premium alerts correspond to specialized alerts (e.g., if the alert is read by a celebrity voice). System 100 charges the user for selecting a premium alert. Further, the option to play an audio alert in response to an event being detected is time limited. For example, an audio alert sent an hour after motion is detected is not likely to reach the ears of an intruder. Accordingly, the event notification includes a countdown timer 1011 that indicates when the window for sending an audio alert closes. The duration of the window is a standard time period set by system 100. The standard time period may be modified on an account-by-account basis based on user preferences.

Figure 10C:
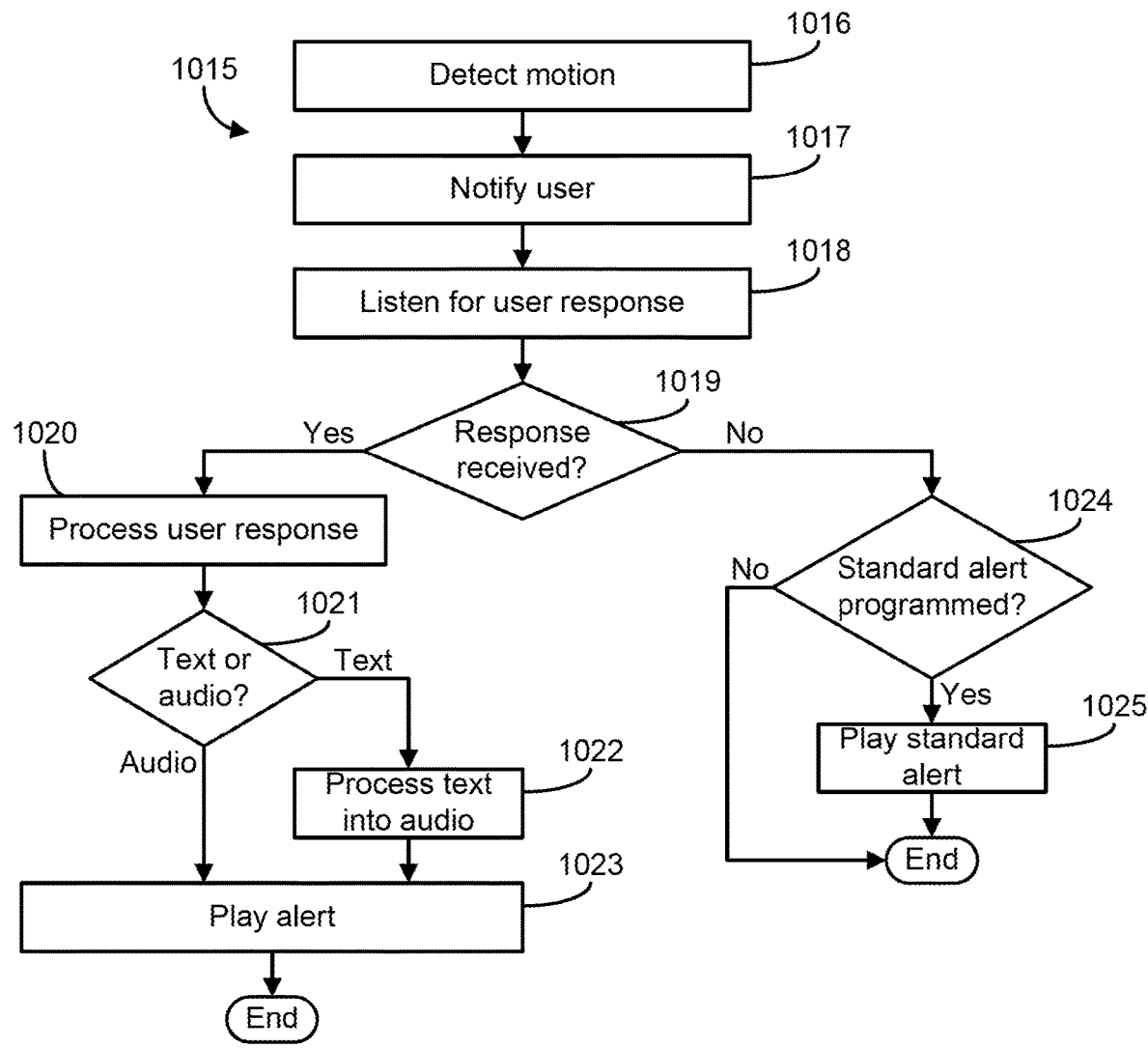
FIG. 10C is a flow diagram detailing a method of playing an audio alert through a camera unit.

Referring to FIG. 10C, a flow diagram of a process 1015 of playing an audio alert through camera unit 101 is shown. Process 1015 begins when motion is detected by camera unit 101 (step 1016). Camera unit 101 detects motion and captures video as discussed above with respect to FIG. 2L. During the event detection process, the user that is associated with camera unit 101 is identified and sent a notification (step 1017). The notification includes an option to initiate an audio alert to be played at camera unit 101 (see, e.g., button 1009 of FIG. 10B). The option to initiate an audio alert is only available to the user during a designated time window (e.g., for the first five minutes following the event detection). An audio alert's chances of being heard by the person or animal that set off the motion detector decreases with the amount of time passed since the motion was detected. The time window length for initiating an audio alert is set as a standard across all users of system 100. Alternatively, each user can customize the time window length.

Camera unit 101 listens for a user response relayed from server 102 for the time window duration (step 1018). During the listen period, wireless transceiver 212 of camera unit 101 is always active to reduce system 100 latency. Accordingly, server 102 does not need to wait for a check-in signal to relay the user response. The user initiates the response to the notification by interacting with the interactive graphical user interface presented on client device 103 (e.g., as shown in FIG. 10B). Alternatively, a user of system 100 may respond to and initiate audio alerts through non-push forms of notification. For example, if a user receives the event detection notification via SMS or e-mail, the user can respond to the SMS or e-mail message with text that identifies an alert file to be played, text that will be converted via a text-to-speech module into an audio message that is played at camera unit 101, or an attached audio file to be played.

If a response was received (step 1019), the response is processed (step 1020). The response is either processed by camera unit 101 or by server 102. If a custom audio alert is to be played, the response will include a user recorded message or a user typed message. Accordingly, system 100 determines what type of message is contained with the response (step 1021). If the response includes a typed message to be converted into audio, system 100 uses a text-to-speech conversion module to convert the text into an audio file (step 1022). The text-to-speech conversion module is contained on server 102. Alternatively, the text-to-speech conversion module is contained on camera unit 101. The text of the response message is converted to an audio file. If the response includes a customized recorded message, the recorded message is contained within an audio file, which is sent for playback at camera unit 101. In either case, the audio file is played at camera unit 101. Alternatively, the response identifies an audio data file containing the audio alert to be played. The audio data file is stored in a library in memory 214 on camera unit 101 or in mass storage 405 on server 102. In this case, the audio data file is retrieved and played by camera unit 101 (step 1023).

If system 100 determines that no response was received in during the listen window (step 1019), system 100 next determines if there is a standard alert programmed (step 1024). If a standard alert is programmed, the sound is played at camera unit 101 (step 1025). The standard alert is a pre-recorded customized audio file or a standardized system audio file. If no standard alert is programmed, no sound is played at camera unit 101.

In an alternative embodiment, camera unit 101 does not open a listen window for a user response (as in step 1018), and camera unit 101 is programmed to automatically play an audible alert upon motion detection. The audible alert is stored in memory 214 of camera unit 101. Alternatively, server 102 sends camera unit 101 an audio file containing the audio alert upon receipt of a notification indicating that motion has been detected. In either case, camera unit 101 or server 102 stores a plurality of audio files such that a single audio alert is selected from the plurality of files for playback based on characteristics of the detected event. For example, the audio alert is a camera unit 101 specific alert (e.g., a designated audio alert for an office camera versus a hallway camera), a time specific alert (e.g., a first audio alert for playback during a first time window and a second audio alert for playback during a second time window), or a motion signature dependent alert (e.g., a first audio alert for a small motion detector signature indicating the presence of a pet and a second audio alert for a large motion detector signature indicating the presence of a person). Camera unit 101 can play a sequence of audio alerts upon detection of an event. The audio alert is a customized voice alert, a siren, a noise intended to scare an intruder away, and/or a noise intended to startle an intruder and cause the intruder to look at the camera for an additional image capture of the intruder's face.

Adjusting Motion Detector Sensitivity

Figure 10D:
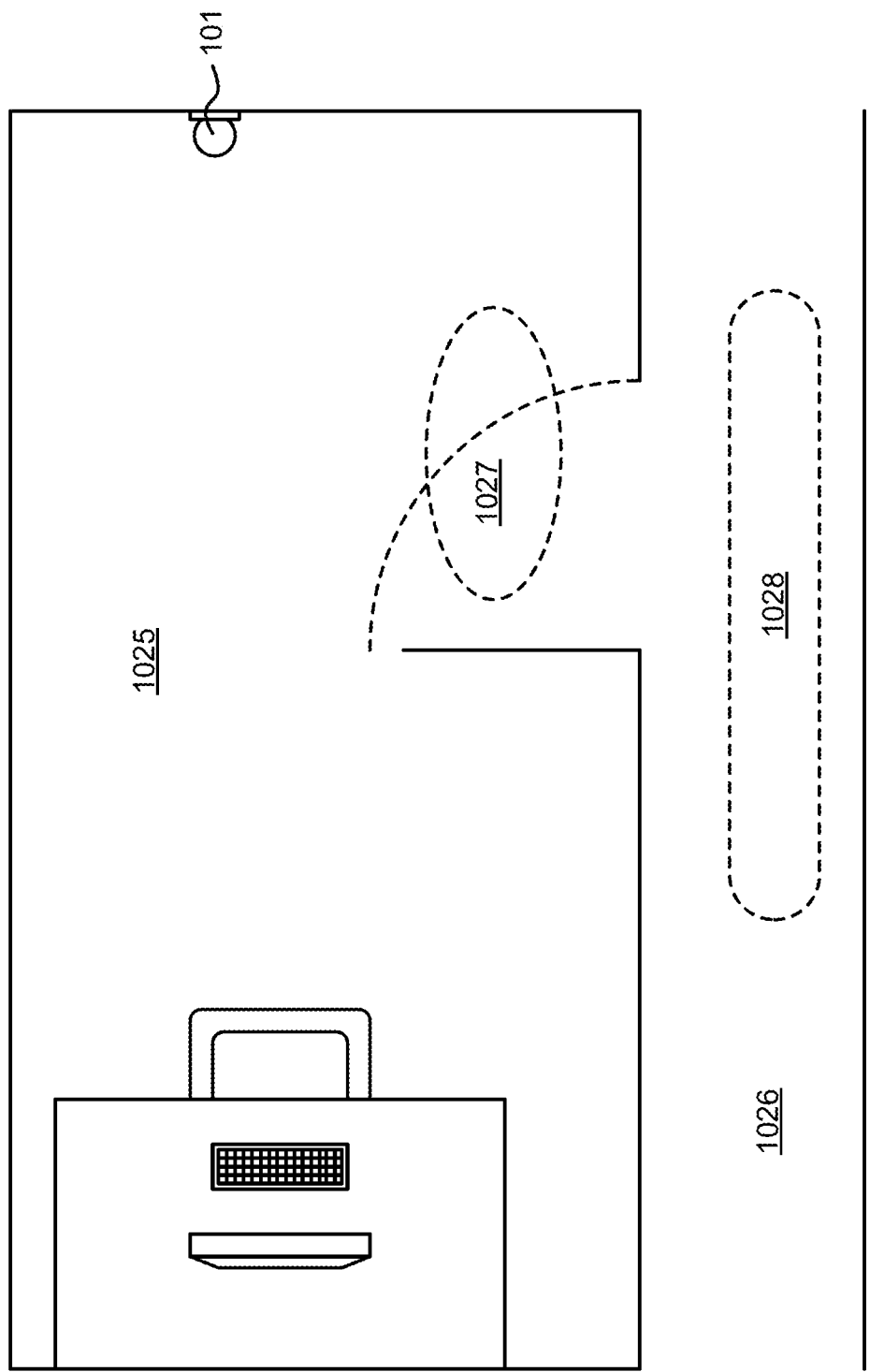
FIG. 10D is a schematic view of a camera unit placement in an office.

As explained above, camera unit 101 includes motion detector 204. Motion detector 204 is any of a passive infrared sensor, a radio-frequency field sensor, a microwave radar sensor, an ultrasonic sensor, or a vibration sensor. Motion detector 204 is adjustable both in sensitivity and in zone of detection. Referring to FIG. 10D, an exemplary arrangement of camera unit 101 in an office 1025 is shown. Camera unit 101 is placed within office 1025. The user owning camera unit 101 positioned camera unit 101 to monitor an entrance area 1027 of office 1025 in order to detect unauthorized entrances into office 1025. Motion detector 204 of camera unit 101 is sensitive enough to detect motion in zone 1028 or hallway 1026. The user is not interested in receiving notifications regarding motion being detected in hallway 1026. Accordingly, motion detector 204 is configured to have its sensitivity and/or zone of detection adjusted.

Figure 10E:
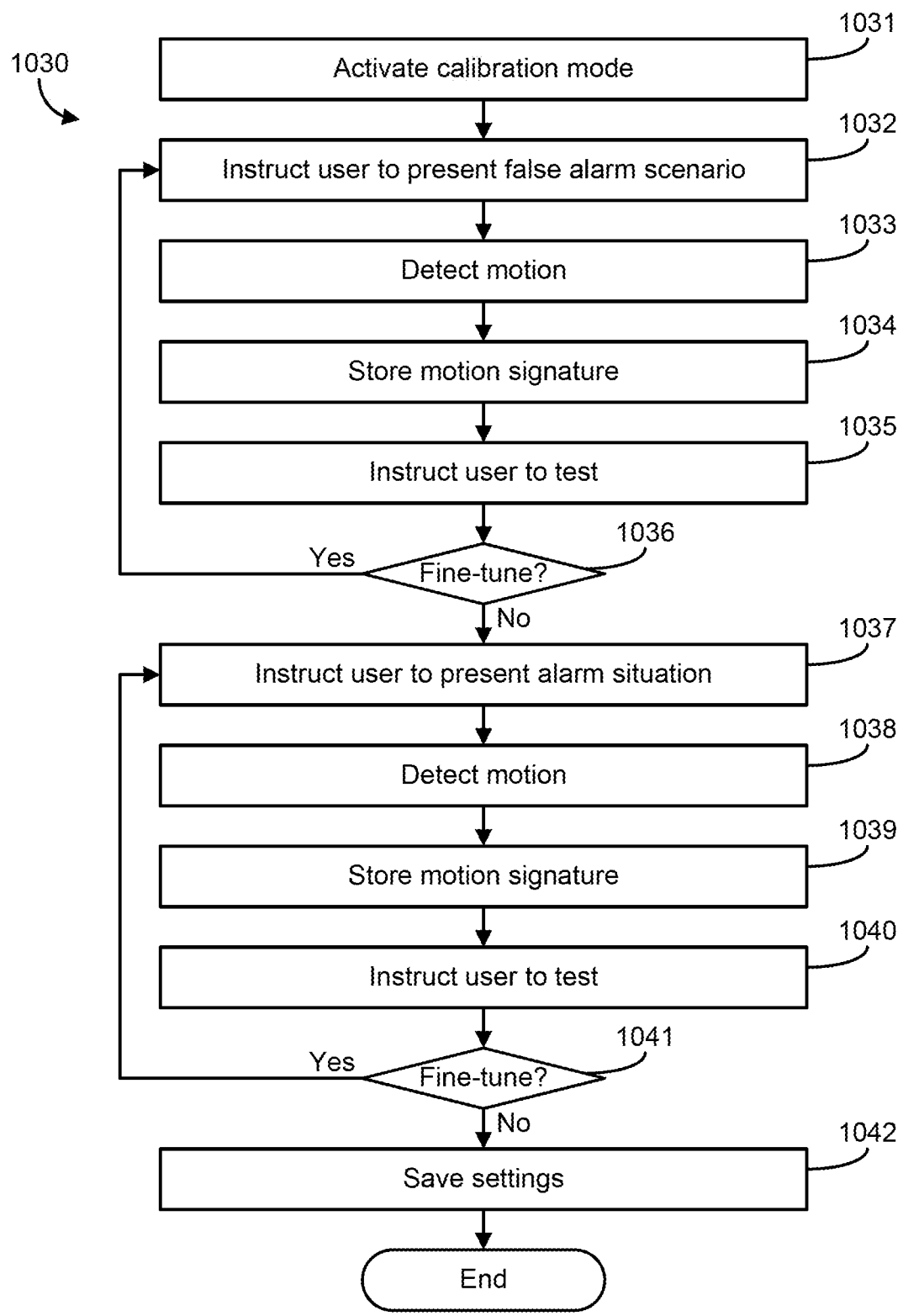
FIG. 10E is a flow diagram detailing a method of adjusting motion detector sensitivity.
Figure 10F:
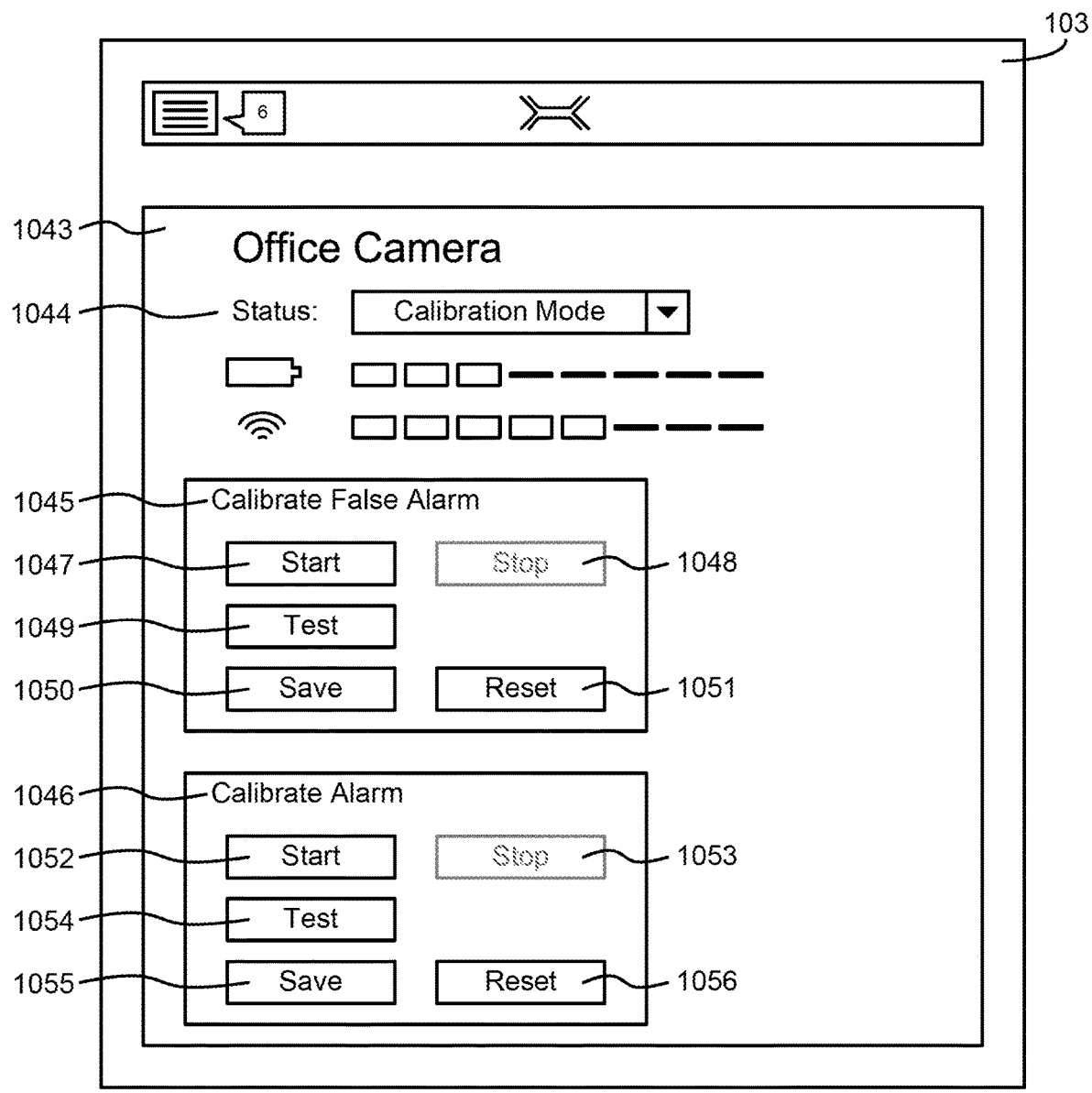
FIG. 10F is an exemplary interactive graphical user interface for a calibration mode.

Referring to FIG. 10E, a process 1030 of adjusting the sensitivity and/or zone of detection of motion detector 204 is shown. The user of system 100 activates a calibration mode on camera unit 101 (step 1031). The user places camera unit 101 in calibration mode by selecting the device and setting the device status as calibration mode from the device's dashboard on system 100. The selection is made through a device status screen (e.g., as shown in FIG. 6D or FIG. 10F). Alternatively, the user configures a direct connection between camera unit 101 and client device 103 such that a device page is generated by camera unit 101 for display on client device 103. In either case, once calibration mode is activated on camera unit 101, the user can interact with camera unit 101 through a graphical user interface displayed through client device 103 (e.g., as discussed below with respect to FIG. 10F).

Once in calibration mode, camera unit 101 instructs the user to present a false alarm scenario (step 1032). The instruction is an audible instruction (e.g., a beep emitted from speaker 208, a voice instruction emitted from speaker 208, etc.), a visual instruction (e.g., a blinking of LEDs 206), and/or an instruction displayed on client device 103 through the graphical user interface. Upon instructing the user to demonstrate a false alarm scenario, motion detector 204 is activated and detects the demonstrated scenario (e.g., a user walking across an area that the user does not wish to detect motion in) (step 1033). The detected motion signature is stored in memory 214 as a false alarm signature (step 1034). Accordingly, during event detection, if motion detector 204 detects motion that closely approximates the false alarm signature, an event notification will not be sent to server 102 and the user will not be notified. Camera unit 101 instructs the user to test the false alarm scenario (step 1035). The user again reproduces the false alarm scenario to determine whether motion detector 204 detects the scenario as an event. The user then has the ability to fine tune the false alarm settings (step 1036). If the user determines that the false alarm scenario is still being detected as an event, the user can repeat steps 1032-1036. Further, if the user wishes to present an additional false alarm signature or rerecord the previous false alarm signature, steps 1032-1036 are repeated.

If no fine tuning or additional false alarm signatures are to be recorded, camera unit 101 instructs the user to present an alarm situation (step 1037). Steps 1037-1041 are similar to steps 1032-1036. The instruction is an audible instruction (e.g., a beep emitted from speaker 208, a voice instruction emitted from speaker 208, etc.), a visual instruction (e.g., a blinking of LEDs 206), and/or an instruction displayed on client device 103 through the graphical user interface. Upon instructing the user to demonstrate an alarm scenario, motion detector 204 is activated and detects the demonstrated scenario (e.g., a user walking across an area that the user wishes to have motion detected in) (step 1038). The detected motion signature is stored in memory 214 as an alarm signature (step 1039). Accordingly, during event detection, if motion detector 204 detects motion that closely approximates the alarm signature, an event notification will be sent to server 102 and the user will be notified. Camera unit 101 then instructs the user to test the alarm scenario (step 1040). The user again reproduces the alarm scenario to determine whether motion detector 204 detects the scenario as an event. The user then has the ability to offer further fine tuning to the alarm settings (step 1041). If the user determines that the alarm scenario is not being detected as an event, the user can repeat steps 1037-1041. Further, if the user wishes to present an additional alarm signature or rerecord the previous alarm signature, steps 1037-1041 are repeated.

Once the fine tuning (step 1041) is complete, the updated motion detector 204 settings are stored on camera unit 101 for use during event detection (step 1042). A user may not need to record both false alarm situations and alarm situations. A user may only wish to fine tune motion detector 204 by presenting one of a false alarm situation or an alarm situation. In this case, steps 1032-1036 are skipped if no false alarm situations are to be calibrated, or steps 1037-1041 are skipped if no alarm situations are to be calibrated.

Referring to FIG. 10F, an exemplary interactive graphical user interface for a calibration mode is shown. The graphical user interface is displayed on client device 103. The graphical user interface includes device indicator 1043, which indicates which user device is being calibrated (shown as "Office Camera"), device status 1044 (shown as "Calibration Mode"), false alarm calibration window 1045, and alarm calibration window 1046. False alarm calibration window 1045 allows the user to set up false alarm signatures such that motion detector 204 settings are adjusted to not detect events corresponding to false alarm signatures. To record a false alarm signature, the user presses start button 1047, demonstrates a false alarm signature (e.g., walks by a zone not to be detected, calls a pet across the zone of detection, etc.), and presses stop button 1048. The user can then test the recorded false alarm signature by pressing test button 1049 (e.g., by repeating the false alarm situation). If the camera detects the false alarm as an event, the user can rerecord the signature by repeating the process. Once the signature tests properly, the user saves the signature by pressing save button 1050. It is contemplated that the user can record many false alarm signatures through this process to fine tune motion detector 204 settings. The user can reset the false alarm signatures back to a factory setting by clicking reset button 1051. Alarm calibration window 1046 allows the user to set up alarm signatures such that motion detector 204 settings are adjusted to detect specific events corresponding to alarm signatures. To record an alarm signature, the user presses start button 1052, demonstrates an alarm signature (e.g., by walking by a zone to be detected), and presses stop button 1053. The user can then test the recorded alarm signature by pressing test button 1054, and attempting to reproduce the alarm signature (e.g., by walking by the zone to be detected). If the camera does not detect the alarm as an event, the user can rerecord the signature by repeating the process. Once the signature tests properly, the user saves the signature by pressing save button 1055. The user can reset the alarm signatures back to a factory setting by clicking reset button 1056. It is contemplated that the graphical user interface includes the option to selectively remove individual recordings of false alarm signatures and alarm signatures without completely resetting camera unit 101.

Figure 10G:
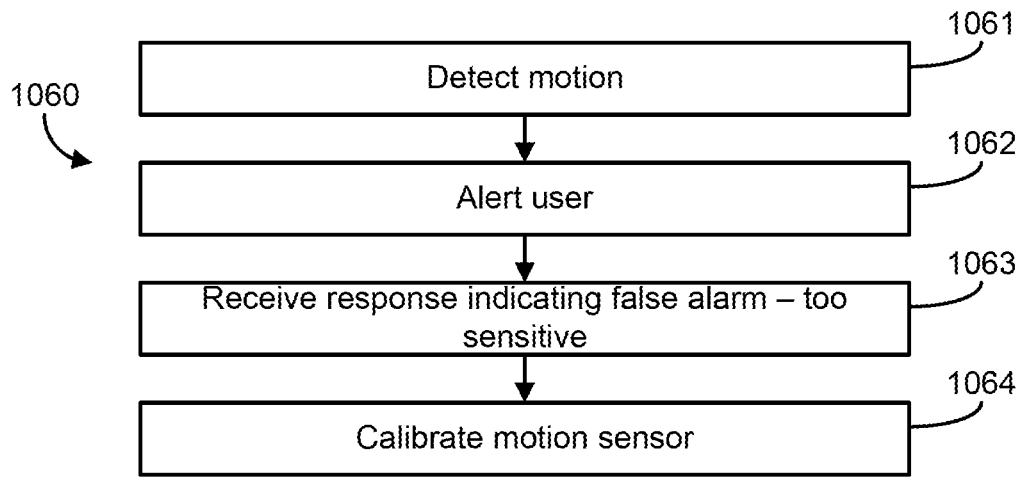
FIG. 10G is a flow diagram detailing a method of automatically adjusting motion detector sensitivity.

Referring to FIG. 10G, a process 1060 of automatically adjusting motion detector calibration is shown. Camera unit 101 is also configurable to automatically adjust motion detector 204 sensitivity and zones of detection based on active feedback received from user responses to event notifications. Camera unit 101 detects motion (step 1061). In response to the detected motion, camera unit 101 performs the steps of event detection as discussed above with respect to FIG. 2L. After the data from the event is captured, uploaded to server 102, and published on a user's dashboard, server 102 initiates a notification to alert the user (step 1062). Typically, upon receiving the alert, the user will view the captured event data (e.g., a video on the user's dashboard). The user has the option to dismiss the event, and server 102 receives a response indicating the dismissal of the event (step 1063). In dismissing the event, the user can specify the reason for dismissing the event. For example, a user can indicate that the detected event was a false alarm caused by oversensitivity of motion detector 204 (e.g., motion detector 204 detected a squirrel through a room window). Accordingly, server 102 receives an indication that motion detector 204 needs calibration. During the next check-in signal received from camera unit 101 (as discussed with respect to FIG. 2L and FIG. 4C), server 102 transmits a new setting signal to camera unit 101 to reduce the sensitivity of motion detector 204, and camera unit 101 calibrates the motion sensor (step 1064).

Direct Link Between Client Device and Camera Unit

In certain situations, it is beneficial to provide a live or almost live link between camera unit 101 and client device 103. The direct link between camera unit 101 and client device 103 is beneficial in many situations. The direct link allows for live or near-live streaming video from camera unit 101 to client device 103. Accordingly, a user can establish the link between camera unit 101 and client device 103 during the installation process to provide active feedback as to camera placement and lens aiming. Further, camera unit 101 can function as a one way video conference with two-way audio (e.g., a camera at an entrance to a building that is triggered by a doorbell). Further, a user may wish to view a live or near-live video stream of a room while away (e.g., to check on pets, to check on family members, to see if a package was delivered, etc.).

Figure 10H:
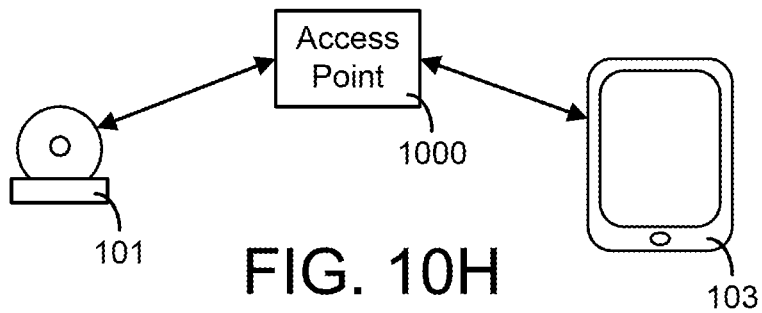
FIG. 10H is an exemplary schematic view of an exemplary connection between a camera unit and a client device.
Figure 10I:
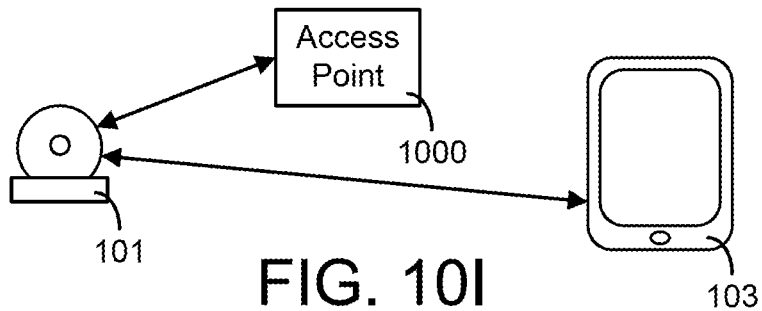
FIG. 10I is an additional exemplary schematic view of an exemplary connection between a camera unit and a client device.

Referring to FIG. 10H, a first embodiment of a direct link between camera unit 101 and client device 103 is shown. In this configuration, camera unit 101 communicates with access point 1000. Client device 103 also communicates with access point 1000. Data transfer between camera unit 101 and client device 103 is facilitated through access point 1000. It is contemplated that server 102 facilitates data transfer between access point 1000 and client device 103 (e.g., client device 103 is not located within range of access point 1000, but can still connect to server 102 through an alternate network). Referring to FIG. 10I, a second embodiment of a direct link between camera unit 101 and client device 103 is shown. In the second embodiment, camera unit 101 communicates with server 102 through access point 1000. Client device 103 is configured to directly connect with camera unit 101 via an ad-hoc wireless network. It is contemplated that during an ad-hoc network connection with client device 103, camera unit 101 temporarily dissociates itself with access point 1000. Alternatively, camera unit 101 is configured to maintain its connection with access point 1000 while connected with client device 103 in an ad-hoc fashion.

Figure 10J:
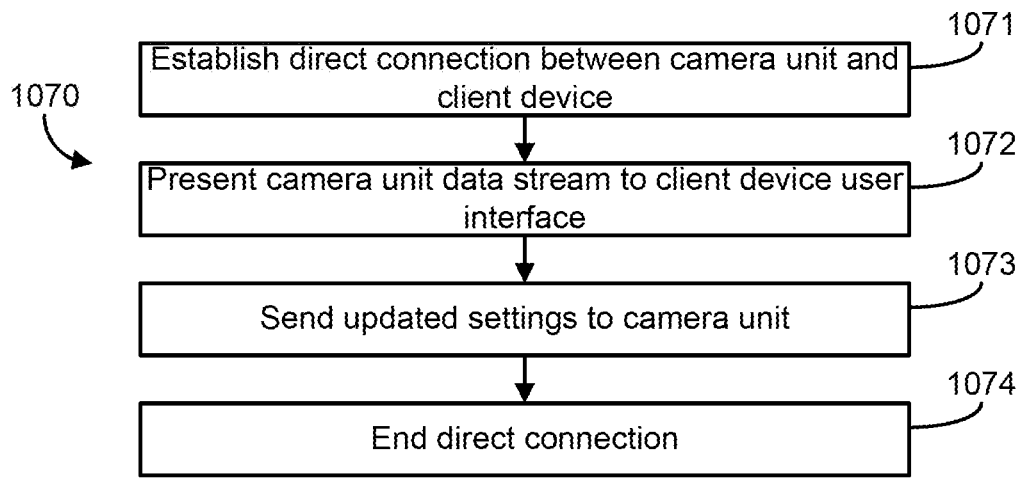
FIG. 10J is a flow diagram detailing a method of updating camera settings through a direct connection between a camera unit and a client device.

Referring to FIG. 10J, a process 1070 of updating camera unit 101 settings via a direct connection with client device 103 is shown. A direct connection between camera unit 101 and client device 103 is established (step 1071). As discussed above, the direct connection can be an ad-hoc connection between client device 103 and camera unit 101 or a connection facilitated by an access point 1000 and/or server 102. Camera unit 101 data is provided to client device 103 (step 1072). Camera unit 101 data pertains to a data stream received via a graphical user interface generated by camera unit 101. The graphical user interface enables the user to update settings of camera unit 101 and to view camera unit 101 data. The graphical user interface includes the option to view a live or near-live video feed to enable the user to properly place and aim camera unit 101. The graphical user interface includes an indication of wireless network strength and battery level. The graphical user interface includes controls to adjust various camera unit 101 parameters (e.g., light exposure, LED lighting functionality, video resolution, etc.). During the direct connection between camera unit 101 and client device 103, the user updates camera unit 101 settings and sends the updated settings to the camera unit (step 1073). After all viewing of camera unit 101 data and settings are updated, the user ends the direct connection between camera unit 101 and client device 103 (step 1074).

Upon the direct connection closing, camera unit 101 returns to normal operation and reconnects to the access point and/or server 102.

Figure 10K:
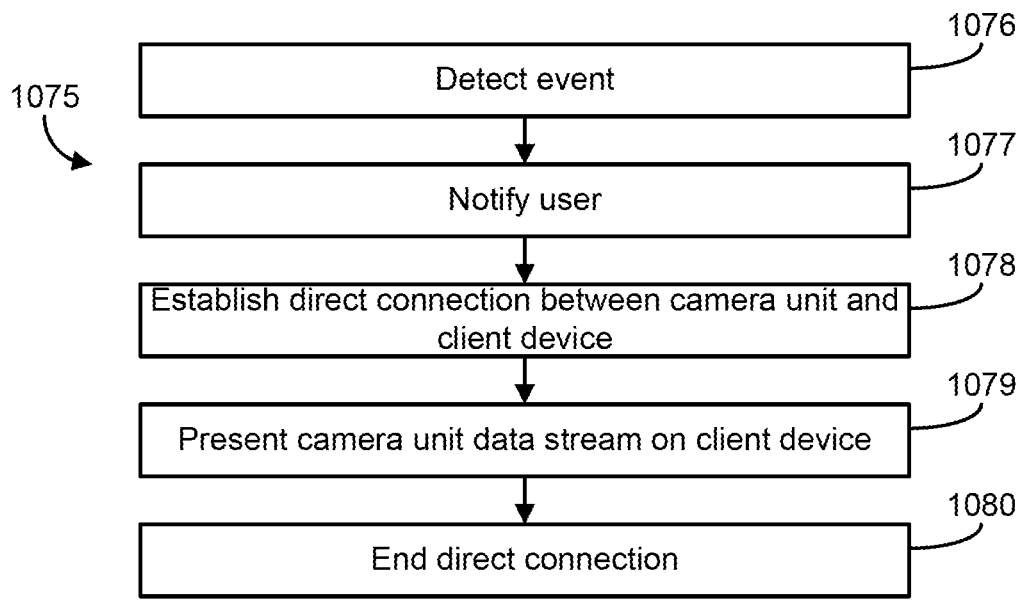
FIG. 10K is a flow diagram detailing a method of establishing a live or a near-live video stream after a detected event.

Referring to FIG. 10K, a process 1075 of establishing a direct connection between camera unit 101 and client device 103 for streaming live or near-live video from camera unit 101 to client device 103 after event detection is shown. Process 1075 is similar to the event detection methods described above (see FIG. 2L and FIG. 4D). Accordingly, camera unit 101 detects an event (step 1076). After the event was detected and event data is captured and uploaded, server 102 initiates a notification to the associated user (step 1077). The notification includes an option to establish a direct connection for live or near-live viewing of a video feed from camera unit 101. Accordingly, the user can activate the option and a direct connection is established between camera unit 101 and client device 103 (step 1078). The direct connection is facilitated through server 102 and access point 1000 (e.g., as discussed above with respect to FIG. 10H). Alternatively, if client device 103 is within wireless range of camera unit 101, the direct connection is facilitated through an ad-hoc network connection between camera unit 101 and client device 103 (e.g., as discussed above with respect to FIG. 10O). The direct connection enables a data stream from camera unit 101 to client device 103 (step 1079). The data stream includes a live or near-live video stream from camera unit 101. The video optionally includes audio. Further, the data stream may also facilitate two-way audio between client device 103 and camera unit 101. The direct connection continues until the user ends the direct connection by interacting with the graphical user interface displayed on client device 103. Alternatively, the direct connection ends after a designated period of time (e.g., 5 minutes). Upon an indication from the user that the direct connection is to stop or after the expiration of a designated period of time, the direct connection ends (step 1080), and camera unit 101 returns to normal operation.

Auto-Expansion of Neighborhood

Upon detection of an event, remote devices communicate with each other through signals relayed by a common access point or by server 102. For example, if a first camera unit detects an event, the camera unit can initiate communication to a second camera unit instructing the second camera unit to capture video, to change status from being disarmed to armed, and/or to be on alert (e.g., increase motion detector sensitivity for a temporary period). Server 102 can relay alerts and notifications to devices not connected through a common access point. For example, the communicating remote devices need not be located at the same location. The communicating devices can be located at adjacent addresses, within the same neighborhood, within a designated geographic region, within a particular group of associated users, or be devices sharing another common characteristic. Further, the trigger does not need initiate from a detected event. For example, a local police force can indicate to system 100 that a suspect is on the loose in a certain neighborhood, and system 100 can send notifications to nearby camera units to capture video, to change status from inactive to active, and/or to be on alert (e.g., increase motion detector sensitivity for a temporary period). The police may be able to arm specific devices (e.g., a specific camera unit such as a peephole camera or outdoor cameras) or all devices within a specific area. The external trigger can be received from a direct connection with system 100 (e.g., through client device 103) or via a non-system based message (e.g., a telephone call, a SMS message, an e-mail message, etc.). For example, a user can initiate the expansion of an externally detected event (e.g., a lost pet) to neighboring camera units by sending an SMS message containing a location code and an event code to system 100. In response to receiving the SMS message, system 100 can send notifications to nearby camera units to capture video, to change status from inactive to active, and/or to be on alert (e.g., increase motion detector sensitivity for a temporary period). The external trigger may only target outdoor camera units for arming and capturing video and not indoor camera units to preserve the privacy of occupants of buildings. The inter-device and inter-account communication results in a viral expansion of event notification. The expansion of the event notification is based on remote devices (e.g., camera unit 101) and user accounts located within the same geographic area.

Figure 11A:
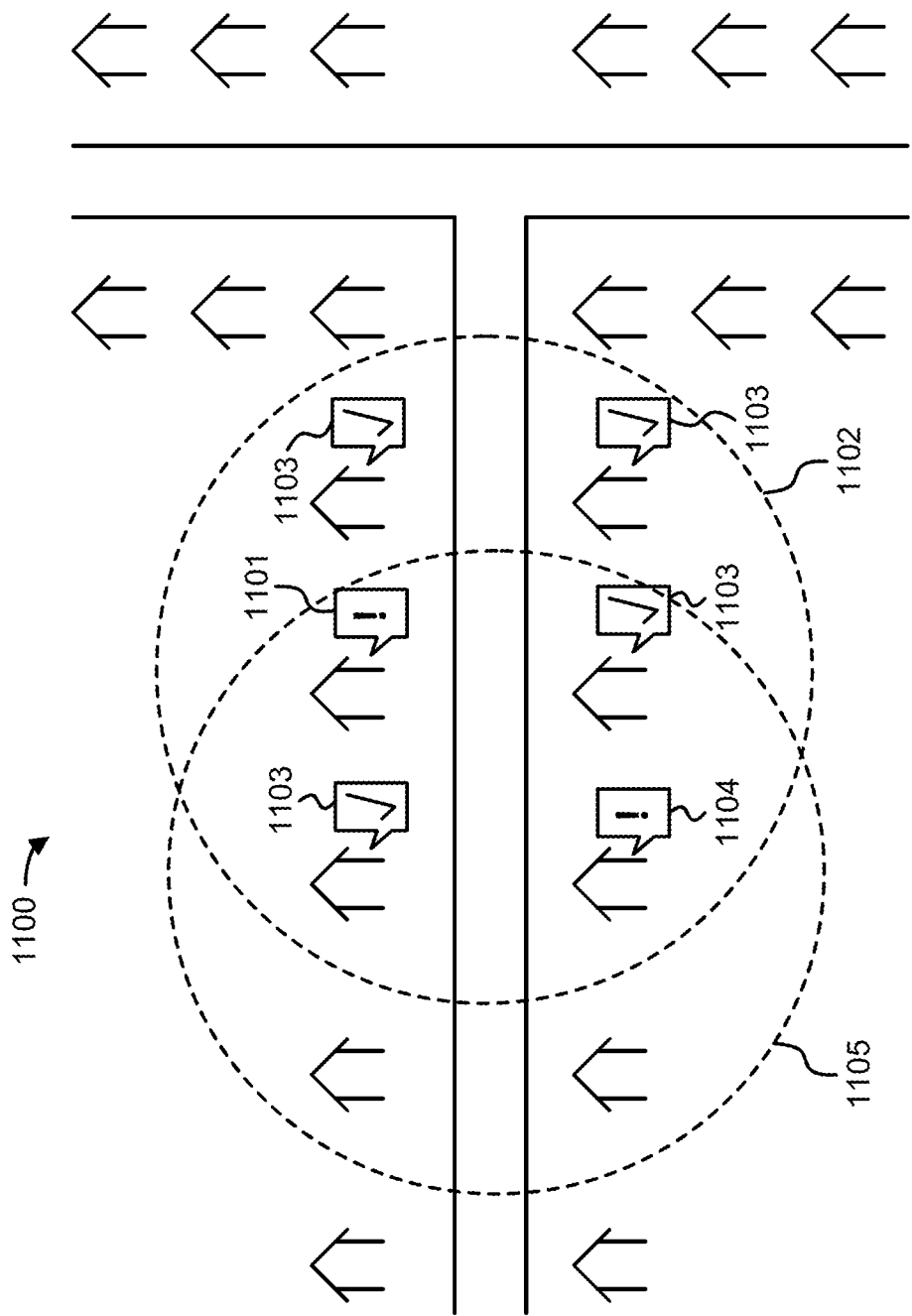
FIG. 11A is a schematic view of a neighborhood map.

Referring to FIG. 11A, a map of neighborhood 1100 is shown. Neighborhood 1100 includes a series of locations, each location is affiliated with a user account registered with system 100. A first location detects an event (shown as alert 1101, indicated by "!"). Upon detection of the event at the first location, system 100 is configured to alert users within first zone 1102. Camera units and/or switch units at locations neighboring the first location may be instructed to emit an audible alarm to alert neighborhood residents of the local, verified event. Other locations within first zone 1102 are instructed to capture event data, to initiate notifications to associated users, and to report back (e.g., via a response from an associated user) to system 100 with updated statuses. Zone 1102 is defined by a geographical radius (e.g., ¼ mile, 1 mile, adjacent block, etc.). Further, zone 1102 may be limited to specific types of entities such that only matching entities receive the propagated alert. For example, if the initial alert 1101 occurs at a gas station, other gas stations within zone 1102 are alerted, while non-gas station buildings (e.g., homes, office buildings, etc.) do not receive the propagated alert. Locations indicate updated statuses as being clear (e.g., "√" status 1103) or that an event is detected (e.g., "!" alert 1104). If all locations indicate the status as all clear, the event does not further propagate. If all locations in one direction indicate the status as all clear, the event does not further propagate in that direction. If any location indicates that an event is detected (e.g., "!" alert 1104), then system 100 continues to expand the area of notification in the direction of that location by adding the users of zone 1105 to notified users. The propagation of the event notification continues until all locations indicate their status as being clear and the event stops. Propagating an event across neighborhood 1100 creates an automated virtual watch system that tracks events (e.g., a string of break-ins) and records event video as the events move through neighborhood 1100. It is contemplated that the event propagation through neighborhood 1100 begins with only verified events (e.g., a verified break-in).

Figure 11B:
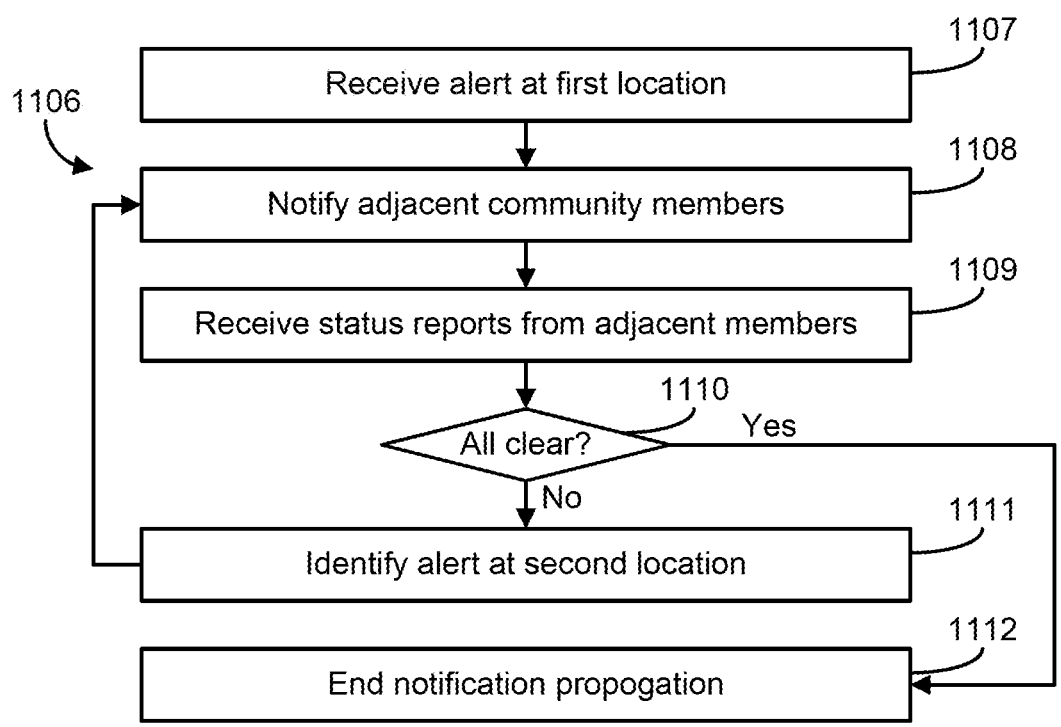
FIG. 11B is a flow diagram detailing a method of propagating an event through a neighborhood.

Referring to FIG. 11B, a process 1106 of propagating an event through a community is shown. An alert is received at a first location (step 1107). System 100 will not propagate every alert through the community. It should be appreciated that not all detected events are appropriate for notification to adjacent community members. Accordingly, system 100 waits for a verification of a threshold priority event (e.g., a high priority event) or an indication from the user that adjacent community members should be alerted of the event. After receiving the verified alert, system 100 notifies adjacent community members (step 1108). System 100 notifies any adjacent users within a designated geographic zone (e.g., within a set distance or a set number of blocks) from the original detected event. It is further contemplated that camera units and/or switch units at locations receiving the propagating alert are instructed to emit an audible alarm to alert neighborhood residents of the local, verified event. Alternatively, system 100 alerts only adjacent users within the designated geographic zone which share a characteristic with the original user account associated with the original detected event. For example, it is contemplated that only adjacent users of the same type (e.g., residential, commercial, industrial, etc.) are alerted. System 100 may further limit the type by a sub-classification (e.g., a particular type of business, industry, or residential building). After propagating the event notification to the appropriate adjacent locations, remote devices (e.g., camera unit 101) capture event data, and server 102 notifies associated users of the captured event data. The notification includes a request to review the event data and provide an updated status based on the event data. Alternatively and/or additionally, the adjacent camera units are placed in a heightened alert mode (e.g., motion detector sensitivity is increased) for a designated period of time.

Associated users receiving the captured event data report event statuses back to system 100 (step 1109). The event statuses indicate the presence of an event or an indication that the location is clear. It is contemplated that if no response is received within a designated time period (e.g., 5 minutes) that system 100 automatically assumes that the location is clear. Alternatively, after the designated time period, system 100 automatically assumes that an event is occurring within the location. After receiving all event statuses from adjacent locations, system 100 determines if the all of the alerted adjacent locations indicated all clear or if any additional events are present (step 1110). If no additional events are reported by the adjacent locations, the notification propagation ends (step 1112). If an additional event is reported or identified at a second location (step 1111), system 100 propagates the alert to additional locations that are adjacent to the second location (step 1109), and the process is repeated until all locations report no alerts. It is further contemplated that after a designated number of locations report confirmed events (e.g., at least two confirmed events), system 100 automatically notifies the appropriate government authority (e.g., a local police department, a local fire department, etc.).

Figure 11C:
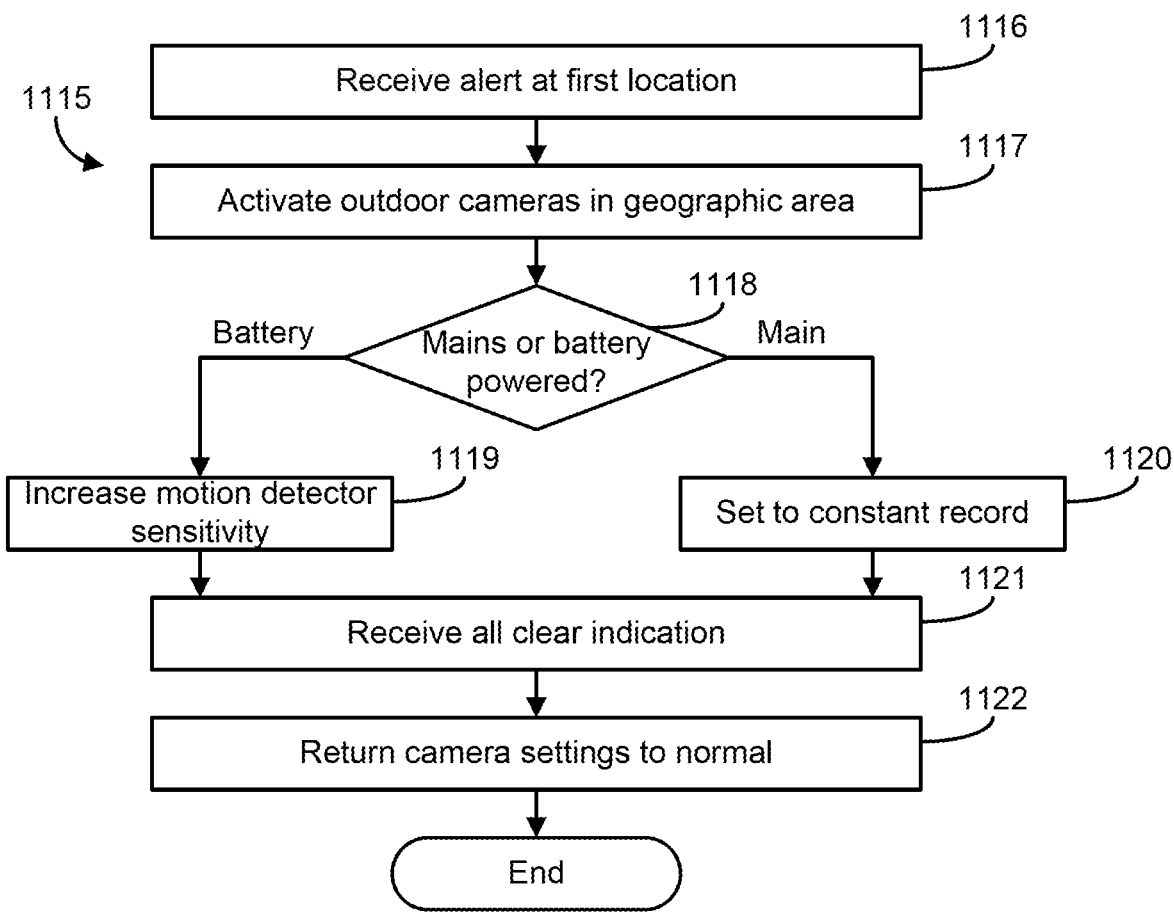
FIG. 11C is a flow diagram detailing a method of activating area camera units after detection of an event.

Referring to FIG. 11C, a process 1115 of activating area camera units after detection of an event at a first location is shown. System 100 receives an alert that an event is detected at a first location (step 1116). System 100 further receives confirmation that the event is verified by the user associated with the first location. The verification includes an indication of the priority of the event (e.g., high priority, medium priority, low priority). Upon verification of the event, system 100 locates outdoor camera units belonging to the first location and any location in proximity to the first location (e.g., within a set geographic distance), and activates (e.g., enables event detection) all outdoor camera units within the vicinity (step 1117). It is contemplated that the activation of additional cameras occurs only if the verification indicates that the event is of a threshold priority (e.g., high priority or medium priority). Further, it is contemplated that camera units located inside of a building that are positioned to view outside of the building are also activated (e.g., a camera unit positioned near a window and/or a peephole camera unit). It is further contemplated that camera units and/or switch units at locations neighboring the first location are instructed to emit an audible alarm to alert neighborhood residents of the local, verified event. System 100 determines if each camera unit is battery powered or mains powered (step 1118). If the camera is battery powered, system 100 instructs the camera unit to increase motion detector sensitivity (step 1119). If the camera is mains powered, system 100 instructs the camera unit to constantly record video and/or to transmit a live or near-live video stream to server 102 (step 1120). Updated operational settings for camera units (battery powered and mains powered) remain in place until an all clear indication is received (step 1121). After receiving the all clear indication, each camera unit returns to its normal operating state having normal operational settings (step 1122).

Prior to propagating an alert to adjacent members, system 100 may propagate the alert to additional remote sensors within the first user's account. For example, if a camera unit in a bedroom of a first location detects movement, which is verified by the user, system 100 can be configured to instruct an additional camera unit in another room of the first location to capture event data prior to instructing camera units in adjacent locations (e.g., prior to informing neighbors' accounts of the detected event) to capture additional event data for further verification. Alternatively, system 100 is configured to automatically trigger additional event data capture requests to camera units at the same location without user verification of the event. Upon a second verification of the event, the event notification can propagate to through the neighborhoods.

System Statistical Tracking

System 100 maintains statistics for each user account. The statistics include at least the number of detected criminal events (e.g., break ins), the number of potential crimes that system 100 thwarted off, the number of arrests made as a result of system 100 event data captures, and whether a particular private monitoring service was used for the event. It is contemplated that only statistics pertaining to verified events are kept. The statistics are aggregated based on various geographic regions (e.g., by block, by neighborhood, by city, by county, by state, etc.). Individual users can request that system 100 not maintain statistics pertaining to the individual user's devices and locations.

System 100 markets the aggregated data to various outside parties. The outside parties purchase data for a specific geographic region (e.g., a neighborhood). The outside parties can make a one-time purchase of data or can sign up to receive regularly updated data by purchasing a subscription. The data can pertain to a single month, a single year, or a designated number of years. The subscription is optionally daily, weekly, monthly, or annually. For example, it is contemplated that a real estate company purchases aggregated data for an area with which it has customers such that the company can include crime statistics with real estate listings. As a further example, insurance companies may purchase aggregated statistics to help determine and adjust insurance premiums. The aggregated data may further be provided to government agencies (e.g., local police department). In many cases, small crimes and attempted crimes go unreported to government agencies, but system 100 still receives event data pertaining to the crimes and attempted crimes. Accordingly, a government agency, such as a police department, may adjust its policies (e.g., patrol routes) to target areas with a high number of unreported crimes and/or attempted crimes. The statistics may be tied into a police news feed for a neighborhood. For example, the police news feed may indicate that system 100 devices resulted in a designated number of arrests or solved crimes.

Aggregated data obtained by system 100 is further used in advertising efforts. The aggregated data is used in system 100 marketing material. For example, a system 100 marketing effort advertises that video data captured through system 100 cameras resulted in two additional arrests in a specific neighborhood over the course of a month. Each marketing effort can be customized for any given geographic location. Further, third party monitoring services can advertise success rates based on the information contained in the aggregated statistics. For example, if the aggregated data shows that a particular third party monitoring service affiliated with system 100 is known to have led to additional arrests, the third party monitoring service can use those statistics in its marketing efforts.

Still further, aggregated data is distributed to users of system 100. It is contemplated that users of system 100 want to know of neighborhood statistics pertaining to their neighborhoods as well as neighboring neighborhoods. Accordingly, system 100 publishes anonymous neighborhood statistics to registered users (e.g., "Master Lock has identified 10 confirmed break ins in Anyville this month"). It is further contemplated that these statistics are combined with local police information (e.g., "There have been 10 confirmed break ins in Anyville this month. Seven were not identified by the Police but were identified by Master Lock."). Alternatively, system 100 publishes generic listings of events occurring in neighborhoods (e.g., "Dec. 21, 2012 at 3:05 pm, break in reported in Anyville."). The published events are limited to events that have been verified by users. The statistics can further indicate the effectiveness of a virtual watch community by comparing the number of detected events with the total number of events reported by the local police (e.g., indicate that system 100 detected 75% of the events reported by the police department). This metric can be used to provide members of a community with a community watch strength metric.

Real Time Video Streams

As discussed above, system 100 is capable of providing live or near-live video streams from camera unit 101 to users. It is contemplated that the video streams occur in at least two situations: as a result of a verified event and from an on-demand video stream request. If the video stream occurs as a result of a verified event, system 100 enables a high quality video stream (e.g., having a first, high resolution). Since the video stream results from a verified event, the video stream is classified as important, and battery life of camera unit 101 is not a significant concern. As a system standard, on-demand video stream requests are streamed via a low quality video stream (e.g., having a second, low resolution). The on-demand video streams are not deemed important by system 100, and accordingly, a lower resolution is used to conserve battery life. It is contemplated that the user submitting the on-demand live or near-live video request can bypass the standard setting and indicate that camera unit 101 is to transmit a video stream at the first, high resolution. Alternatively, camera unit 101 is mains powered and is configured to transmit video streams at the first, high resolution in all situations. It is further contemplated that live or near-live video is streamed to a television. The television connects to the camera unit through an access point and/or server 102. Accordingly, the television includes a network interface or includes an external box that facilitates the connection.

Payment Models

System 100 can be configured to provide both a free and a pay version of its services. It is contemplated that during registration, a user opts to become either a free member or a premium (e.g., paying) member. Free members do not pay any fees to gain access to system 100. Accordingly, free members' dashboards include advertisements that help offset the costs of providing services to the free members. Premium members pay monthly or annual fees to remove the advertisements from the premium members' dashboards. It is further contemplated that there are different levels of premium membership corresponding to different levels of advertisements and/or different levels of services provided by system 100. For example, system 100 may charge different users different membership fees based on the number of registered devices and/or registered locations.

Further, system 100 is configured to provide membership discounts to certain demographics of users. System 100 provides discounts to users that are home owners, have large families, live in certain neighborhoods, and any other category of user account that system 100 wishes to encourage. System 100 provides discounts based on a quality or quantity metric associated with a user account. For example, system 100 is configured to provide a membership discount to users that are associated and actively participate (e.g., clear a certain number of detected events and alarm situations during a designated time period) in a large number of other users' locations (e.g., if a user actively participates in ten locations owned by other users, the user may earn a discount). As an additional example, system 100 is configured to provide a membership discount to users that have a history of responding promptly and properly to detected events and alarm situations (e.g., if a user has cleared at least one hundred event listings during the previous year, the user may earn a discount). Discounts can be provided for any number of reasons that encourage users to remain active members in the virtual watch communities.

As discussed above, system 100 optionally requires a paid membership for access. System 100 is configured to track user accounts and market products and services based on information gathered from the tracking of the user accounts. System 100 determines user demographics and behaviors based on user owned locations, types of locations (e.g., homeowners, apartment renters, office building owners, etc.), associations with other users (types of other users associated with, quantity of associations, etc.), comments left in event feeds (e.g., if a comment pertains to a particular product or service type), purchases of system 100 services, and any other user characteristic. System 100 advertises its own premium services (e.g., monitoring services) to users. The advertisements include an indication of a discount to a particular user (e.g., "Joe, thanks for being a valued member for over a year! Use this personalized link to order our monitoring service at a 10% discount!"). System 100 is configured to advertise third-party products from third-party vendors to targeted user accounts that are more likely to purchase the products. System 100 matches the user account to the product or service to be advertised based on matching characteristic or traits. System 100 charges the third-party vendor an advertisement fee for placing the targeted advertisement. The products and services are marketed through target advertisements that appear as banner advertisements on user account dashboards (e.g., location specific dashboards, device specific dashboards, and/or general account dashboards). Product and service advertisements are also be included in notifications sent to users (e.g., this alert presented by Company X). If the advertisement is successful in attracting the targeted user's attention (e.g., the targeted user clicks on the advertisement), system 100 charges the third-party vendor a first fee. If the advertisement is successful in achieving a product purchase from the targeted user (e.g., the targeted user clicks on the advertisement and purchases the advertised product or service), system 100 charges the third-party vendor a second fee, which is larger in amount than the first fee.

System 100 is configured to adjust membership fees based on awards achieved by certain users. System 100 awards specific users throughout membership. Awards correlate to achievements the user achieves while registered with system 100. Awards result from any of: reporting an event listing to a government authority that results in the capture of a suspect, associating with a landmark number of other user accounts and/or locations (e.g., associating with 1000 user accounts), registering a landmark number of devices, remaining a member for a designated number of years, clearing a designated number of event listings, commenting on a designated number of event listings, achieving tier 1 access levels to a designated number of locations, and any other achievement within the social networking environment of system 100. Each user award is displayed on the associated user account profile such that users can view other users' achievements. Each award results in a set reduction in membership fees or a one-time credit towards membership fees. Alternatively, awards result in no reduction in membership fees or credits towards membership fees.

Users of system 100 can also award other users badges for actively participating in location dashboards and/or virtual community watch dashboards. The badges are awarded for specific user actions within the dashboards. For example, user X owns location X, to which user Y is associated with. When user Y successfully reports a break-in to police based on an event listing on location X's dashboard, user X may decide to award user Y a badge (e.g., a sheriff badge). The badges are only awarded from user to user. It is contemplated that each user has a designated number of badges that he or she can provide another user (e.g., when a user first registers a location, that user can only award one sheriff badge). Accordingly, users can purchase additional badges to award from system 100. Further, if a user accumulates a designated number of badges, system 100 is configured to provide a membership discount or credit to the user (e.g., if a user accumulates ten sheriff badges, system 100 awards a ten dollar service credit to the user).

System 100 is further configured to provide a credit to users that recruit other users to join as paid members of system 100. For example, each user has the capability to invite other users to join system 100. As discussed above, users can send invitations to non-members through e-mail and/or social media accounts. System 100 is configured to track new user registrations by requesting that new users provide a referral member or code, or by creating unique registration hyperlinks included in the invitations that enable tracking of referrals. System 100 can then provide referring members a set credit for each successful new member recruited or a designated number of successful new member recruits. For example, system 100 is configured to provide a $10 membership credit for each successful registered new-member referred to by current members.

Monitoring Services Payment Models

Account holders with system 100 gain access to various monitoring services affiliated with system 100. The monitoring services are typically provided by a third-party private company (e.g., private security company, private detectives, etc.) or by government agencies (e.g., police, fire, etc.). Multiple monitoring services may include revenue sharing agreement if one service helps another service (e.g., a private security service may share revenue with a local police department if the private security service uses the police for criminal verification). The monitoring service can also be an individual registered as a monitoring service with system 100 and/or a group of networked account holders registered as a monitoring service with system 100 (e.g., a virtual watch community group of associated users can monitor another's location or device for a fee). Still further, the monitoring service is provided directly by the company operating system 100. If a user elects to hire a monitoring service through system 100, the monitoring service gains access to user devices and location dashboards (according to user preferences) for monitoring purposes. Notifications pertaining to detected events are sent to the monitoring service for analysis, and appropriate action is taken. In some situations, special remote device settings are tied to ordered monitoring services. For example, if a user has an arrangement with a fire department to serve as a monitoring service, upon detection of a fire alarm (e.g., by switch unit 104), all cameras in the house are configured to capture video data and upload the video data to server 102, where it is forwarded with the notification to the fire department and any other first responders. System 100 charges a fee to users opting for at least one of the monitoring services. It is contemplated that system 100 shares a portion of the fee with the monitoring service. Alternatively, the monitoring service bills the user directly for the services provided. The costs of the monitoring services can be offset (partially or completely) by providing advertisements to users opting to receive monitoring services. The advertisements are targeted and displayed to the users in the same manner as discussed above with the membership fees.

Users can enter into contracts with a monitoring service. The contracts are for a designated period of monitoring time or a designated number of event responses by the monitoring service. The contracts optionally include a cancellation fee, which varies based on the length of the contract, the remaining length of the contract, or some other factor. The contracts include payment terms (e.g., at the beginning of each block of time, at the conclusion of each block of time, after a set number of event responses, etc.). Alternatively, users can sign up for monitoring services without a contract and receive bills for the services provided by the monitoring service. To help guarantee payment, the user may have to submit a deposit for the services and/or submit to a credit history report for approval. The user may sign up for services via a system application (e.g., smartphone application, system software, system website, etc.). It is contemplated that in this arrangement, users pay only after an event triggers monitoring. For example, a user can opt to receive monitoring services from a company; however, the user doesn't begin paying for the services until the company receives a notification pertaining to a detected event. Only after receiving the notification will the user receive a bill for the monitoring services. Still further, users can prepay for monitoring. For example, a user can purchase monitoring services for a set period of time (e.g., a few hours, a day, a week, a month, etc.) or a set number of event responses. Still further, it is contemplated that system 100 offers monitoring services packages that group together various monitoring services in a bundled price. For example, system 100 includes a government agency monitoring package, which includes monitoring services by the local police department and the local fire department. In an alternate arrangement, a user can publish a listing for a specific security need (e.g., "User X requires monitoring services from December 7 through December 12"), and system 100 facilitates bidding amongst a plurality of monitoring service providers.

Figure 12A:
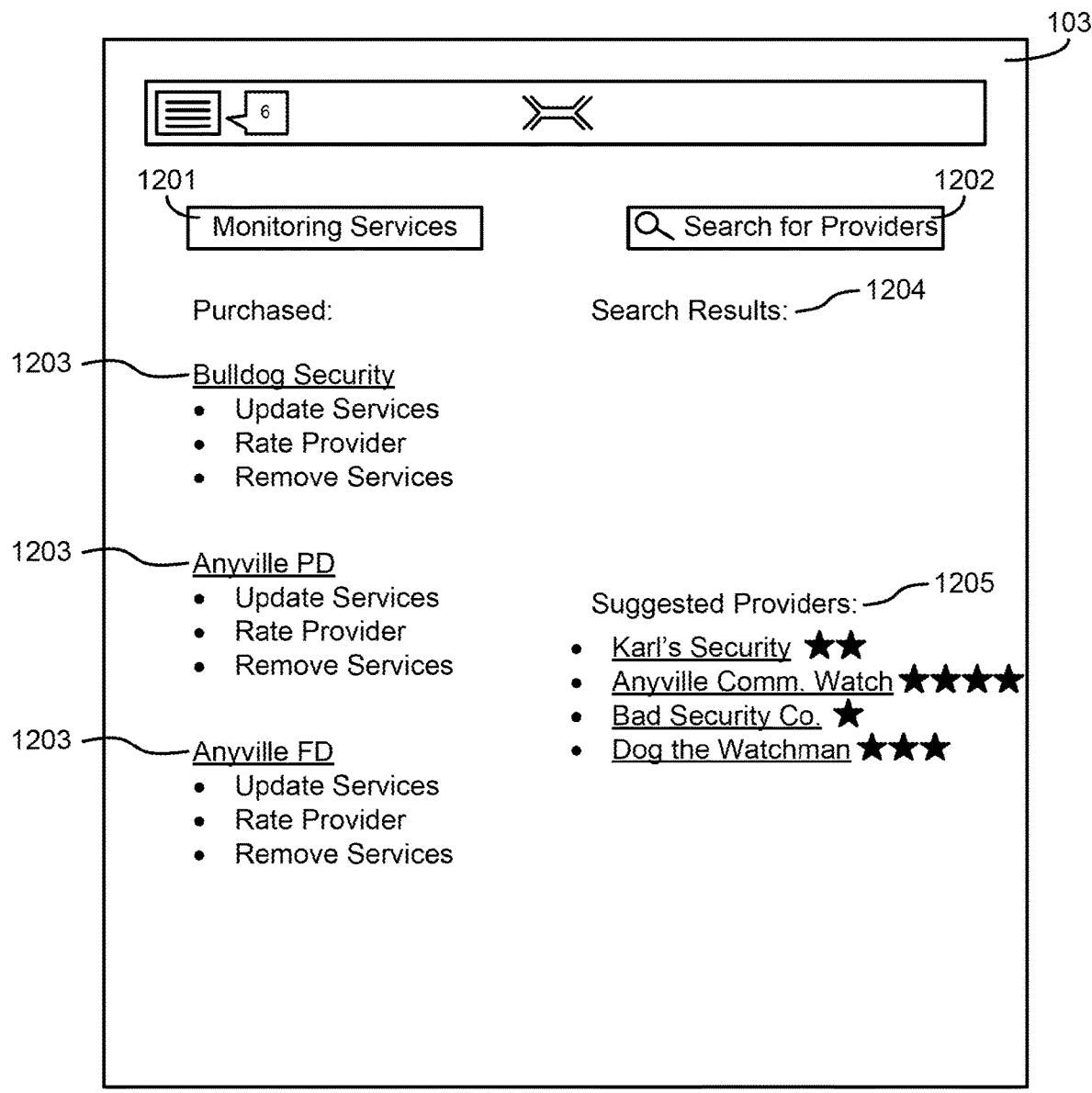
FIG. 12A is a detailed view of a graphical user interface for managing monitoring service providers.
Figure 12B:
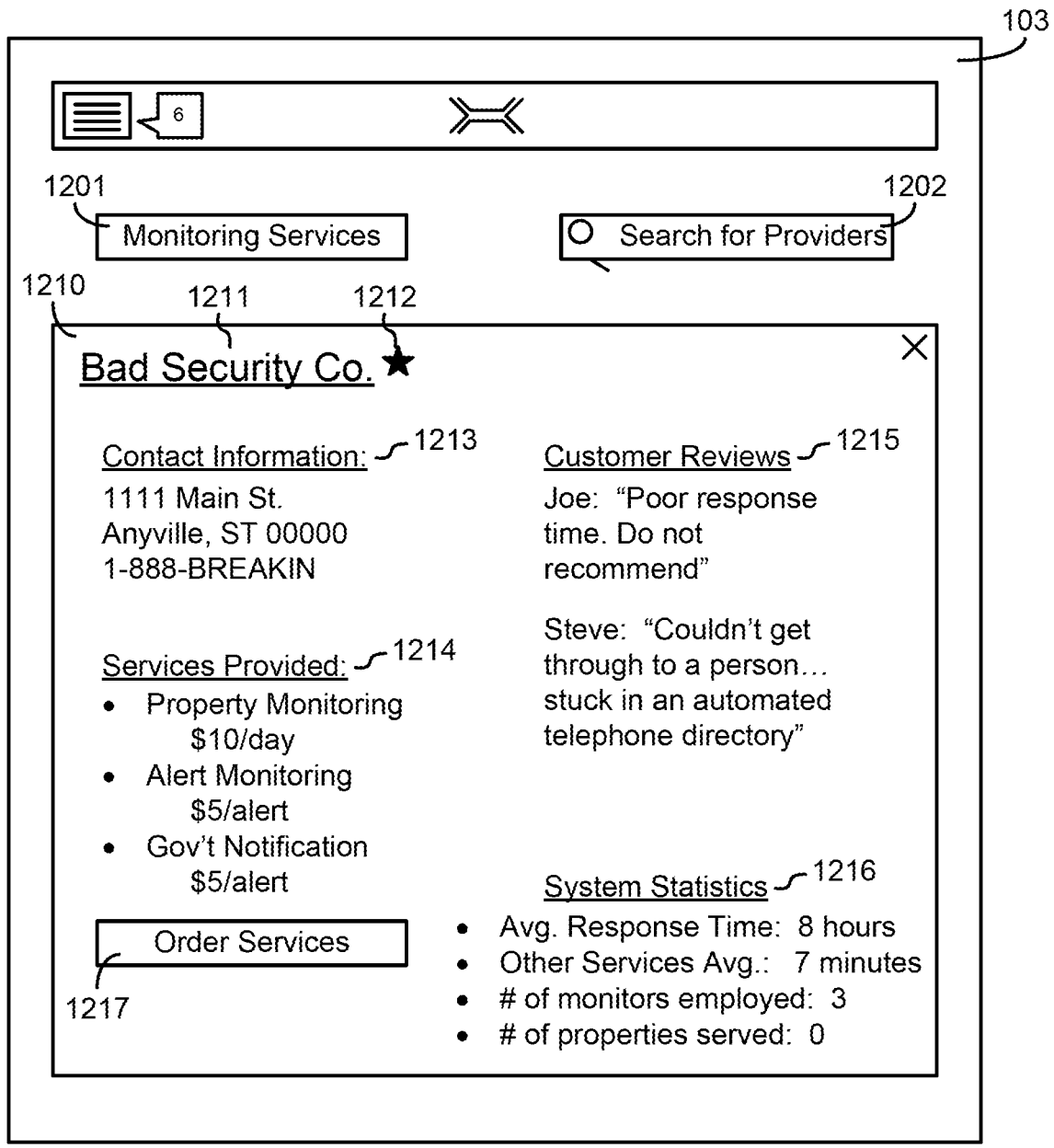
FIG. 12B is a detailed view of a graphical user interface for viewing a monitoring service provider's details.

Users can enter into the monitoring arrangement with the monitoring services directly through system 100. For example, the user can select and activate the monitoring services by interacting with system 100 graphical user interfaces (e.g., through client device 103 or through a web portal). Alternatively, users can enter into the monitoring arrangement by contacting (e.g., telephone, e-mail, postal mailing, etc.) the operators of system 100 or the monitoring services directly. Referring to FIG. 12A, an exemplary graphical user interface is shown. The graphical user interface is displayed on client device 103. The graphical user interface is user interactive (e.g., a user can select items by clicking or interacting with a touchscreen display). The graphical user interface discloses a monitoring services management page. The user selects button 1201 to view currently active monitoring services. Through the monitoring services management page, the user can view purchased monitoring services 1203 update purchased monitoring services settings (e.g., activate/deactivate, add a location, remove a location, update service provider options, payment preferences, etc.), rate the service provider (e.g., on a scale of one to five stars), and remove the service provider. Further, the user can search for new monitoring service providers via button 1202. Any returned results are listed in search results section 1204. System 100 also advertises additional monitoring service providers 1205. It is contemplated that various monitoring service providers pay a fee to system 100 to be included in the suggested providers listing. A user can select any given monitoring service provider to view more details about the service provider. Referring to FIG. 12B, an exemplary graphical user interface for a service provider detail screen 1210 is shown. Service provider detail screen 1210 includes service provider name 1211 (shown as "Bad Security Co.") and the service provider rating 1212 (shown as being one star). The service provider detail screen further includes provider contact information 1213, a listing of services provided 1214 (including the costs of the services), and customer reviews 1215 of the service provider. The service provider detail screen also includes provider statistics 1216 within system 100. Provider statistics 1216 include average response time to a detected event notification (including what the average response time is for other service providers), the number of monitoring employees of the service provider, and the number of properties serviced by the service provider. Through service provider detail screen 1210, the user can also order services by interacting with the graphical user interface and button 1217.

Lock Box

Figure 13A:
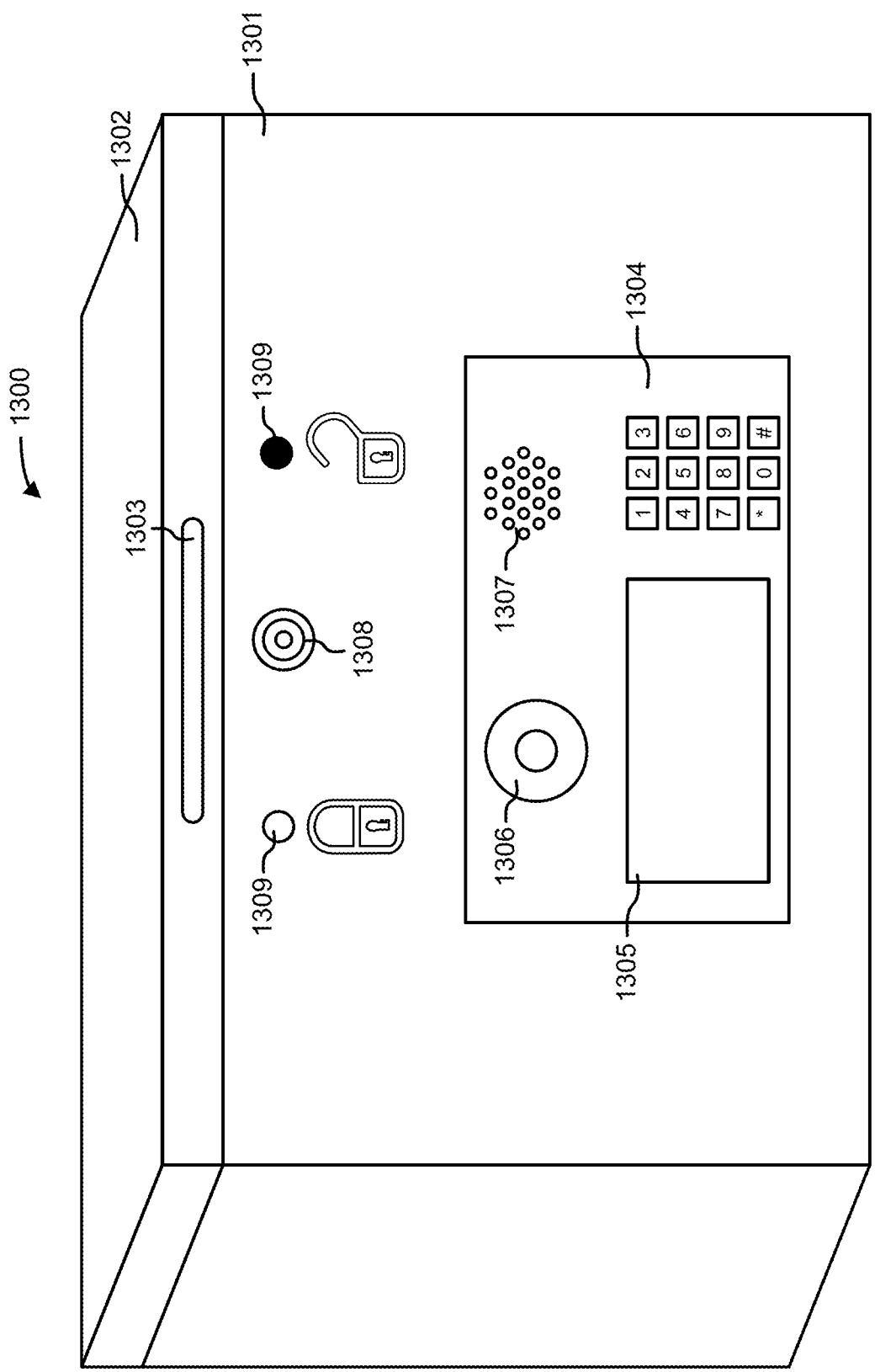
FIG. 13A is a detailed view of a lock box.

As discussed above, system 100 can be used with devices in addition to camera unit 101 and switch unit 104. It is contemplated that system 100 is configured to work with a lock box unit. Referring to FIG. 13A, an exemplary lock box 1300 is shown. Lock box includes a main body 1301 and a lid 1302. Lid 1302 is designed to open about a pivot (in the rear of lock box 1300) to expose a compartment of main body 1301. Lid 1302 includes a handle 1303 to facilitate opening and closing of lid 1302. Lock box 1300 is lockable such that lid 1302 can only open to reveal the internal compartment of main body 1301 if lid 1302 is unlocked. Lid 1302 is locked and unlocked via a manually operated lock and key. Additionally, lid 1302 is locked and unlocked via an internal electronic locking mechanism. The electronic locking mechanism enables remote locking and unlocking (e.g., via client device 103) and locking and unlocking through interaction with an included keypad 1304. Keypad 1304 enables a user to interact with lock box 1300. Lock box 1300 includes a display 1305, which displays information and/or video to a user of lock box 1300. Lock box includes a camera 1306. Camera 1306 includes all the components of camera unit 101 (as discussed above). Alternatively, camera 1306 includes only a camera sensor. Camera 1306 enables lock box 1300 to capture and upload video data to server 102. Further, camera 1306 enables lock box 1300 to facilitate a two-way video communication between a remote user (e.g., a user having client device 103) and a user of lock box 1300 (e.g., a package delivery person). The lock box further includes a speaker 1307 and a microphone 1308. Speaker 1307 and microphone 1308 allow lock box 1300 to emit audio and further enable lock box 1300 to facilitate a two-way audio communication between a remote user and a user of lock box 1300. Lock box 1300 further includes indicating LEDs 1309 that indicate whether lock box 1300 is locked or unlocked. It is contemplated that lock box 1300 be secured to a permanent structure (e.g., bolted to the ground or a wall) such that lock box 1300 cannot be easily picked up and removed. Lock box 1300 comes in a range of sizes and configurations depending on the intended use. Smaller lock boxes are used for temporary storage of items (e.g., leaving a key for a pet sitter), while larger lock boxes are used for package delivery and acceptance.

Figure 13B:
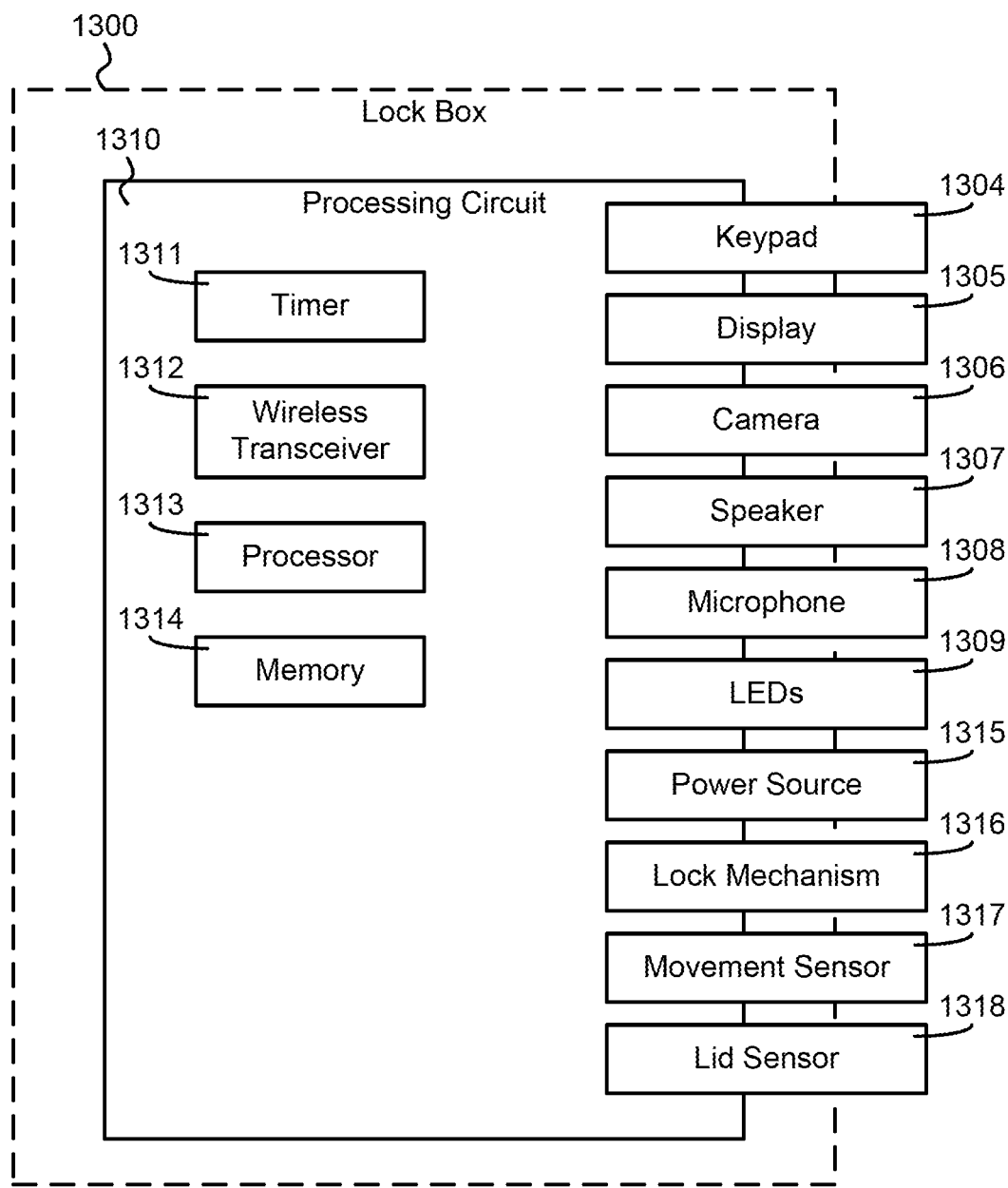
FIG. 13B is a block diagram of the lock box.

Referring to FIG. 13B, a block diagram of lock box 1300 is shown. Lock box 1300 includes a processing circuit 1310. Processing circuit 1310 controls the operation of lock box 1300. Accordingly, processing circuit 1310 includes at least a timer 1311, wireless transceiver 1312, processor 1313, and memory 1314. Wireless transceiver 1312 is configured to send and receive data to and from server 102 and to and from other devices (e.g., switch unit 104) located on the local area network. Wireless transceiver 1312 utilizes at least one version of the 802.11 standard networking protocol (e.g., 802.11a/b/g/n). Alternatively, wireless transceiver 1312 utilizes other networking standards, including, but not limited to CDMA, GSM, LTE, Bluetooth®, ZigBee®, and 802.15. In an alternate configuration, lock box 1300 includes multiple wireless transceivers to provide broader network compatibility. In this arrangement, a user can select which radios are active, and which radios are to remain dormant. Memory 1314 stores video data, operating instructions, lid access history, lid access passcodes, and any necessary software modules. It is contemplated that lock box 1300 is also configured to accept and to utilize removable memory media (e.g., SD or MicroSD memory cards) for additional storage of data.

Processing circuit 1310 includes and/or communicates with a keypad 1304, display 1305, camera 1306, speaker 1307, microphone 1308, and LEDs 1309, as shown in FIG. 13A. Processing circuit 1310 further includes and/or communicates with a power source 1315, lock mechanism 1316, movement sensor 1317, and lid sensor 1318. Keypad 1304 enables user input. The user input typically corresponds to an attempt at entering a passcode to unlock lock box 1300. During network registration, keypad 1304 is used as a user input to update network settings such that lock box 1300 connects to an access point 1000 and to server 102. Further, keypad 1304 is used as a user input to provide any other user input (e.g., updating a passcode, changing internal settings, powering on/off, etc.). Display unit 1305 is used to provide user feedback during all stages of operation (e.g., network registration, passcode updating, passcode entering, etc.). Further, display unit 1305 provides a user display for use during two-way video conferencing. In one embodiment, display unit 1305 is not a touch screen device. Alternatively, display unit 1305 is a touch screen and is configured to provide users with an alternative user input mechanism. Camera 1306 is configured to capture images of the user operating lock box 1300 (e.g., images of the person attempting to access lock box 1300 by entering a passcode on keypad 1304). Camera 1306 is further configured to capture images based on a trigger (e.g., detected movement from movement sensor 1317). Still further, camera 1306 is configured to facilitate a two-way video call between a remote user and a local user of lock box 1300. Speaker 1307 and microphone 1308 enable two-way voice communications between a remote user and a user of lock box 1300. Further, speaker 1307 enables audible noises to be played from lock box 1300. LEDs 1309 indicate the present status of lock box 1300. A first LED indicates that the lock box lid is locked; a second LED indicates that the lock box lid is unlocked. Power source 1315 provides any necessary power to lock box 1300. Power source 1315 is a rechargeable or non-rechargeable battery. Alternatively, lock box 1300 is mains powered. Lock mechanism 1316 includes two operating states: locked and unlocked. Lock mechanism 1316 is configured to lock or unlock lid 1302. Lock mechanism 1316 may be any of an electromagnetic lock, an electric latch release lock, and an electric mortise and cylindrical lock. Movement sensor 1317 detects movement of the entire lock box 1300 unit. Accordingly, movement sensor 1317 is configured to detect when lock box 1300 is lifted and moved away from its location. Movement sensor 1317 is a vibration sensor, a contact movement sensor, a tilt movement sensor, a gyroscope, or any other sensor configured to detect the movement of lock box 1300. Lid sensor 1318 detects whether the lid is in an open or closed state.

In embodiments where lock box 1300 is battery powered, lock box 1300 is designed to be power efficient such that the battery can power lock box 1300 for significant lengths of time (e.g., months or years) without the battery needing to be replaced or recharged. As described above with respect to camera unit 101, many components of lock box 1300 remain in a low-power sleep-state throughout normal operation. Display 1305, camera 1306, speaker 1307, microphone 1308, LEDs 1309, and lid sensor 1318 normally operate in a low-power sleep mode. Keypad 1304 is configured to always receive user input (which, as discussed below, will activate the device). Further, movement sensor 1317 remains activated to detect if lock box 1300 is being moved. Timer 1311 remains powered and periodically transmits a wakeup interrupt to wireless transceiver 1312 in the same manner as described above with respect to camera unit 101 and timer 211. Accordingly, just as described above with respect to camera unit 101, lock box 1300 periodically wakes, checks in with server 102, and optionally receives new lock box settings and/or commands in a response signal before returning to sleep.

Figure 13C:
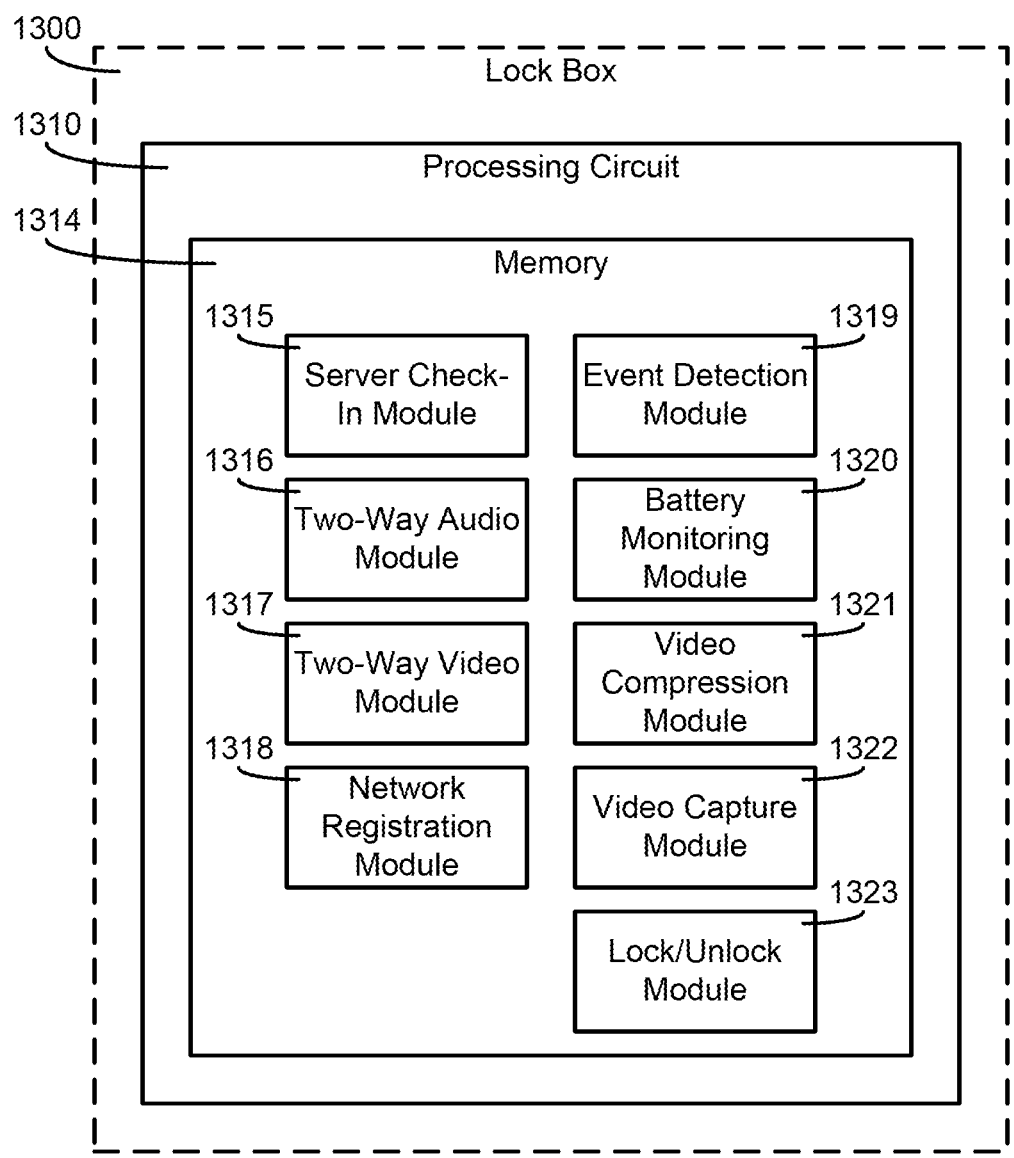
FIG. 13C is a block diagram of memory modules stored on the lock box.

Referring to FIG. 13C, a block diagram of the programming modules stored on lock box 1300 is shown. The modules are stored on memory 1314 contained on processing circuit 1310. The modules include all instructions necessary to operate lock box 1300. Modules include at least: server check-in module 1315, two-way audio module 1316, two-way video module 1317, network registration module 1318, event detection module 1319, battery monitoring module 1320, video compression module 1321, video capture module 1322, and lock/unlock module 1323. Server check-in module 1315 may be configured to manage instances in which server 102 transmits instructions to lock box 1300. Two-way audio module 1316 and two-way video module 1317 may be configured to initiate a two-way audio or video communication between server 102 and lock box 1300. Network registration module 1318 may be configured to manage a registration of lock box 1300 with server 102. Event detection module 1319 may be configured to detect an event based on information from keypad 1304, display 1305, camera 1306, microphone 1308, movement sensor 1317, or lid sensor 1318. Battery monitoring module 1320 may be configured to monitor the status of battery 215. Video compression module 1321 may be configured to compress video to be provided to server 102. Video capture module 1322 may be configured to capture video. Modules on lock box 1300 are not exclusive, meaning multiple modules are used together in certain situations. For example, event detection module 1319 is used with video capture module 1321 and video compression module 1322.

Lock box 1300 is used as a remotely accessible storage locker. Lock box 1300 can be opened remotely via client device 103. Further, lock box 1300 can be opened with a passcode. Lock box 1300 is capable of having multiple passcodes, with each passcode activating a different unlocking event. For example, a first passcode may be provided to a package delivery service, and upon entering the first passcode, lid 1302 becomes unlocked, a video is captured of the unlocking party, and an alert is sent to the owner of the box indicating that the package is delivered. A second passcode may be provided to a household resident (e.g., a child), and a key to the house may be stored in lock box 1300. Accordingly, the owner of lock box 1300 (e.g., the parents of the child) likely do not desire a video to be captured every time the child uses the spare key contained within lock box 1300. Accordingly, upon entering the second passcode, lid 1302 becomes unlocked, no video data is captured, and no alert is sent to the owner of lock box 1300. It is contemplated that passcodes can be tied to a particular time and/or day. For example, if the lock box 1300's owner is expecting a delivery at a certain time on a certain day, the owner can provide the delivery service a temporary code that only works during a specified time window on the certain day. For passcodes associated with deliveries, it is contemplated that lock box 1300 includes provisions for providing an e-signature. The e-signature is provided through display 1305. Alternatively, the e-signature is provided through an optional printer device or virtually through a two-way video call. Certain passcodes do not unlock lock box 1300, but initiate a two-way audio or video call. For example, the owner of lock box 1300 may post a passcode on lockbox 1300, such that a user can enter the passcode, initiate a two-way video and/or audio call with the lock box 1300's owner, and the lock box 1300's owner can then decide whether to remotely unlock lock box 1300. Accordingly, the passcode also functions as a screening mechanism for access to lock box 1300. Passcodes expire after a set number of uses (e.g., one use, two uses, etc.), after the passage of time, and/or after a specified date. Alternatively, passcodes never expire.

Figure 13D:
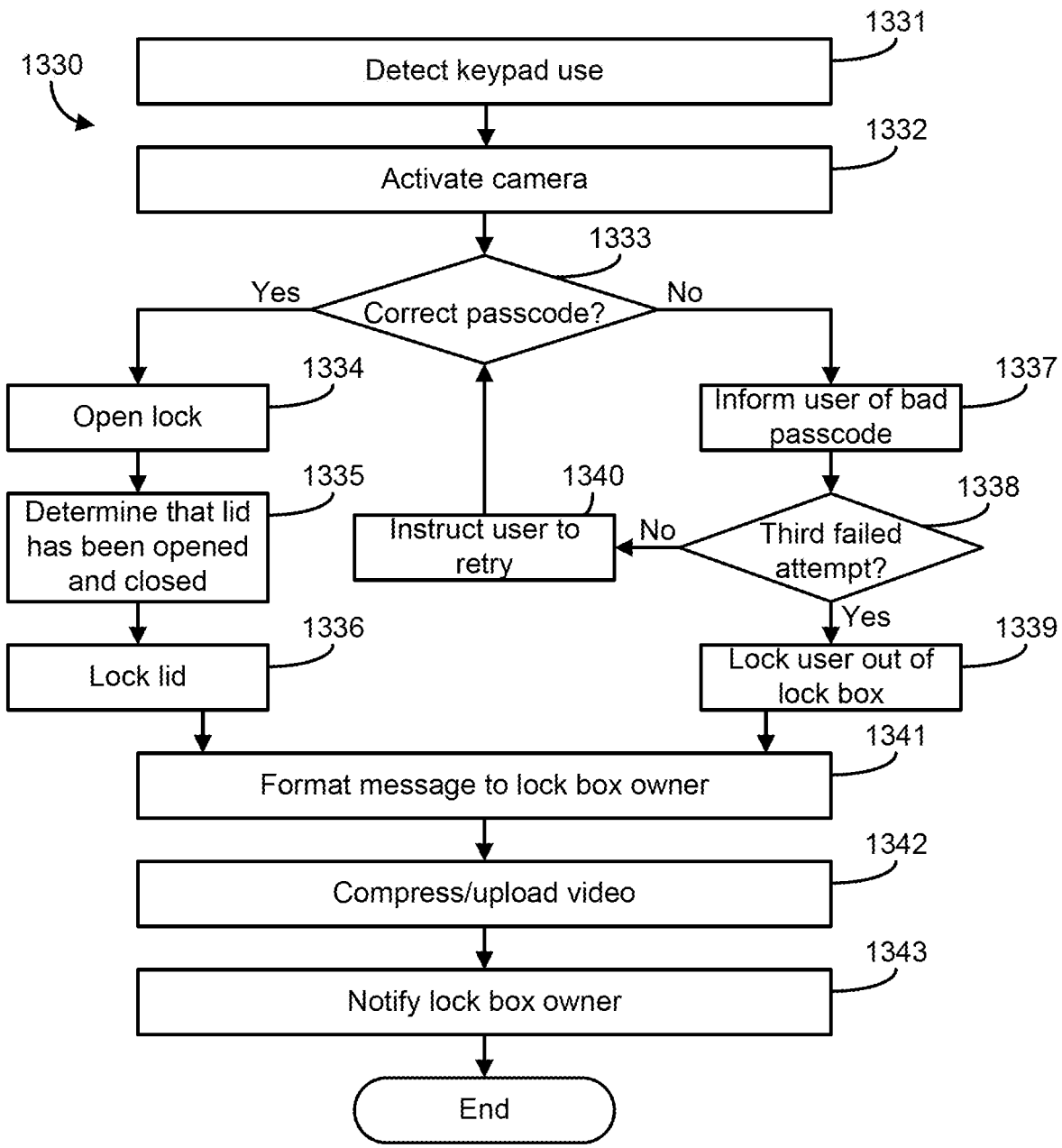
FIG. 13D is a flow diagram detailing a method of using the lock box.

Referring to FIG. 13D, a process 1330 of using lock box 1300 is shown. Lock box 1300 activates upon detection of keypad use (step 1331). For example, when a user wishes to open lock box 1300, the user begins typing the passcode in keypad 1304 in an attempt to gain access. Upon detecting keypad use, camera 1306 is activated to begin capturing video of the user of lock box 1300 (step 1332). The video lasts the duration of lock box 1300 use. Lockbox 1300 determines if the correct passcode was provided (step 1333). If the correct passcode is provided, lock box 1300 unlocks the locked lid (step 1334) such that the user can open lid 1302 and access the compartment contained within main body 1301. Once lid 1302 is determined to have opened and closed (step 1335), lock box 1300 relocks lid 1302 (step 1336). If a successful passcode was entered and lid 1302 has not been opened for a designated period of time (e.g., for 2 minutes), lock box 1300 automatically relocks lid 1302. If an incorrect passcode is entered, lock box 1300 informs the user of the bad passcode (step 1337) and determines if it is the third attempt at entering a passcode (step 1338). If the incorrect passcode corresponds to the third attempt, lock box 1300 locks the user out of the system (step 1339). Lock box 1300 may be locked for a designated period of time (e.g., 10 minutes) before allowing a new passcode attempt. If the incorrect passcode was only a first or a second attempt, the user is instructed to retry entering a proper passcode (step 1340). It is contemplated that the number of allowed attempts is higher or lower than three based on a user setting or system 101 setting. In either case, a notification message is formatted (step 1341). The notification message includes information pertaining to the lock box 1300's recent use (or attempted use). Captured video data is compressed and uploaded to server 102 along with the formatted notification message (step 1342). Server 102 delivers the notification message to the lock box 1300 owner instructing the owner of the lock box 1300 access or attempted access (step 1343).

Lock box 1300 further includes an event detection mode. The event detection mode functions very similarly to the event detection of camera unit 101 (as described above with respect to FIG. 2L). However, lock box 1300 is not configured with a motion detector. Instead, lock box 1300 is configured with a movement detector to determine if a person is attempting to move lock box 1300 (e.g., a thief taking lock box 1300). Accordingly, upon detected movement, video data is captured and uploaded to server 102, and a notification is initiated to the lock box 1300's owner as in FIG. 2L. In an alternate embodiment, lock box 1300 includes a motion detector and camera 1306 of the lock box functions in the same way as camera unit 101.

Smart Event Notification, Listing Management, and Control

As discussed above, system 100 initiates notifications to users associated with events detected by remote devices (e.g., camera unit 101 and switch unit 104). All users associated with a particular device or location are sent notifications. It is contemplated that users associated with a particular device or location are sent notifications according to a notification schedule (e.g., as discussed above with respect to FIG. 9), and not all users will receive a notification if the notification is addressed by another user before the designated delay times have passed. It is also contemplated that the delays are based on tier level. Accordingly, each tier is only notified after the expiration of a delay time associated with the previous tier. If a user in the previous tier clears the event, the event notification will not continue to the other tiers.

Figure 14:
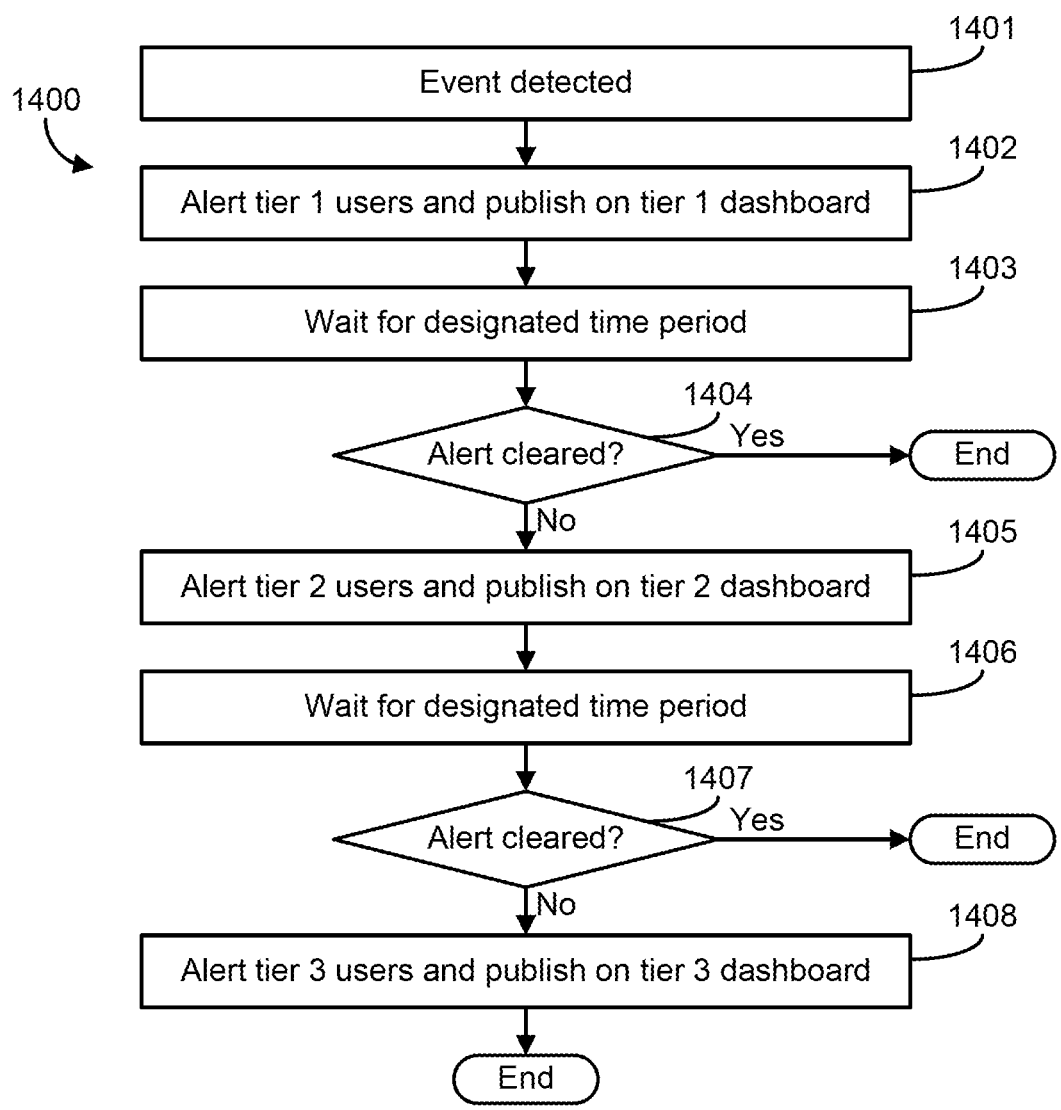
FIG. 14 is a flow diagram detailing a method of initiating delayed notifications.

Referring to FIG. 14, a process 1400 of initiating delayed notifications to users based on tiers is shown. Process 1400 begins when an event is detected at a remote device (step 1401). The remote device is affiliated with a location-specific dashboard or device-specific dashboard. Further, three tiers of associated users are affiliated with the dashboard. Tier 1 users have the highest level of access next to the dashboard's owner, tier 2 users have the next highest level of access, and tier 3 users have the lowest level of access. Users are notified after designated delays following the detection of the event based on the tier to which he or she belongs. Further, event listings are published on users' dashboards after the designated delays. Accordingly, after an event was detected, system 100 notifies tier 1 users and publishes the event listing for viewing to tier 1 users (step 1402). Tier 2 and tier 3 users are not notified at this point. Further, tier 2 and tier 3 users cannot view the event listing on their dashboards at this point in time. System 100 waits a first set period of time before notifying additional users (step 1403). Accordingly, tier 1 users are provided a first set period of time to clear the detected event (e.g., three minutes) (step 1404). If a tier 1 user clears the event prior to the expiration of the set period of time, no further users are notified of the detected event. Further, the detected event listing are not yet published to other users.

If a tier 1 user has not cleared the event at the expiration of the set time period, system 100 initiates notifications to tier 2 users. Further, system 100 publishes event listings for the detected event on the dashboards of tier 2 users (step 1405). Tier 3 users are not notified at this point in time. Further, tier 3 users cannot view the event listing on their dashboards at this point in time. Tier 1 users, who have previously received the notification, can still log into their dashboards, view the event listing, and clear the event listing. System 100 waits a second set period of time before notifying tier 3 users (step 1406). Accordingly, tier 1 users and tier 2 users are provided a second set period of time to clear the detected event (e.g., three minutes) prior to a notification being sent to tier 3 users (step 1407). It is contemplated that the second set period of time is not the same as the first set period of time. If either a tier 1 user or a tier 2 user clears the event prior to the expiration of the second set period of time, no tier 3 users are notified of the detected event. Further, the detected event listing are not yet published to tier 3 users.

If a tier 1 user or a tier 2 user has not cleared the event at the expiration of the second set time period, system 100 initiates notifications to tier 3 users. Further, system 100 publishes event listings for the detected event on the dashboards of tier 3 users (step 1408). At this point, there are no further tiers to notify. Alternatively, system 100 includes further tiers, which are notified based on the same delay process as above. It is further contemplated that system 100 waits a third set period of time, and after the expiration of the third set period of time, if no user has cleared the event, system 100 initiates a notification to an emergency service (e.g., a police department, a fire department, etc.).

In the above described method, it is contemplated that the device's owner and/or the location's owner is grouped together with the tier 1 users. Accordingly, the owners are notified at the same time as tier 1 users and the event listings are published on the owners' dashboards at the same time as tier 1 users' dashboards. Alternatively, the device's owner and/or the location's owner receives the event notification prior to the associated tier 1 users receiving the event notification. In this case, the tier 1 users receive the event notification after a predetermined delay to give the owners an opportunity to clear the event prior to notifying the tier 1 users and publishing the event listing on the tier 1 users' dashboards.

Users of system 100 likely receive many notifications for detected events based on the activity of any registered devices, the number of registered devices, and the number of associations with other user accounts, locations and devices. Accordingly, upon logging into system 100, the user is presented his or her general dashboard. The dashboard includes event listings from any owned devices, any owned locations, and any associated devices or locations. It is contemplated that users have the ability to delete classes of event listings from their dashboards. System 100 provides the capability to delete all event listings, all event listings marked as cleared, all event listings marked as cleared by a designated tier (e.g., cleared by a tier 1 user, cleared by a tier 2 user, cleared by a tier 3 user), all event listings cleared by a designated user, all event listings from a specified remote device (including a specified associated remote device owned by another user), all event listings from a specified location (including a specified associated location owned by another user), all event listings from a particular date, all event listings from a particular date range, and any other category that can be used to classify event listings.

As users delete event listings, event listings may disappear from other associated users affiliated with the event listing. It is contemplated that event listings deleted by a first user are only removed from the dashboard of a second user if certain conditions are met. The conditions are based on tiers of access. As discussed above, with respect to shared locations and shared remote devices, associated users are grouped into tiers correlating to the level of access granted to the particular location or the particular remote device. Tier 1 users have the highest level of access, second only to the location or device's owner. Tier 2 users have the next highest level of access. Tier 3 users have the lowest level of access. If an event listing is deleted by a tier 1 user, the event listing is removed from other tier 1 users' dashboards, from tier 2 users' dashboards, and from tier 3 users' dashboards. Deletions made by tier 2 users remove the deleted event listings from other tier 2 users' dashboards, from tier 3 users' dashboards, but not from tier 1 users' dashboards. Deletions made by tier 3 users only remove the deleted event listings from other tier 3 users. Deletions made by all tiered members do not remove the deleted event listings from the devices' or locations' owners' dashboards. Deleted events that remain on a user's dashboard (e.g., an event deleted by a tier 2 user remains on a tier 1 user's dashboard) indicate that the event was deleted by a lower tier user and identify the deleting user account. Further, a user can set specific deletion preferences for specific associated users such that when the specified associated user deletes an event listing, the event listing is either automatically removed from the user's dashboard or always remains on the user's dashboard.

Screen Customization

Figure 15A:
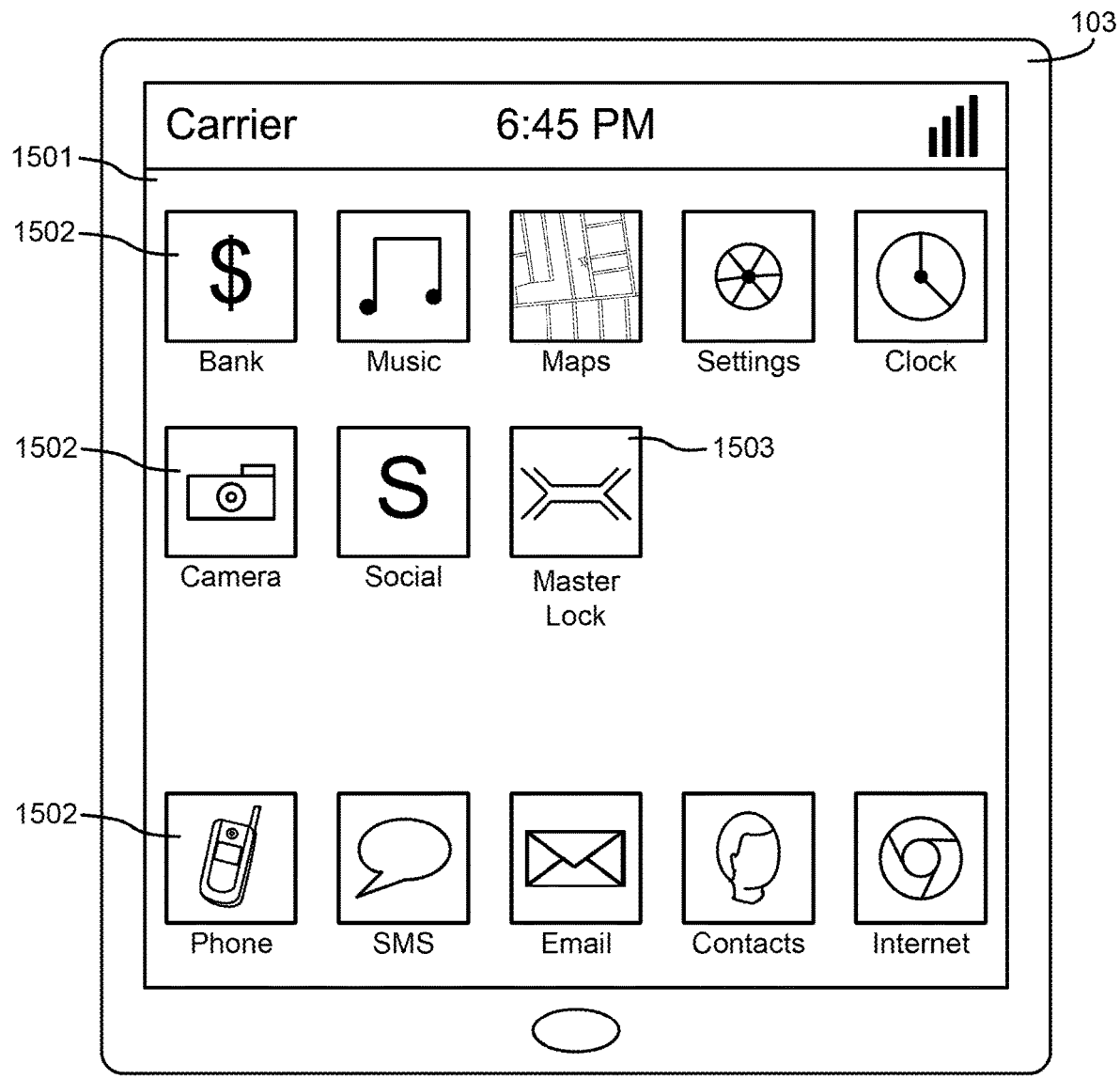
FIG. 15A is a detailed view of an exemplary graphical user interface of a home screen of a client device.

Users of system 100 can customize the screen appearance for the system application (e.g., system 100 smartphone application running on client device 103). For example, referring to FIG. 15A, an exemplary home screen of client device 103 is shown. Client device 103 is shown as a smartphone. Client device 103 includes a home screen 1501 having a plurality of icons 1502 pertaining to client device 103 functions (e.g., phone, SMS, e-mail, contacts, camera, settings, etc.). Home screen 1501 further includes a user-selectable icon 1503 for system 100 (shown as "Master Lock"). When using client device 103, the user selects icon 1503 if the user wishes to access system 100. It is contemplated that icon 1503 changes colors depending on the status. For example, if the user has a critical alert waiting on the user's dashboard, icon 1503 appears red. If the user has a non-critical warning alert waiting on the user's dashboard, icon 1503 appears yellow. It is contemplated that any of the icon text, the icon background, and the icon logo change colors or configurations depending on the status of the user's account.

Figure 15B:
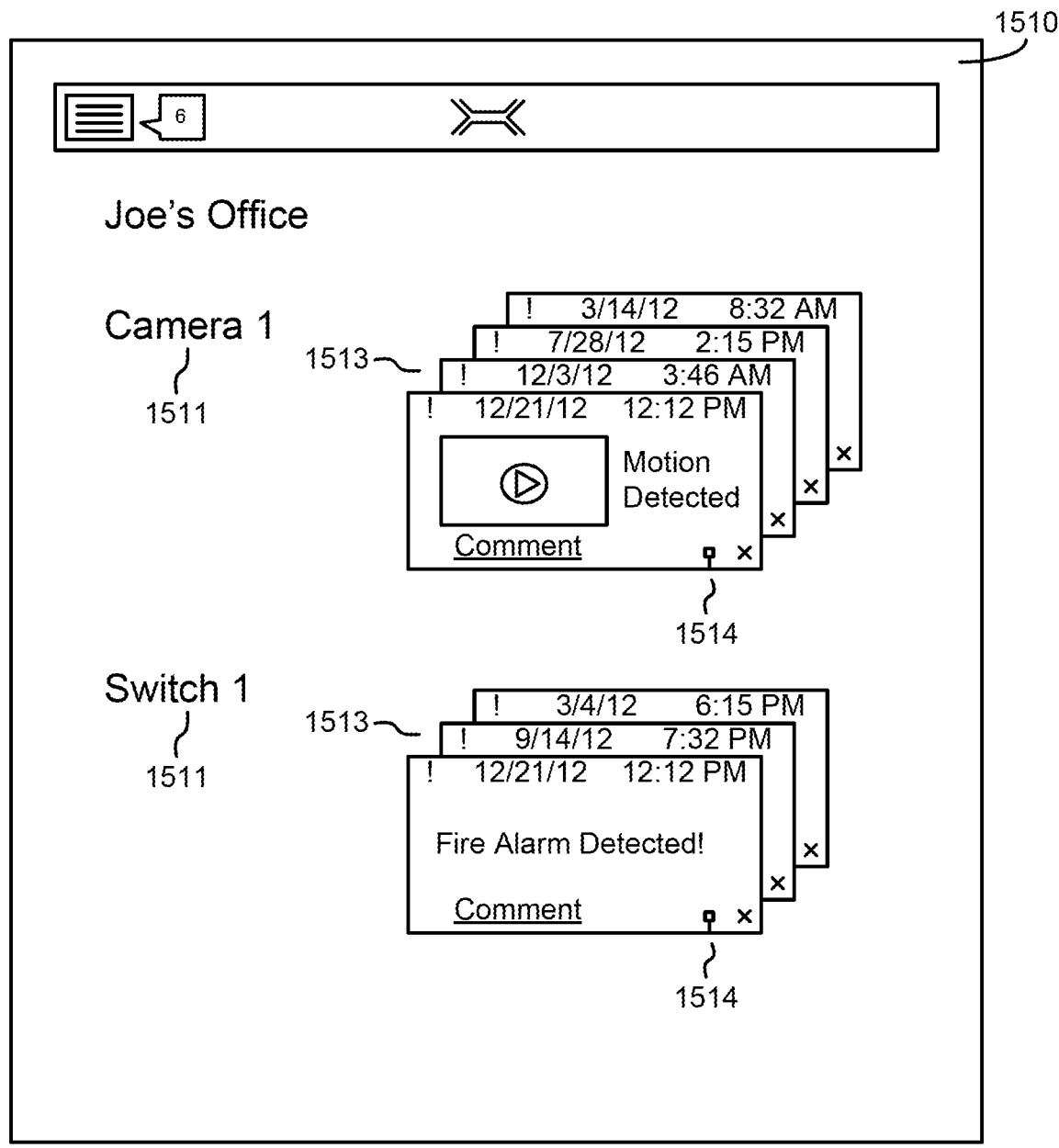
FIG. 15B is a detailed view of a graphical user interface of a customized user dashboard.

It is further contemplated that users can configure customized dashboard views. Referring to FIG. 15B, an exemplary user location dashboard 1510 is shown. Dashboard 1510 includes a different arrangement than previously discussed (e.g., as discussed above with respect to FIG. 6F). User location dashboard 1510 (shown as "Joe's Office") includes event listings for at least two devices: a camera unit 1511 and a switch unit 1512. Event listings 1513 for each respective device are stacked on top of each other instead of laid out in a vertical chronological listing (as in FIG. 6F). Accordingly, the most recent event listing is first, and prior event listings are stacked behind the most recent event listings. Each device includes its own stack of listings. To navigate to a particular listing, it is contemplated that the user selects (either with an external input or by interacting with a touchscreen) an event listing of the stack of event listings 1513. Selecting a specific event listing will move the event listing to the front of the stack of event listings 1513. It is also contemplated that a user can navigate between event listings by swiping on the stack of event listings 1513. The user can view event content, leave comments, and delete or clear events as the user could with the standard dashboard format (as in FIG. 6F). In this arrangement, the user can also interact with a pin icon 1514 on the card to lock the card for the event listing in place (e.g., to prevent automatic deleting or deleting by another associated user).

Figure 15C:
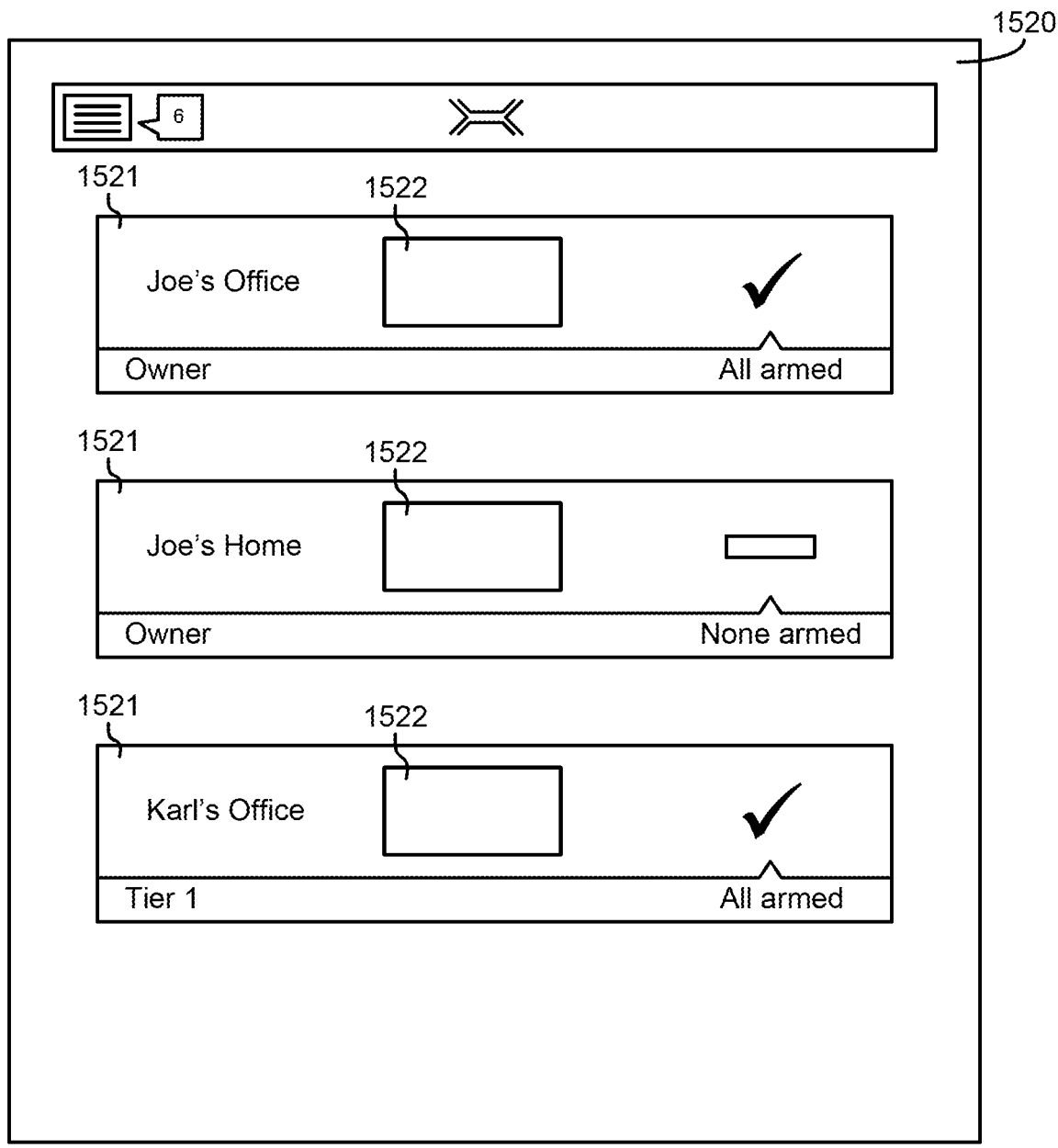
FIG. 15C is a detailed view of a graphical user interface of a system home screen.

Further, it is contemplated that the user's home screen is configurable to include thumbnails of the various locations and/or devices that the user owns or is associated with. Referring to FIG. 15C, an exemplary system 100 home screen 1520 is displayed. User home screen 1520 is different from the standard home screen (e.g., different from the screen of FIG. 6B). User home screen 1520 includes an additional thumbnail 1521 for each owned or associated location. Thumbnail 1521 includes a recent image 1522 captured by a camera unit at the designated location. It is contemplated that upon logging into system 100, server 102 sends an image capture request to all associated or owned locations and devices and updates thumbnail 1521 to include the recently captured image. Alternatively, thumbnail 1521 includes a preview of the location's dashboard. In yet another alternative, thumbnail 1521 includes an indication of the number of new detected events present at that location. In yet another alternative, thumbnail 1521 includes a user selected picture that designates the location or device.

Any of the above customized views can be selected by the user through interacting with the settings of system 100. It is further contemplated that system 100 includes a series of user selectable themes. Each user selectable theme will alter all or a majority of the graphical user interfaces away from the standard interfaces (e.g., such that the exemplary graphical user interfaces of FIGS. 6A-F are different). A user can revert back to the standard graphical user interface format by selecting a reset button within the settings of system 100. Further, the user may be able to select an avatar or logo (e.g., a system picture) that is seen by other users of system 100.

Interaction With Camera Unit Without Client Device

Users can interact with devices (e.g., camera unit 101 and switch unit 104) without the use of client device 103. Each remote device includes at least one user input (e.g., a user button, a user switch, a series of buttons, etc.). Further each remote device includes at least one visual indicator (e.g., a multicolored LED, a series of LEDs, etc.). Accordingly, each remote device is capable of indicating its current status (e.g., armed, disarmed, active, low battery, poor network connection, etc.) by displaying different combinations of LEDs (e.g., displaying three of five LEDs in a row corresponds to a battery life of approximately 60%), flashing LEDs at different intervals (e.g., flashing a green LED at a quick pace indicates the device is armed, while flashing a green LED at a slow pace indicates the device is disarmed), and/or different colors of LEDs. For example, it is contemplated that camera unit 101 includes at least one multicolored LED that is capable of emitting at least a red light, a yellow light, and a green light. Each color corresponds with a current status (e.g., green corresponds to armed, red corresponds to disarmed, yellow corresponds to low battery). In order to conserve battery life, it is contemplated that the visual status indicators are only activated upon user interaction with the user input. Alternatively or in addition to the visual indicators, each remote device includes a speaker. The speaker is configured to emit audio status indicators upon user interaction with the user input. The audio status indicators include beeps, a series of beeps, and voice indicators. It is contemplated that the user can change the status of the remote devices through interaction with the user input, and the visual and/or audio signals indicate to the user when the device status has changed.

It is further contemplated that users can provide voice commands to remote devices. Accordingly, each remote device includes a microphone. Upon user interaction with the user input, the user can activate a voice command mode of the remote device. The device emits an audible noise (e.g., a beep or a voice indication that it is ready for the command). The user speaks the command. Commands include arming commands, disarming commands, status update commands, capture commands, send alert commands, activate siren commands, activate light commands, report event commands, change status of a connected device command (e.g., a lamp connected to switch unit 104), lock or unlock commands, and any other device command. It is contemplated that the command is received at a first device (e.g., camera unit 101) and carried out at a second device (e.g., switch unit 104). Devices include a voice recognition step before executing a command. For example, prior to voice commands being activated, the owner of the device (or another authorized user) must record sample commands or sentences that the device stores for future comparison. Whenever a voice command is received, the device compares the current command with the stored samples to verify that the command is coming from a device owner or a person authorized to give the device commands, and not from an intruder attempting to disarm the device. If the command is coming from an authorized user, the command is executed. If the command is coming from an unauthorized user, the command is not executed. Further, it is contemplated that camera units include a facial recognition feature. Accordingly, camera units take reference photographs of users that are authorized to issue voice commands to the camera unit. Upon receiving a voice command, the camera unit captures a picture of the user, compares the picture to sample pictures stored within its memory, and either verifies the user as an authorized user or does not verify the user. If the user is determined to be an authorized user, the command is executed. If the user is determined to not be an authorized user, the command is not executed. Further, system 100 optionally sends the device's owner a notification of the unauthorized attempt. In an alternate configuration, a user can establish a voice connection with a remote device through a telephone, voice-over-IP phone, and/or cellular phone and provide voice commands through the voice connection.

Camera Unit Scheduled Capture

As discussed above, users can instruct camera unit 101 to capture video according to a schedule. The video capture request may be at a designated time and date. Further the video capture request may be a recurring request (e.g., every day, every Tuesday, every third day of the month, etc.). When a user is programming the scheduled capture request, the user indicates the time of the video capture (e.g., 1 pm), the date of the video capture, and the frequency of the video capture (e.g., once, every Tuesday, every month, etc.), and, if the frequency is greater that a one-time capture, the end of the video capture request (e.g., after two captures, after a particular date, etc.). Further the user indicates an importance factor for the video capture (e.g., high importance, medium importance, low importance). The user programs special video capture settings (e.g., a higher or lower resolution from standard resolution, a longer or shorter video length than the standard video length, etc.).

Camera unit 101 receives the capture commands according to the user provided schedule from server 102. It is contemplated that server 102 makes changes to the commands based on camera unit 101 feedback. For example, if the battery of camera unit 101 is running low, server 102 can decide to withhold sending a scheduled capture request if the request is of low importance. If the battery reaches a critically low level, server 102 additionally withholds medium importance capture requests. Both of these adjustments are intended to prolong the battery life of camera unit 101. Further, if a scheduled capture request occurs following a long duration of no detected motion (e.g., camera unit 101 has not detected motion in a certain number of days), server 102 can withhold an upcoming capture request to conserve the battery. Still further, server 102 can modify the parameters of the capture request based on camera unit 101 battery life or detected activity. For example, server 102 can increase or decrease the video length and/or the video resolution based on detected activity (e.g., if there is a lot of detected activity, increase the video length and increase the video resolution) or based on camera unit 101's battery level. If server 102 withholds a scheduled capture request, a notification is sent to the user indicating the reason the capture request was withheld (e.g., low camera battery or no recent activity detected). It is contemplated that server 102, ahead of the scheduled capture request (e.g., an hour ahead), initiates a notification to the user, so that the user can decide whether to replace or recharge the battery, cancel the capture request, or adjust the capture request's importance level such that server 102 is guaranteed to sends the capture request to camera unit 101.

Protections Against Video Sharing

System 100 includes protections against unauthorized video sharing. All video captured by camera units and uploaded to server 102 is encrypted. The video data is encrypted on server 102. Alternatively, the video data is encrypted on camera unit 101 prior to transmission to server 102. System 100 optionally overlays a watermark on the video data to assure the viewer that the video data is secured (e.g., a watermark that reads "assured secure"). System 100 is further configured to format video such that the video data automatically deletes after a certain number of views (e.g., one view, two views, three views, etc.) or after a designated period of time (e.g., three days, one week, one month, etc.). The number of views is configured by the user in the system settings. In some situations, a user may wish to deactivate this feature or provide a high number of views (e.g., in situations where the user plans on sharing the video data with multiple users). Still further, system 100 tracks the number of video views and the identity of viewing parties. For example, system 100 maintains a listing that includes a detailed counter that updates every time the video file is played and the identification of a user that played the video. The listing is a separate file or is metadata within the video file. The listing may be reported to a monitoring authority (e.g., the police department, the owner of the video, an authorized viewer of the video, etc.). Further, an updating water mark can be applied to the video file after every playback (e.g., "playback #26"). Thus, if the video file is discovered to be distributed in an unauthorized manner (e.g., posted on a public viewing site such as YouTube®), the water mark displayed on the video can be identified and matched with the user account associated with the playback number. Accordingly, the breaching user's identity is provided to the location's owner (or the device's owner) and/or a government authority. Still further, system 100 can be configured to store video data in a unique video format. The unique video format is only compatible with system 100 video players. Accordingly, video data cannot be removed from the website and viewed on a standalone video player (e.g., Quicktime®). Further, because the video file format is a unique format to system 100, the video file cannot be uploaded to a public viewing site (e.g., YouTube®) or converted to another recognizable video format.

Share Installation Settings With Other Camera Units/Switch Units

Users can register multiple devices at the same location with system 100. Accordingly, each device likely accesses server 102 through the same access point (e.g., by connecting to the same wireless network SSID and by utilizing the same wireless network password). Accordingly, it is contemplated that a user need only configure one remote device to communicate with the wireless access point, and any further devices can receive network connection settings from the setup device. For example, a first camera unit is installed in a room of a first location. The user configures the first camera unit to connect to server 102 through a wireless router configured to broadcast under a specific SSID and that requires a password to gain access to the wireless network. The user then wishes to install a second camera unit in a second room at the same location. The second camera unit is to connect to server 102 through the same wireless router. Accordingly, upon powering on the second camera unit, the user can click a setup button (e.g., through interaction with user interface devices 209) on both the first camera unit and the second camera unit. Upon clicking the button, the second camera unit enters a listen mode, and the first camera unit enters a broadcast mode. The two camera units locate each other and form a direct ad-hoc wireless connection. After the connection is formed, the first camera unit shares the wireless network settings with the second camera unit. Upon successful sharing, the ad-hoc connection ends, and both camera units connect to the wireless router. In an alternative arrangement, all remote devices are equipped with RFID transceivers such that two remote devices can be "bumped" together to initialize an ad-hoc wireless connection for transferring wireless network settings.

Wireless Network Extender

Any of the above remote devices (e.g., camera unit 101, switch unit 104, and lock box 1300) can be primarily mains powered or secondarily mains powered (e.g., plugged in while charging). When a remote device is plugged in, it is contemplated that the remote device serves as a wireless network extender. Accordingly, the remote device connects to a wireless access point (presumably the wireless access point providing the connection between the remote device and server 102), rebroadcasts the signal, and functions as a wireless network extender.

Additional Camera Unit Options and Features

Camera unit 101 includes a nanny camera mode. While in nanny camera mode, camera unit 101 remains in a partial event detection mode. During the partial event detection mode, camera unit 101 detects motion, and records video upon the detection of motion. Camera unit 101 continuously records video until motion detector 204 detects that motion has ceased. Unlike the event detection mode as described above with respect to FIG. 2L, while in nanny camera mode, camera unit 101 does not initiate an alert to the user associated with camera unit 101. In most situations, a parent would not wish to be notified upon every detected movement of an occupied house. Instead, the parent would want to have the ability to go back and review captured video if the parent comes home to complaints from the child, missing belongings, or a damaged house. Accordingly, video data captured while in nanny camera mode is compressed and uploaded to server 102, where it is stored for later viewing. To assist with camera unit 101 concealment, camera unit 101 can be fitted into an aftermarket housing (e.g., a specially designed children's plush toy with a compartment to house and conceal camera unit 101, a hollowed-out book shell to be placed on a book shelf, etc.).

Camera unit 101 optionally includes a Universal Serial Bus ("USB") port. The USB port is a version 1.0, 2.0, or 3.0 USB port. The USB port is a Type A, Type B, Mini-A, Mini-B, Micro-B, Micro-AB USB port, or a proprietary USB port. The optional USB port facilitates data transfer between a hosting computing device (e.g., a laptop or a desktop computer) and camera unit 101. Accordingly, a user can plug camera unit 101 into a hosting device via the USB port and configure camera unit 101 settings, configure camera unit 101 network settings (e.g., program a wireless network SSID and password into camera unit 101 such that camera unit 101 can connect to the wireless network), and retrieve any video and audio data stored in memory 214. Further, it is contemplated that while plugged into a hosting computing device via the USB port, camera unit 101 can serve as a webcam device for video recordings, video calling, and other video enabled computing functions.

The optional USB port also facilitates power delivery to camera unit 101. Accordingly, camera unit 101 is capable of receiving operating and/or charging power through the USB port. Power is provided when camera unit 101 is connected to a computing device (e.g., a laptop or desktop computer) via the USB port or when camera unit 101 is connected to an AC adapter through the USB port. If camera unit 101 is powered by a rechargeable battery, camera unit 101 includes a charging circuit designed to power camera unit 101 and to provide a trickle-charge to the rechargeable battery. If camera unit 101 is mains powered, powered can be supplied from an AC adapter or a hosting computing device through the USB port. The power provided via the USB port is enough to operate camera unit 101 in a normal event detection mode.

Camera unit 101 can be updated via user configurable settings to provide longer video lengths. As discussed above, in order to reduce battery consumption and transmission times, camera unit 101 is configured to provide relatively short video lengths (e.g., 5-10 seconds). However, camera unit 101 can be configured to provide longer video files (e.g., 30 seconds, 1 minute, 2 minutes, etc.) at the request of the owner of camera unit 101. Further, if camera unit 101 is mains powered or plugged into a power source (e.g., receiving power via the optional USB port), camera unit 101 is configured to automatically increase video lengths to longer durations as battery consumption is no longer a constraint on the operation of camera unit 101.

Further, as discussed above, camera unit 101 can be configured to provide a live or near-live video stream. The video stream includes audio. Alternatively, the video stream does not include audio. Accordingly, camera unit 101 may function as a baby monitor, pet monitor, weather monitor, or any other type of camera in which a live or near-live video stream is required. The live or near-live video stream is transmitted directly to client device 103 (e.g., through a direct ad-hoc connection or through a connection facilitated by an access point and/or server 102). Alternatively, the live stream is broadcast on the device's dashboard, which is accessible by the user through client device 103 or through an Internet connected computer.

Wireless Perimeter Sensors

In some embodiments multiple remote devices can be used to setup a perimeter within a room or a building. The perimeter can be used to determine and alert a user of any unauthorized entry into the room or building. The perimeter includes devices that create a virtual trip wire across openings such as doors (e.g., between two switch units, between a switch unit and a camera unit, etc.). When armed, a first device transmits a light beam (e.g., infrared or laser) to the second device. When the light path is broken, an unauthorized entry is detected and an alert is sent to server 102 for transmission to the user. Further, the perimeter includes glass breakage sensors that determine when a window breaks, creating an access route into the room or building. When armed, if the glass breaks, the sensor sends an alert to server 102 for transmission to the user. It is contemplated that if any perimeter sensor is activated, other devices on the local area network (e.g., camera units) are notified of the unauthorized entry and instructed to record event data.

Figure 16:
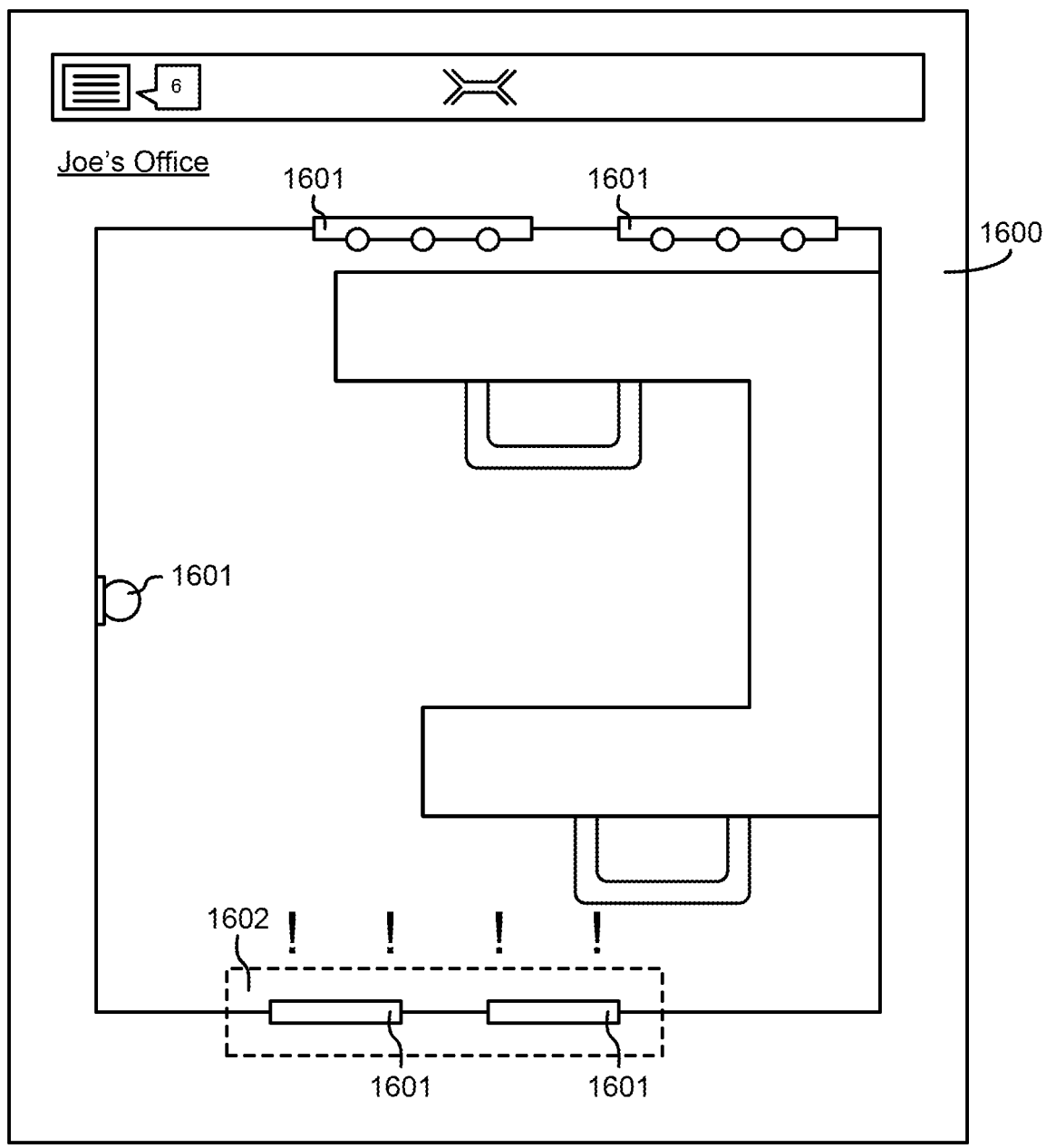
FIG. 16 is a detailed view of a graphical user interface of a floor plan.

Referring to FIG. 16, an exemplary floor plan 1600 with sensor information is shown. When using the perimeter sensors, the user can program the sensor locations on a customizable floor plan of the building or room being monitored. The user provides a sketch of the building or room being monitored (shown as "Joe's Office"), and places sensor 1601 indicators corresponding to the actual sensor locations in the office. Accordingly, when server 102 receives an alert from a sensor 1601 within floor plan 1600 (e.g., an unauthorized entry shown by virtual trip wire between a first and a second switch unit), server 102 updates the graphical user interface displaying floor plan 1600 (e.g., displaying alert 1602) to indicate where the unauthorized entry took place. Through floor plan 1600, it is contemplated that the user can click on alert 1602 (e.g., clicking on the highlighted alert area) to gather more information pertaining to the unauthorized entry (e.g., a time of the entry, a day of the entry, etc.). Further, it is contemplated that the user can click on non-tripped sensors 1601 (e.g., glass breakage sensors) to receive an instant update. Still further, by clicking on a camera unit on the floor plan, the user initiates a video capture request to the camera unit.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision step.

The invention claimed is:

1. A lock box comprising:
   a main body defining a compartment, the main body structured to be secured within or secured to a substantially permanent structure;
   a lid positioned to selectively enclose the compartment;
   an electronic locking mechanism positioned to selectively lock the lid to the main body;
   a lid sensor configured to detect at least one of an attempt to open the lid or opening of the lid; and
   a processing circuit configured to:
      generate an alert in response to the lid sensor detecting the at least one of the attempt to open the lid or the opening of the lid;
      unlock the electronic locking mechanism in response to receiving an unlock command; and
      automatically lock the electronic locking mechanism after unlocking the locking mechanism in response to the lid not being opened after a period of time greater than a threshold period of time.

2. The lock box of claim 1, further comprising a wireless transceiver configured to facilitate communication with at least one of a server or a user device.

3. The lock box of claim 2, wherein the processing circuit is configured to transmit, via the wireless transceiver, the alert to the server.

4. The lock box of claim 2, wherein the processing circuit is configured to receive, via the wireless transceiver, the unlock command from the server provided by the user device, wherein the user device is outside of a communication range of the wireless transceiver.

5. The lock box of claim 2, wherein the processing circuit is configured to:
   operate in a low power sleep mode until awoken;
   periodically wake up, absent user interaction, to communicate with the server;
   receive an update from the server in response to the update being available upon waking up; and
   return to the low power sleep mode after applying the update.

6. The lock box of claim 2, wherein the wireless transceiver is configured to at least one of (i) communicate directly with the server or (ii) communicate indirectly with the server through an intermediary device.

7. The lock box of claim 1, wherein the processing circuit is configured to operate a camera to capture at least one of an image or a video in response to the lid sensor detecting the at least one of the attempt to open the lid or the opening of the lid.

8. The lock box of claim 7, further comprising the camera.

9. The lock box of claim 1, wherein the processing circuit is configured to:
   receive a plurality of credentials including (i) a first credential associated with a first user and (ii) a second credential associated with a second user that is different than the first credential;
   perform a first operation that does not include unlocking the electronic locking mechanism in response to receiving the first credential and, upon successful completion of the first operation, perform a second operation that includes unlocking the electronic locking mechanism; and
   perform the second operation, without performing the first operation, in response to receiving the second credential.

10. The lock box of claim 9, wherein, during the first operation, the processing circuit is configured to:
   provide a notification to a remote device via a server; and
   receive the unlock command from the remote device via the server in response to the notification.

11. The lock box of claim 10, wherein the notification includes at least one of an image, real-time video, or real-time audio of the first user.

12. The lock box of claim 9, wherein, during the first operation, the processing circuit is configured to:
   operate a camera to capture at least one of an image or a video of the first user; and one of (i) perform facial recognition on the at least one of the image or the video to verify that the first user is an authorized user or (ii) transmit the at least one of the image or the video to a server to perform facial recognition on the at least one of the image or the video to verify that the first user is an authorized user.

13. A locking device comprising:
an electronic locking mechanism;
a wireless transceiver configured to facilitate communication with a server; and
a processing circuit configured to:
  operate in a low power sleep mode until awoken;
  periodically wake up, absent user interaction, to communicate with the server;
  receive an update from the server in response to the update being available upon waking up; and
  return to the low power sleep mode after applying the update.

14. The locking device of claim 13, further comprising a main body defining a compartment and a lid positioned to selectively enclose the compartment, wherein the electronic locking mechanism is positioned to selectively lock the lid to the main body.

15. The locking device of claim 14, further comprising a lid sensor configured to detect at least one of an attempt to open the lid or opening of the lid, wherein the processing circuit is configured to:
  generate an alert in response to the lid sensor detecting the at least one of the attempt to open the lid or the opening of the lid; and
  transmit, via the wireless transceiver, the alert to the server.

16. The locking device of claim 13, wherein the processing circuit is configured to receive, via the wireless transceiver, an unlock command from at least one of the server or a user device.

17. The locking device of claim 13, wherein the wireless transceiver is configured to at least one of (i) communicate directly with the server or (ii) communicate indirectly with the server through an intermediary device.

18. The locking device of claim 13, wherein the processing circuit is configured to:
  receive a plurality of credentials including (i) a first credential and (ii) a second credential that is different than the first credential;
  perform a first operation that does not include unlocking the electronic locking mechanism in response to receiving the first credential and, upon successful completion of the first operation, perform a second operation that includes unlocking the electronic locking mechanism; and
  perform the second operation, without performing the first operation, in response to receiving the second credential.

19. A locking device comprising:
an electronic locking mechanism;
a camera positioned to capture at least one of an image or a video; and
a processing circuit configured to:
  receive a plurality of credentials including (i) a first credential and (ii) a second credential;
  selectively operate the camera to capture the at least one of the image or the video in response to receiving the first credential, but not selectively operate the camera in response to receiving the second credential.

20. The locking device of claim 19, further comprising:
a main body defining a compartment;
a lid positioned to selectively enclose the compartment, wherein the electronic locking mechanism is positioned to selectively lock the lid to the main body; and
a lid sensor configured to detect at least one of an attempt to open the lid or opening of the lid;
wherein the processing circuit is configured to generate an alert in response to the lid sensor detecting the at least one of the attempt to open the lid or the opening of the lid.

* * * * *